United States Patent [19]

Schulz et al.

[11] Patent Number: 5,612,874
[45] Date of Patent: Mar. 18, 1997

[54] MULTIPLE RATIO AUTOMATIC TRANSMISSION WITH SOLENOID OPERATED VALVES FOR EFFECTING PRESSURE BUILDUP

[75] Inventors: Winfried F.-X. Schulz, Pulheim; Johann Kirchhoffer, Cologne, both of Germany

[73] Assignee: Ford Motor Company, Dearborn, Mich.

[21] Appl. No.: 434,235

[22] Filed: May 4, 1995

Related U.S. Application Data

[62] Division of Ser. No. 323,464, Oct. 14, 1994, abandoned.

[51] Int. Cl.⁶ .................................................. B60K 41/06
[52] U.S. Cl. ........................ 364/424.08; 477/68; 477/163
[58] Field of Search .......................... 364/424.1; 477/34, 477/52, 68, 121, 127, 138, 155, 156, 158, 163, 164, 130

[56] References Cited

U.S. PATENT DOCUMENTS

| | | |
|---|---|---|
| 4,325,271 | 4/1982 | Iwanaga et al. ........................ 477/151 |
| 4,413,536 | 11/1983 | Whitney et al. ........................ 477/147 |
| 4,446,759 | 5/1984 | McCrary ................................. 477/148 |
| 5,029,087 | 7/1991 | Cowan et al. ......................... 364/424.1 |
| 5,081,886 | 1/1992 | Person et al. ............................. 74/866 |
| 5,083,481 | 1/1992 | Smith et al. ............................. 477/162 |
| 5,119,697 | 6/1992 | Vukovich et al. ........................ 477/155 |
| 5,150,297 | 9/1992 | Daubenmier et al. ............... 364/424.1 |
| 5,157,608 | 10/1992 | Sankpal et al. ....................... 364/424.1 |
| 5,272,360 | 12/1993 | Brown et al. ......................... 364/424.1 |
| 5,303,616 | 4/1994 | Palansky et al. .......................... 74/890 |
| 5,305,663 | 4/1994 | Leonard et al. .......................... 74/866 |
| 5,315,901 | 5/1994 | Barnes ..................................... 192/3.3 |
| 5,372,226 | 12/1994 | Waterbury et al. ...................... 192/3.3 |
| 5,390,566 | 2/1995 | Kimura et al. ........................... 477/161 |
| 5,460,582 | 10/1995 | Palansky et al. .................... 477/155 X |

*Primary Examiner*—Collin W. Park
*Attorney, Agent, or Firm*—Frank G. McKenzie; Roger L. May

[57] ABSTRACT

A control system for a multiple ratio transmission including a hydrokinetic torque converter with a pressure actuated friction bypass clutch, pressure actuated clutches and brakes controlling ratio changes in forward drive and for effecting reverse drive, a solenoid operated pressure control that develops an optimum clutch and brake pressure for smooth engagement and for increased torque capacity during start-up, and separate solenoid regulator valves for ratio shift valve control and for bypass clutch pressure control.

12 Claims, 28 Drawing Sheets

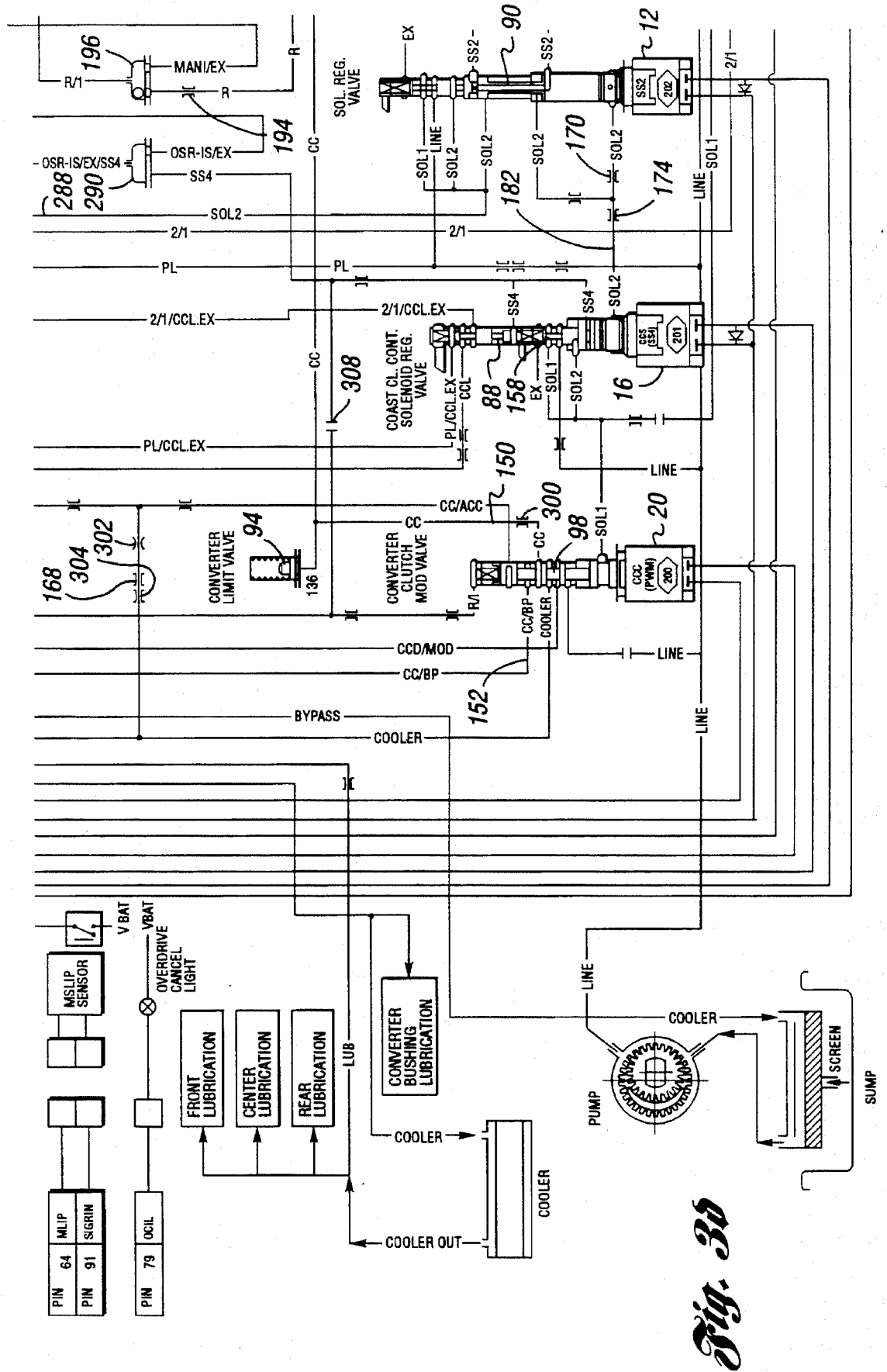

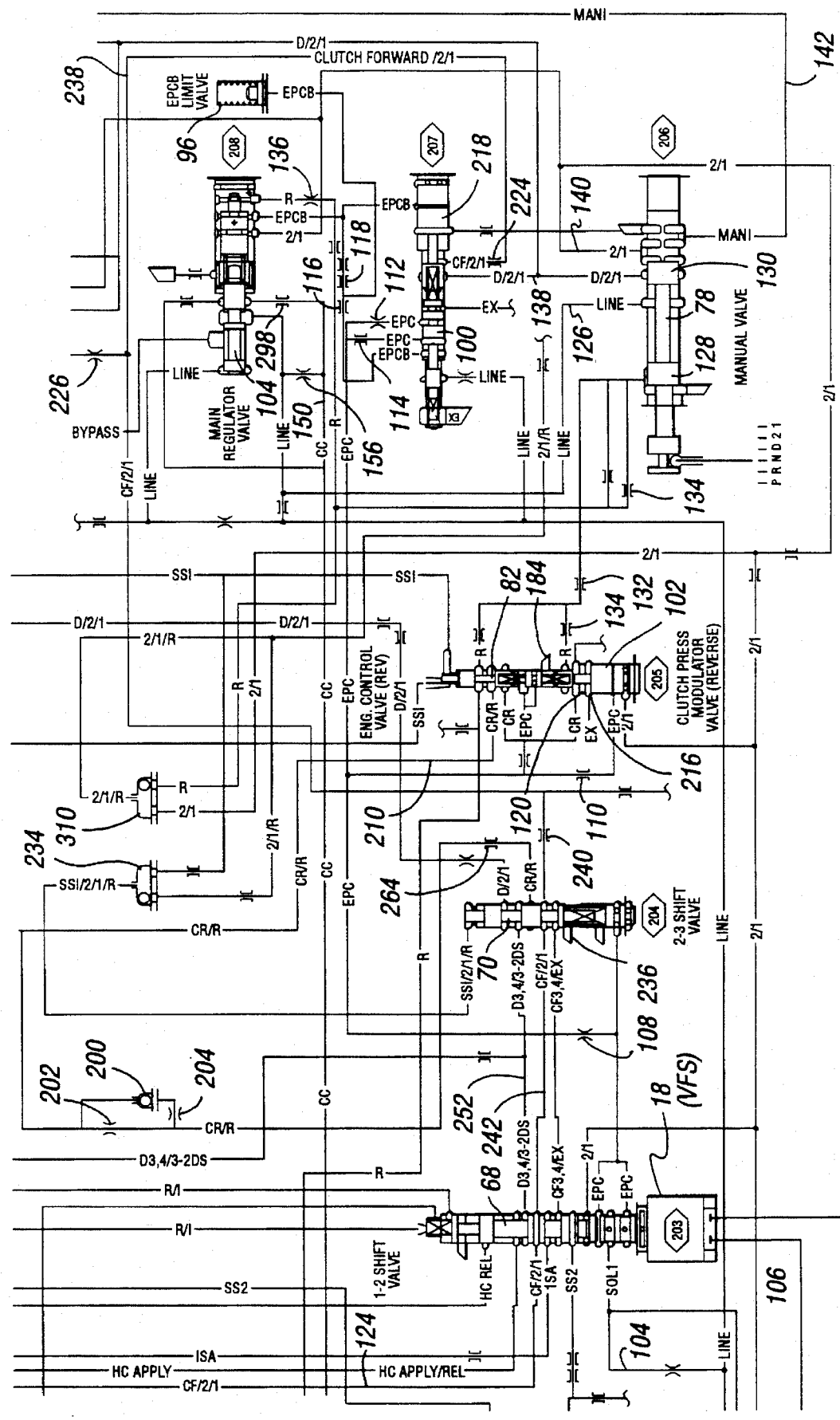

(1-2 UPSHIFT)

(2-1 DOWNSHIFT)

(2-3 UPSHIFT)

(3-2, 4-2 DOWNSHIFT)

$$(D\text{-POS}) \quad P_L = [EPC/EPCB] * \frac{A_2 - A_3}{A_V} + \frac{F_{SO}}{A_V}$$

$$(R\text{-POS}) \quad P_R = [EPC/EPCB] * \frac{A_2 - A_3}{A_V - A_3} + \frac{F_{SO}}{A_V - A_3}$$

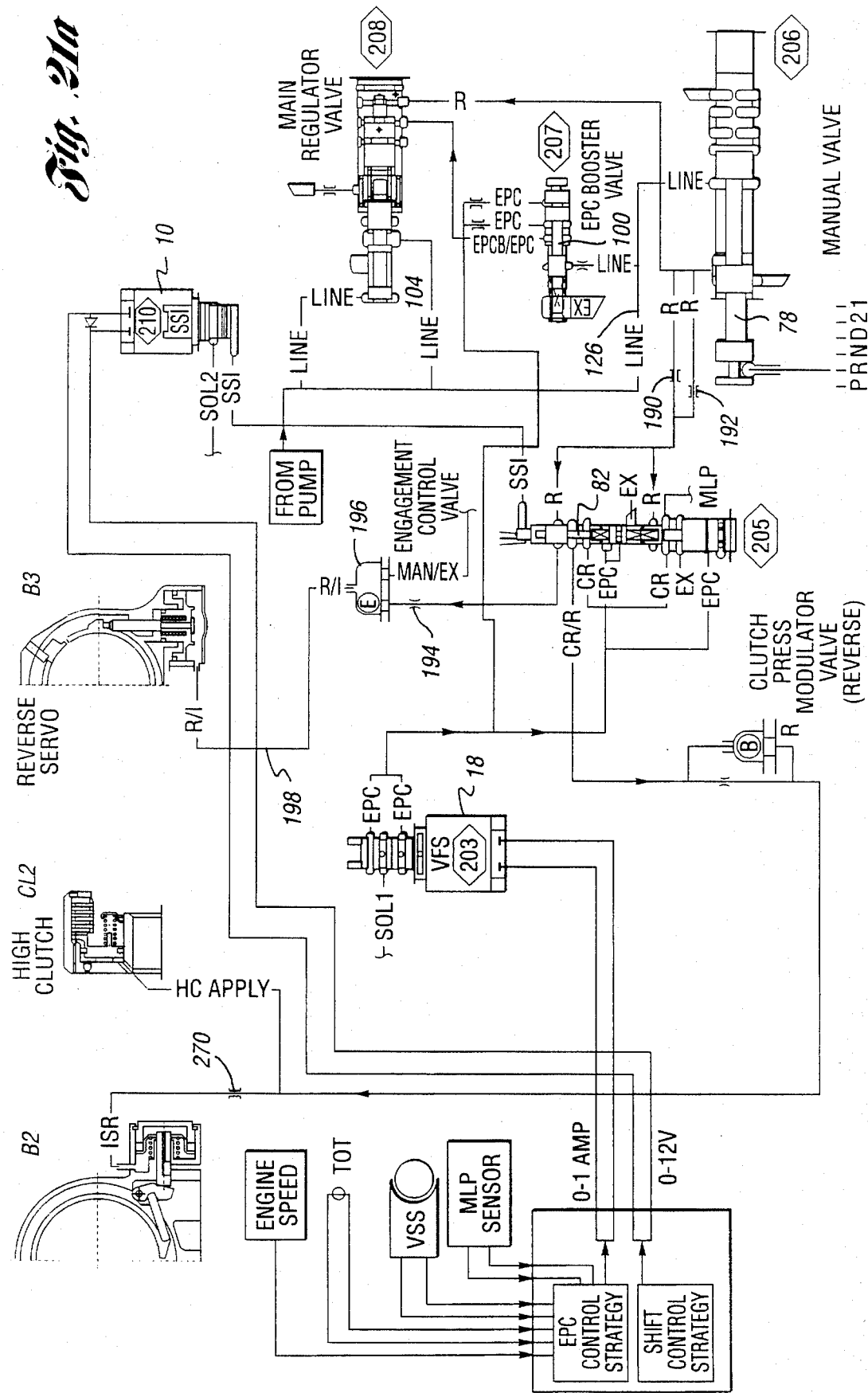

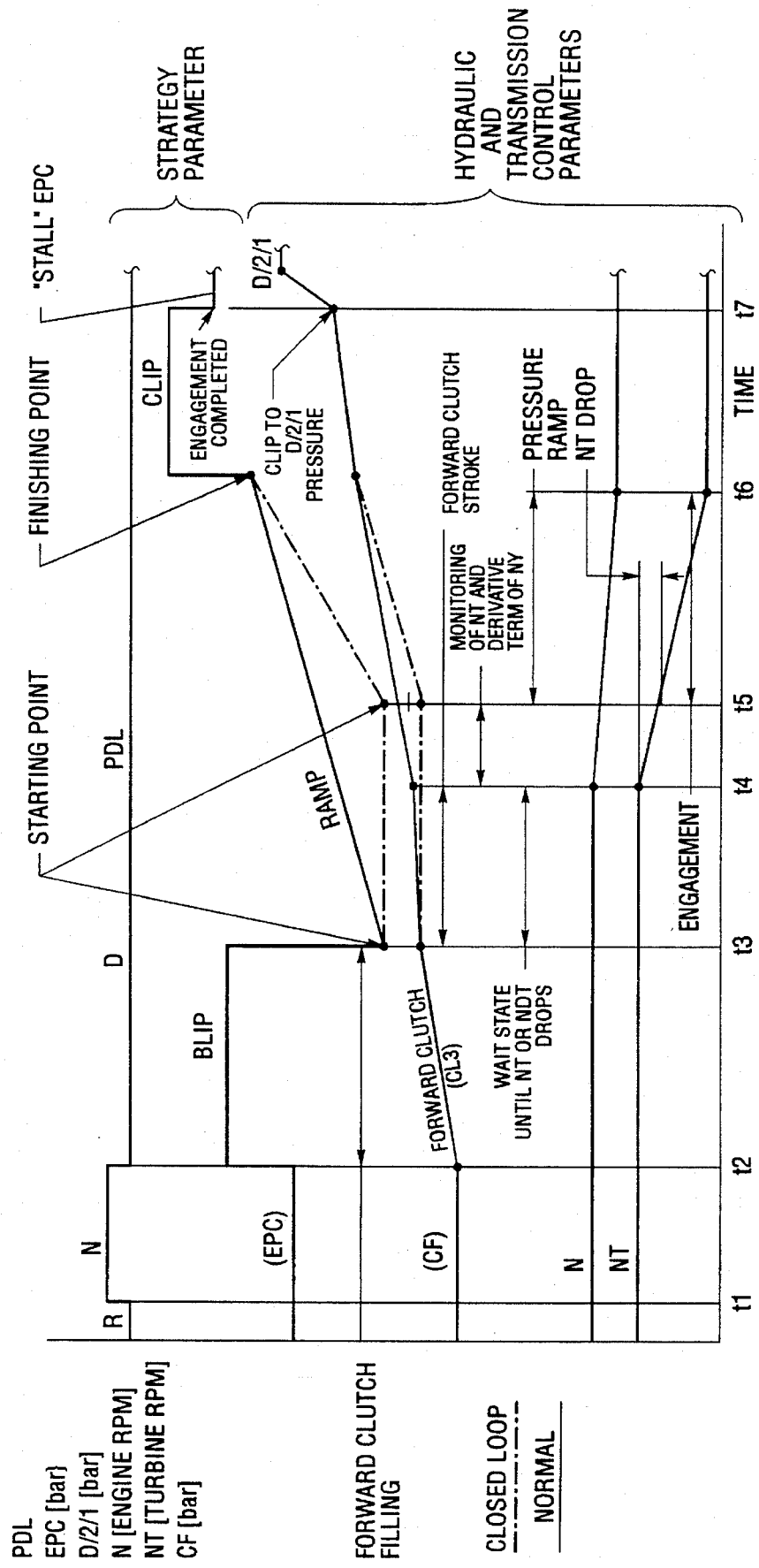

MULTIPLE RATIO AUTOMATIC TRANSMISSION WITH SOLENOID OPERATED VALVES FOR EFFECTING PRESSURE BUILDUP

REFERENCE TO RELATED APPLICATION

This patent application is a division of U.S. patent application Ser. No. 08/323,464, filed Oct. 14, 1994, now abandoned, entitled "Multiple Ratio Automatic Transmission And Control System", which is assigned to the assignee of the present invention.

TECHNICAL FIELD

The invention relates to multiple ratio hydrokinetic transmissions for automotive vehicles and to electronic-hydraulic controls for effecting torque converter clutch engagement, circuit pressure regulation, and speed ratio shifts.

BACKGROUND AND SUMMARY OF THE INVENTION

Our invention is adapted to be used in a multiple ratio planetary transmission situated in a vehicle driveline having an internal combustion engine with a throttle control and a hydrokinetic torque converter situated between the engine and input elements of the gearing.

The gearing of the transmission disclosed in this specification comprises two simple planetary gear units arranged in a manner similar to the gearing arrangement of the well known Simpson gear set. Located between the turbine of the torque converter and the input elements of the Simpson gearing is a third simple planetary gear unit with a friction clutch adapted to connect two elements of the third gear unit together for rotation in unison. A friction brake also is used for anchoring a reaction element of the third planetary gear unit. An overrunning coupling establishes one-way torque flow between two elements of the gearing. The brake is arranged in series relationship with respect to the clutch.

A second overrunning coupling in a gear unit of the Simpson gearing is used for the purpose of establishing a non-synchronous ratio shift. Forward engagement is achieved by engaging a forward clutch on a shift from neutral to a drive state. Similarly, a separate reverse engagement clutch is used to establish a torque flow path for reverse. In each instance, turbine speed is used as a feedback signal to initiate the start of the forward or reverse engagement.

Ratio changes on a downshift from the second ratio to the first ratio, is achieved in our improved transmission by controlling the engagement of an overrunning clutch. The overrunning clutch is arranged with respect to a friction brake to provide a reaction torque flow path associated with the intermediate ratio as the first ratio is established. The brake disengagement is accomplished with a closed loop control so that harshness is avoided as the overrunning elements of the reaction torque flow path engage. This is in contrast to prior art arrangements, such as that shown in U.S. Pat. No. 5,157,608, where a non-synchronous shift using overrunning couplings is achieved without the cushioning effect made available by the present invention as the associated friction brake is released.

The disclosed embodiment of the transmission includes also a torque converter controller for a torque converter that has a single converter feed passage and a single converter flow return passage. Such converters are distinguishable from converters of the kind shown, for example, in U.S. Pat. No. 5,305,663 where a converter bypass clutch feed passage acts in cooperation with two other distinguishable feed passages, one acting as a flow return and the other acting as a flow delivery to the torus circuit of the converter. In the case of the converter shown in the '663 patent, continuous flow is achieved through the converter regardless of whether the clutch is engaged or released.

Portions of the clutch strategy of the present invention are common to the teachings of U.S. Pat. No. 5,029,087, issued to Ronald T. Cowan, Roger L. Huffmaster and Pramod K. Jain. As in the case of the converter control of the '087 patent, our present invention includes a controller for continuously monitoring the actual converter slip and comparing that actual value to a desired value. Any error that is detected by the controller will result in calculation of a new target slip. During the engagement time of the converter clutch, the error will continuously change and the magnitude of that error will be continuously monitored. In each instance, a new target slip is calculated. This process continues until the actual slip approaches the target value.

The pressure buildup system includes a variable force solenoid that communicates with a regulated line pressure passage which is pressurized in conventional fashion by a positive displacement pump driven by the engine. The variable force solenoid responds to a control signal developed by the electronic pressure control strategy to produce an output current that makes it possible for the variable force solenoid to develop a pressure which is referred to in this specification as the EPC pressure.

The EPC pressure is distributed to an EPC booster valve which develops a pressure called the EPC boost pressure. That pressure acts on the main regulator valve to change the regulating characteristics of the main regulator valve so that control of the brake and clutch capacity can be achieved for stall conditions for all gear ratios. It is not necessary to provide an additional solenoid to effect changes in the main regulator valve line pressure.

It is possible to calibrate the EPC boost valve in such a way that higher boost pressure in the line pressure circuit can be obtained while providing the optimum line pressure for valve control during normal operations other than stall. The regulator can be calibrated, therefore, to provide appropriate pressure for ratio changes without consideration for the separate calibration that be required to effect an increased servo capacity for stall purposes.

The manual valve that is under the control of the vehicle operator can be shifted to a second ratio position or a low-speed ratio position manually, thereby overruling the automatic upshifts and downshifts that occur when the manual valve is adjusted to the normal automatic drive range position. If there is a failure in the electronic pressure control pressure, the main regulator valve will not lose capacity since provision is made for pressurizing the main regulator valve with the pressure that is developed for purposes of the operation of the transmission in the second drive range or the first drive range.

The pressure boost system is capable of adjusting the capacity of the main regulator valve for both upshifts and downshifts under stall conditions, thereby varying the capacities of the clutches without the need for having conventional accumulators to soften the engagement of the clutches.

The pressure buildup system includes separate solenoid regulator valves. One solenoid regulator valve develops a supply pressure for a pulse width modulated solenoid that is used for the purpose of controlling the converter clutch. The other solenoid regulator valve is used to supply pressure to the on-off solenoids that are used to effect ratio changes. Thus, the input pressure for the on-off solenoids can be reduced. That reduces the cost and increases the reliability of the on-off solenoids for controlling ratio changes. Further, better calibration and control of the solenoids can be achieved if the multiple functions required of the converter solenoid and the on-off solenoid for the shift valves is achieved using independent solenoid regulators.

The improved pressure buildup system of our invention controls the engagement of the reverse clutch by ramping the electronic pressure control pressure by using a clutch pressure reverse modulator. The modulator establishes initially pressures lower than the normal idle line pressure and then ramps the pressure upward to increase clutch capacity without the necessity for providing the usual accumulator assembly with a variable volume and accumulator spring. Engagement of forward drive from park or neutral also is cushioned with an electronic accumulator system without the necessity for using a conventional variable volume accumulator to effect a gradual pressure buildup in the forward engagement clutch.

In the case of a forward engagement, the forward engagement valving includes a clutch pressure modulator valve for forward, which corresponds to the clutch pressure modulator valve for reverse described previously. The valve system for forward engagement provides low pressure values less than normal idle line pressure. The forward drive clutch pressure is gradually ramped up to achieve good engagement quality using the output pressure of the clutch pressure modulator valve for forward. The input to the clutch pressure modulator valve for forward is the electronic pressure control (EPC) made available by the variable force solenoid that is under the control of the microprocessor. As in the case of reverse engagement, the accumulator effect for forward engagement is achieved entirely electronically.

BRIEF DESCRIPTION OF THE DRAWINGS

FIGS. 3b–3e is a schematic valve diagram of the control system;

FIGS. 21 and 21a show the reverse engagement control valve system;

FIG. 27 shows a forward engagement timing diagram.

PARTICULAR DESCRIPTION OF THE INVENTION

General Overview

The electronic control system for the transmission of our invention is a hybrid system wherein solenoids, actuated by an electronic microprocessor, control gear selection, converter clutch operation and system pressure buildup. The friction elements (bands and clutches) are applied and released by hydraulic pressure determined by a hydraulic control unit (main control assembly). This hydraulic control unit contains 4 shift solenoids, shift valves, one variable force solenoid, one PWM-solenoid and pressure modulator valves.

Figure 3A:
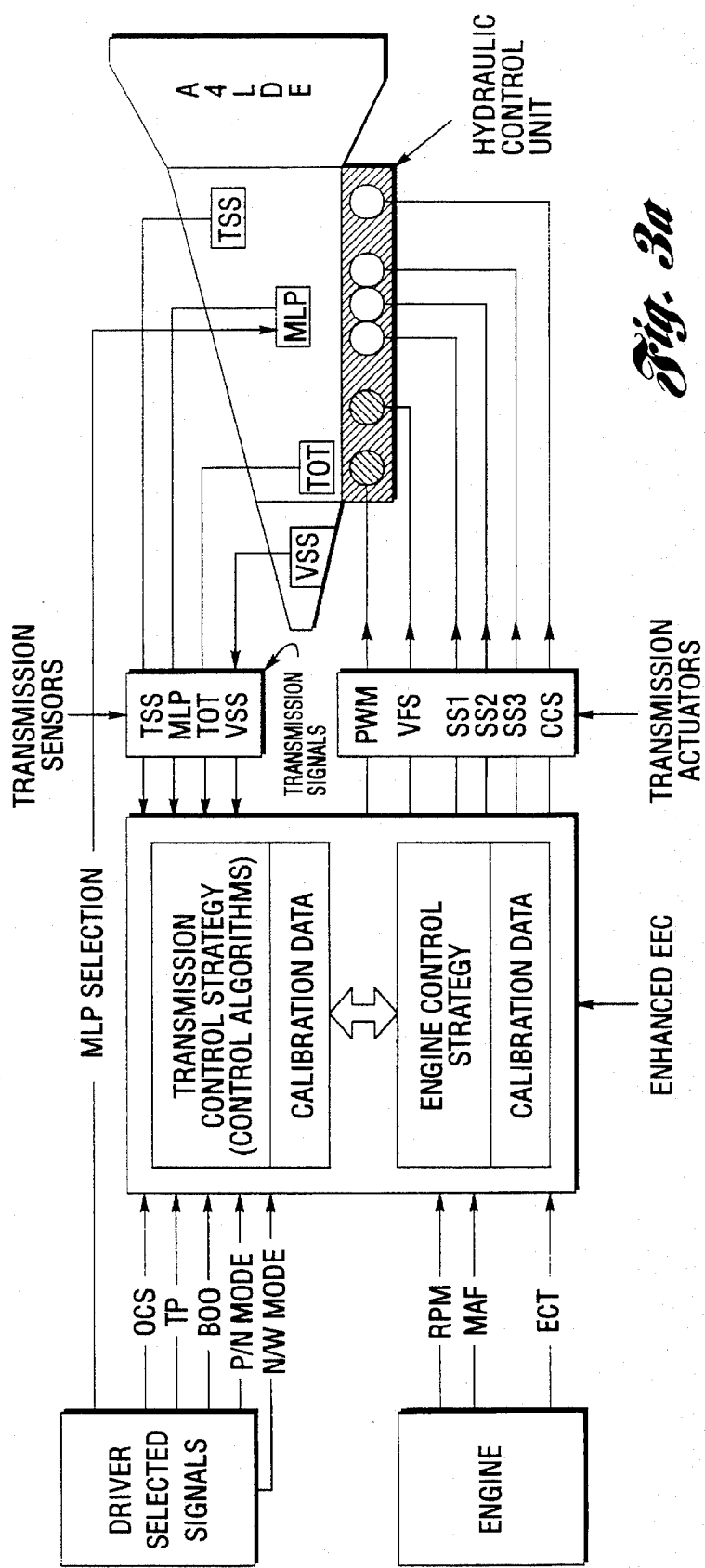
FIG. 3a is a schematic representation of the overall signal flow path for the electronic controller as the transmission control strategy executes control algorithms based on input information from the driver and from the engine itself.

The transmission control strategy is based on various signal inputs generated from the driver, engine and transmission, for each operating condition. FIG. 3a shows a signal flow overview for the transmission. The following signals, as seen in FIG. 3a, are used during execution of the transmission control strategy:

A) Driver
OCS, TP, BOO, P/N Mode, N/W Mode
B) Transmission:
VSS, TSS, MLP, TOT
C) Engine:
N, MAF, ECT.

The control algorithms of the transmission strategy are executed based on the input signals and calibration data during transmission operation. The transmission operation is basically broken down in the following three major events:
1) shifting event
2) clutching capacity determination
3) converter clutch control The following actuators are responsible for execution of these operating events:
  4 ON/OFF solenoids for shifts (SS1–SS4), as seen at 10 in FIG. 3c, 12 in FIG. 3d, 14 in FIG. 3b and 16 in FIG. 3d,
  1 VFS for clutch capacity, as seen at 18 in FIG. 3e,
  1 PWM solenoid for converter clutch control, as seen at 20 in FIG. 3d.

The transmission actuators convert electrical signals generated by the control algorithms into either a hydraulic signal pressure or pressures directly applied to clutches or bands. An assembly of shift and modulator valves are actuated by these signal pressures. Shift valves effect release or application of hydraulic pressure to the torque transmitting elements (clutches and bands). Pressure modulator valves adjust the amount of clutch or brake capacity of the friction elements.

TRANSMISSION HARDWARE OVERVIEW

Transmission Torque Flow

Figure 1:
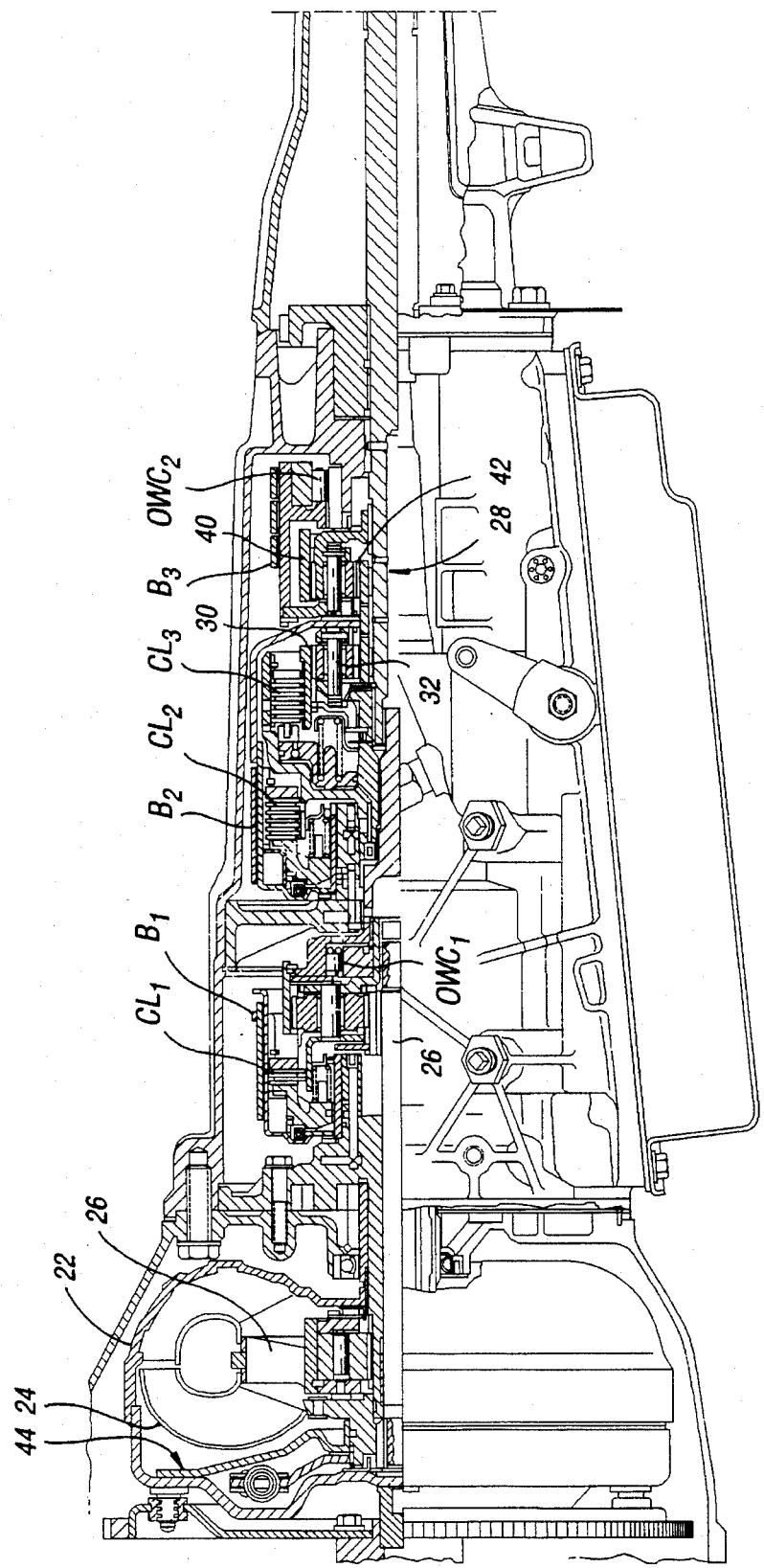
FIG. 1 is a cross-sectional view of a geared planetary transmission adapted to be controlled by our improved control system.
Figure 2:
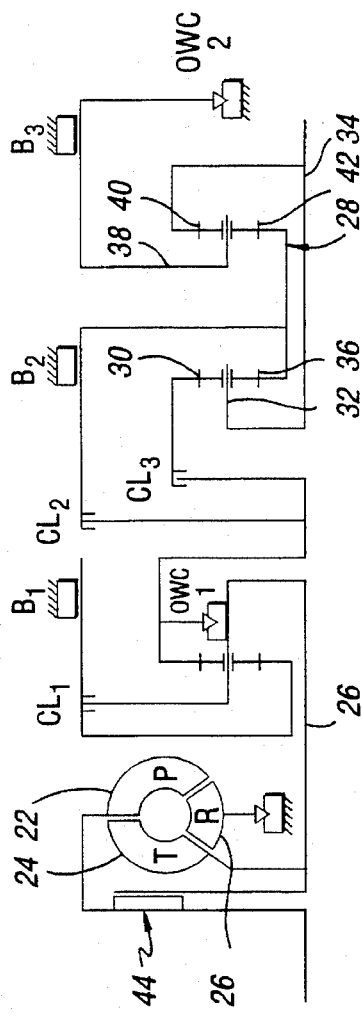
FIG. 2 is a schematic representation of the gearing elements of FIG. 1.
Figure 8:
FIG. 8 is a chart that shows the clutch and brake engagement-and-release pattern for the clutches and brakes illustrated schematically in FIG. 2 as the transmission changes ratio.

The gear set arrangement contains an overdrive planetary gear set connected in series to a Simpson set. FIG. 1 shows the various clutches and bands with conventional abbreviations. FIG. 2 shows, in schematic form, the torque flow paths for the transmission. The clutch and brake engagement and release pattern to effect ratio changes is shown in FIG. 8.

Torque Flow 1st Gear In DRIVE

The engine torque is transmitted to the housing of the torque converter pump or impeller, as shown at 22 in FIGS. 1 and 2. The converter impeller is a centrifugal pump which accelerates the fluid inside of the torque converter towards the turbine blades. The accelerated oil is then decelerated over the turbine blades and the oil at the turbine exit is redirected over the reactor back into the impeller, thereby achieving a torque multiplication effect.

From the input shaft 26, the torque is transmitted to OWC1, which effects a torque reaction in the rotational direction of the engine and overruns in the opposite direction. The engaged clutch CL3 carries torque from the center shaft to the front part of the planetary gear arrangement of the Simpson set 28.

The torque is delivered to the ring gear and is then split into two components. One part is delivered over the planetary carrier to the output shaft 34, which turns in the same rotational direction as the ring gear 30. The sun gear 36 carries the remaining part of the torque in the opposite direction to the rear gear set of the Simpson planetary gear set. The planetary carrier 38 of the rear planetary gear set is held by OWC2. The torque delivered to the sun gear is then transmitted over the planetaries to the ring gear 40, which reduces the velocity and multiplies the torque to the output shaft. This arrangement provides a 2,474 gear ratio.

In coast mode, OWC1 and OWC2 overrun and free wheeling is in effect. The converter clutch stays open until no torque multiplication occurs. It then can be locked afterwards.

Torque Flow: 2nd Gear In DRIVE

The torque flow is the same as in 1st gear except that B2 is applied, as seen in FIG. 8. With the engagement of B2, the speed of sun gear 42 is reduced to zero speed. Here, the brake band (B2) serves as a reaction element for the front planetary gear set and generates an output torque multiplication of 1.474 by holding 0.474 times engine torque as a reaction to the output. The output of the rear planetary gear set is zero since the sun gear has zero speed (see FIG. 2). The converter clutch 44 can be locked or unlocked in 2nd gear depending on the driving condition.

Torque Flow 3rd Gear In DRIVE, Overdrive Cancel Switch=OFF

In 3rd gear, B2 is released and CL2 is applied. The transition from 2nd to 3rd gear must be synchronized since no reaction element is available to hold the CL2 drum when B2 is released. The converter clutch can be locked or unlocked depending on the driving condition. The torque input to CL2 and CL3 is split depending on the gear ratio. CL2 carries 0.321 times engine torque and CL3 carries 0.679 times engine torque. The torque flow to CL2 is the same as in 1st or 2nd gear.

With the overdrive cancel switch turned off, the coast clutch (CL1) is disengaged, i.e., electronically released, and free wheeling takes place since OWC1 overruns in coast mode (see FIG. 2). This is the direct gear with a gear ratio of one. Since the gear change from 2nd to 3rd and from 3rd to 2nd has to be synchronized, more complex control effort is implemented for these gear changes, as will be explained subsequently.

Torque Flow 3rd Gear In DRIVE, Overdrive Cancel Switch=ON

When the overdrive cancel switch is ON, CL1 is hydraulically applied and engine braking takes place in coast mode. CL1 is electronically controlled and hydraulically actuated along with B1 (see FIG. 2 and FIG. 8).

Torque Flow 4th Gear In DRIVE

In 4th gear, B1 is applied and carries −0.25 times engine torque as a reaction to the output. B1 decelerates the sun gear of the overdrive planetary gear set to zero speed and generates an 0.75 gear ratio. An engagement of CL1 is hydraulically inhibited and OWC1 overruns. Since B1 carries 0.25 times engine torque and since the overdrive planetary gear set is an input to the Simpson set, CL2 and CL3 holds three-quarters of total engine torque. The gear ratio is 0.75. The converter clutch can be locked or unlocked based on the driving condition (see FIG. 2.)

Torque Flow 1st Gear In MANUAL Position

In MANUAL1, the torque flow is the same as in 1st gear in drive position except B3 and CL1 are applied, as seen in FIG. 8, to generate engine braking in coast mode. The converter clutch is hydraulically inhibited and cannot be applied electronically. B3 prevents overrunning of OWC2, and CL1 prevents overrunning of OWC1. The gear ratio is 2.474 (see FIG. 2).

Torque Flow: 2nd Gear In MANUAL2 Position

In MANUAL2, the torque flow is the same as in 2nd gear in drive position except CL1 is applied to achieve engine braking in coast mode. CL1 prevents overrunning of OWC1 in power OFF condition. The converter clutch 44 can be applied depending on the operating condition. The gear ratio is 1.474.

Torque Flow: 2nd Gear Plus Overdrive In MANUAL2 Position

The torque flow here is the same as for 2nd gear except B1 is applied. With the engagement of B1, CL1 is hydraulically released and the gear ratio of 1.1 is accomplished. B1 is not hydraulically locked in MANUAL2 position and can be applied and released electronically. This shift arrangement is mainly used for 3-2 inhibition function during MANUAL downshifts.

Torque Flow: REVERSE Position

In REVERSE, torque is delivered over OWC1 and CL2 to the sun gear of the rear planetary gear set. B3 holds the reaction torque, which is−3.11*input torque. With the input through the sun gear and by holding the carrier with B3, the rotational direction of the output ring gear is reversed. The ratio is 2.11. CL2 is not applied in reverse which gives free wheeling in coast mode, allowing OWC1 to overrun. Disconnection of CL2 is required in order to eliminate the hydraulic delay associated with the engagement of CL2 during a static engagement of CL2 and B3. The function during reverse position is to synchronize the engagement of CL2 and B2 during the static engagement event.

Synchronous And Non-Synchronous Shift Control

The transmission has the following shift types embedded in the hardware design:

| Shifts | Non-Synchronous | Synchronous |
|---|---|---|
| 1-2/2-1 | Reaction to Reaction (OWC2 to B2/ B2 to OWC2) | — |
| 2-3 | — | Reaction to Drive (B2 to CL2) |
| 3-2 | — | Drive to Reaction (CL2 to B2) |
| 4-2 | — | Reaction/Drive to Reaction (B1/CL2 to B2) |
| 3-4/4-3 | Reaction to Reaction (OWC1 to B1/ B1 to OWC1) | — |

The shift dynamics of synchronous and non-synchronous upshifts and downshifts now will be described. Pressure control and the resulting torque disturbance are compared for a conventional hydraulic controlled and an electronically controlled system. How the electronic control is accomplished is described subsequently.

Non-Synchronous Upshift Control, 1-2/3-4 Upshifts

All non-synchronous upshifts are reaction to reaction shifts. The 1-2's and 2-1's and the 3-4's and 4-3's are affected. Reaction-to-reaction shifts means that the gear change is executed by two reaction elements. This is only possible when one holding element of a planetary gear set is a one way clutch, which can sense the rotational direction.

As described previously, OWC2 carries the reaction torque in first gear. When a 1-2 upshift is executed, B1 is energized with load and pressure reduces the reaction torque on OWC2. This triggers a negative torque disturbance on the output shaft. The steadily increasing band capacity reverses the output shaft torque at the point where the reaction torque is zero. At this point, the inertia phase is initiated.

Figure 4:
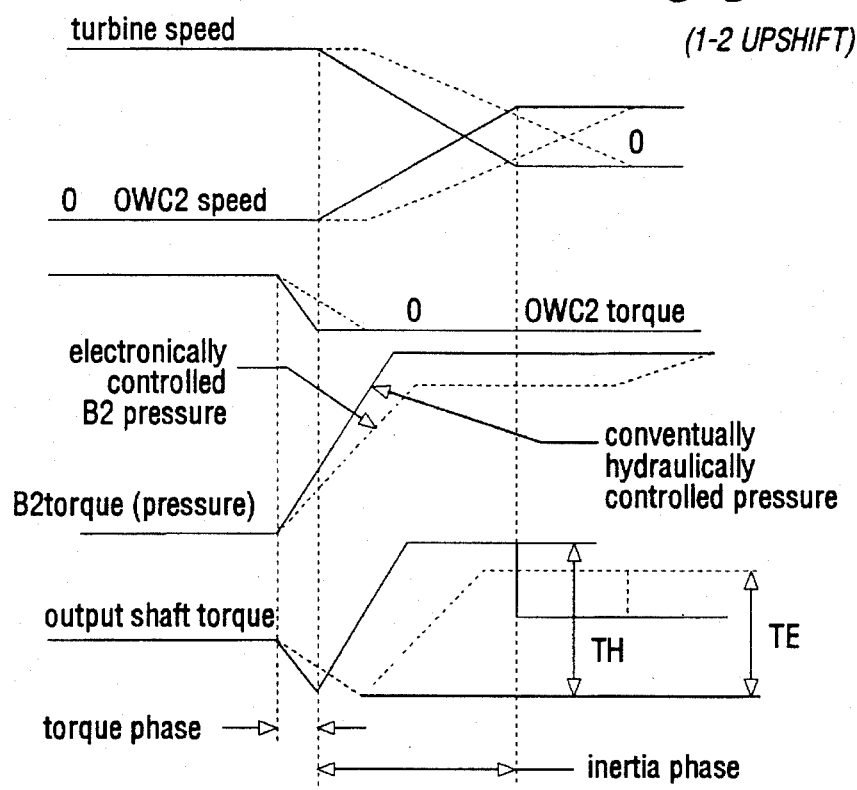
FIG. 4 is a chart showing the relationship between speed and time during a shift interval as well as torque for the transmission components during the shift interval, the shift interval involved being a 1-2 upshift.

FIG. 4 shows in a solid line the torque characteristic of a conventional hydraulically controlled transmission.

1-2 Upshift

At this point, the output torque disturbance rises and is only dependent on the applied pressure control on B2. With conventional hydraulic control, the pressure characteristic cannot be matched to accomplish better shift quality. When the inertia phase is completed, the resulting output torque drops down to the final level. The absolute torque disturbance results in TH (see FIG. 4), which produces poor shift quality.

With electronically controlled pressure characteristic of B2, the absolute torque disturbance can be reduced to the TE level (see FIG. 4) and the sum of the torque disturbances can be minimized. This will give optimal shift quality with controllable slip for lifetime durability. In the case of a 3-4 upshift, torque response characteristic is the same for OWC1 and B1 as for the 1-2 upshift, except that OWC1 is held against the turning driveline. The speed characteristic of OWC1 in this case is the relative speed between the input and output when B1 is applied. The speed difference depends on the gear ratio of the overdrive planetary gear set.

Non-Synchronous Downshift Control, 2-1/4-3 Downshift

Figure 5:
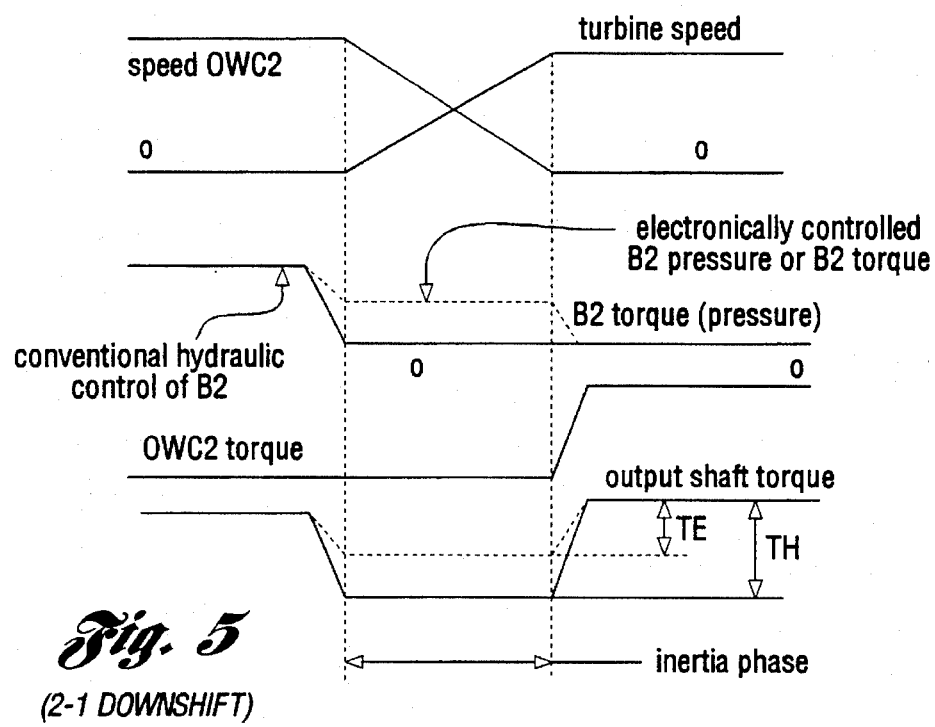
FIG. 5 is a view similar to FIG. 4, but it describes a 2-1 downshift.

During a 2-1 downshift, the pressure on B2 is released. At the point where B2 is disengaged, the relative speeds of B2 and OWC2 are equalized by the engine input torque until OWC2 engages. FIG. 5 illustrates the shift in the shift time domain.

2-1 Downshift

The output torque is proportional to the release pressure of B2. Hence, the output torque follows B2 pressure until it is zero. Once the inertia phase is completed, OWC2 carries the reaction torque in first gear. As seen in FIG. 5, a maximum torque disturbance of TH is present, which results in shift harshness.

An electronically controlled system, as seen in FIG. 5, manipulates the pressure release characteristic of B2 so that a partial torque is always carried during the inertia phase. This reduces the output torque disturbance to TE (see FIG. 5) and reduces the amount of energy absorbed by OWC2. This provides better shift quality and a calibration tool to influence the downshift control.

Synchronous Upshift Control, 2-3 Upshift

Figure 6:
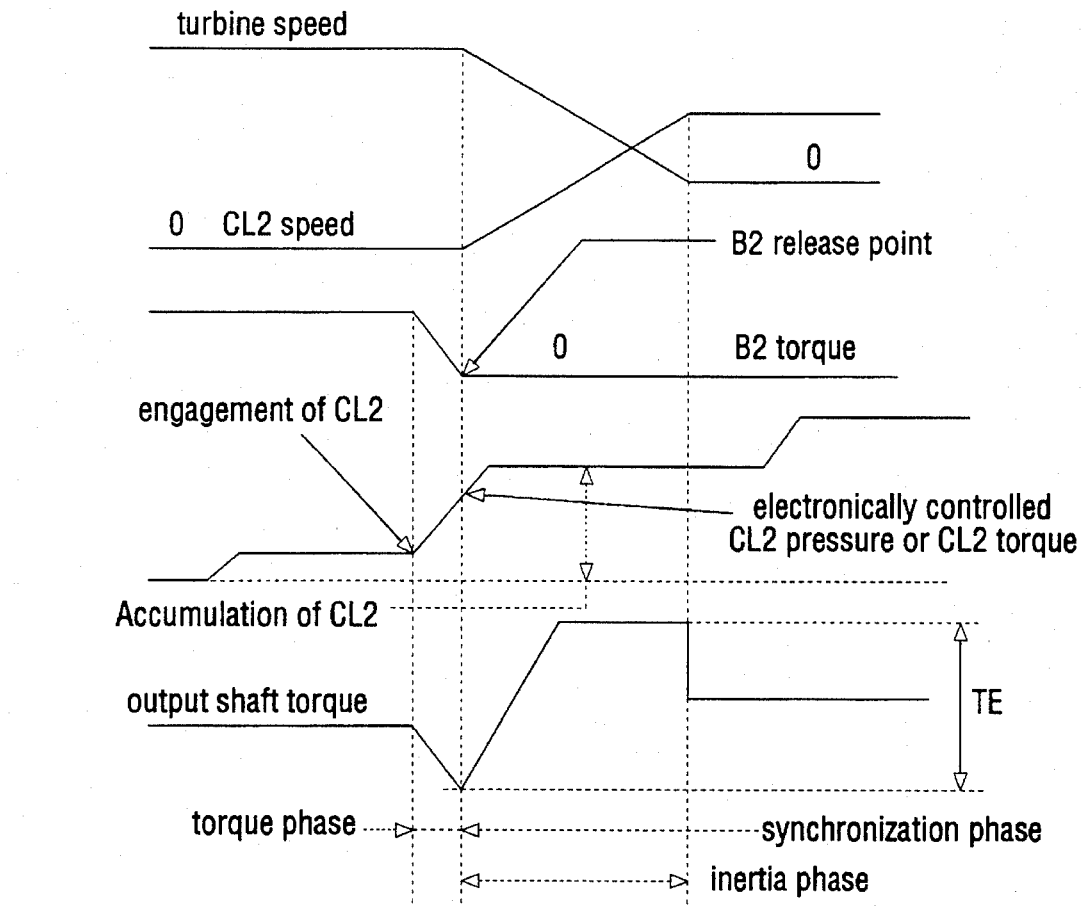
FIG. 6 is a view similar to FIG. 4, but it describes a 2-3 upshift.

The synchronous 2-3 upshift, as seen in FIG. 6, is a reaction to drive shift. Reaction to drive means in this case a gear change from a reaction element to a rotation clutch. The synchronization takes place between the input speed from CL3 of the front ring gear of the Simpson set with the stationary held sun gear connected to CL2. This synchronization event involves the engagement of CL2 and accelerating CL2 to input shaft speed. At the point where CL2 transmits the reaction torque of B2, the brake band 2 has to be disengaged. The timing diagram of FIG. 6 illustrates the synchronization process.

2-3 Upshift

If the 2-3 upshift is not accomplished, capacity loss and engine flair up are the consequences.

With electronic controls applied to this system, the ultimate goal is to influence the pressure profile of CL2 and to synchronize the release of B2 simultaneously. The electronic-hydraulic control system will be explained subsequently.

Here again, the pressure level of CL2 entirely determines the absolute value of the output torque disturbance up to the point where the torque disturbance is completed. Considering the fact that CL2 holds 1* (input torque) in REVERSE position and carries only 0.321* (input torque) during a 2-3 upshift, the clutch CL2 is over-capacitive during a 2-3 upshift. The pressure profile has to be accumulated electronically during the inertia phase to compensate for the over-capacitive clutch CL2. The electronically controlled pressure settings on CL2 control the clutch capacities, and with this the output shaft torque disturbance.

Synchronous Downshift Control, 3-2/4-2 Downshift

Figure 7:
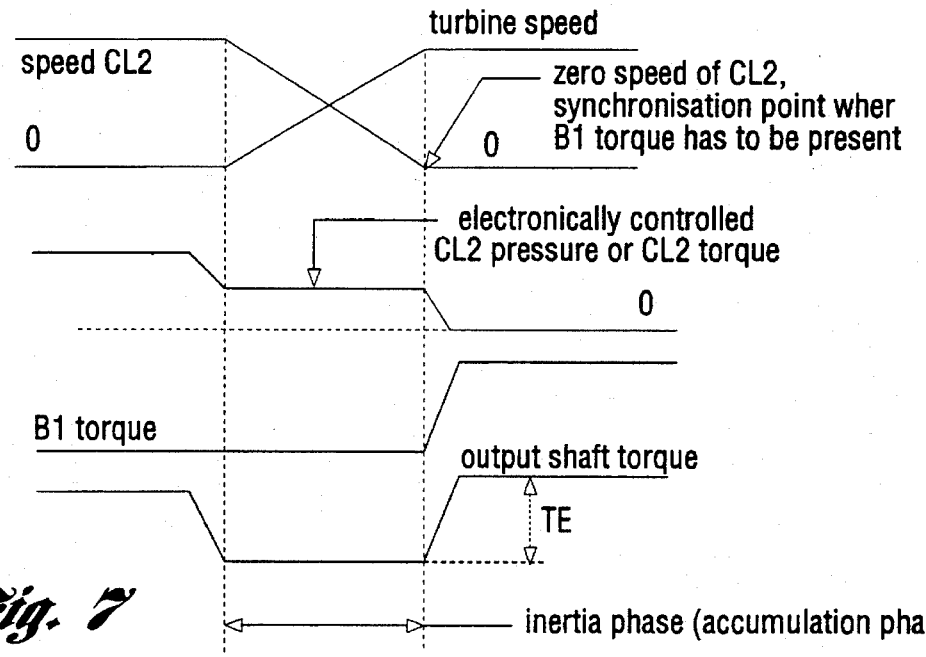
FIG. 7 is a view similar to FIG. 4, but it describes a 3-2 downshift.

The synchronous 3-2/4-2 downshift is a drive to reaction shift. Drive to reaction means that the gear change is executed from a rotating clutch to a reaction element. In this case, CL2 is released, which rotates with 1* (input speed) in 3rd gear and 1.33* (input speed) in 4th gear, and B2 is applied. The synchronization involves the engagement of B2 at the point when CL2 drum speed is zero speed. FIG. 7 illustrates this condition.

If the synchronization point is not met, engine flair up and capacity loss occurs.

The electronic controls have to synchronize the release of CL2 and the apply of B2 at zero speed of CL2 and also control the CL2 pressure profile. This minimizes the torque disturbance of the output until the reaction element B2 takes over. During this accumulation phase, the CL2 torque level has to be slightly higher than input torque*ratio. This reduces the absolute torque disturbance TE to a minimum.

The electronic accumulation of the CL2 release and the synchronization control system is described later.

Electronic-Mechanical Interface

FIG. 8 shows the functional matrix of the transmission. This functional matrix represents the active solenoid stages dedicated to the gears and the manual lever positions. The significance of this matrix is shown by solenoid stages used in "DRIVE" position.

Manual Lever Position: DRIVE

Figure 3B:
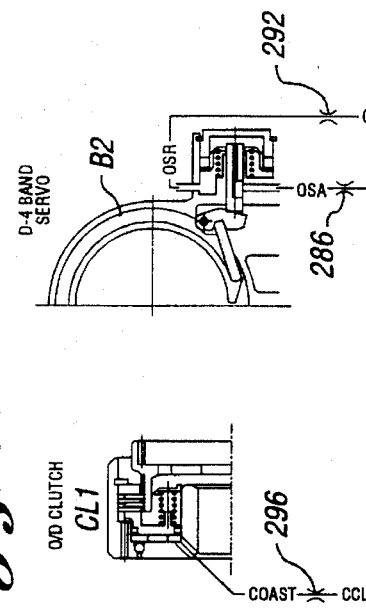
Figure 3B:
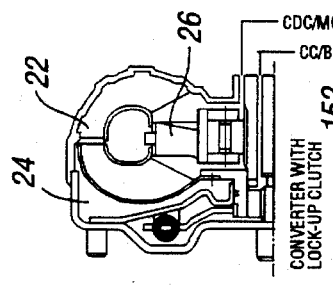
Figure 3B:
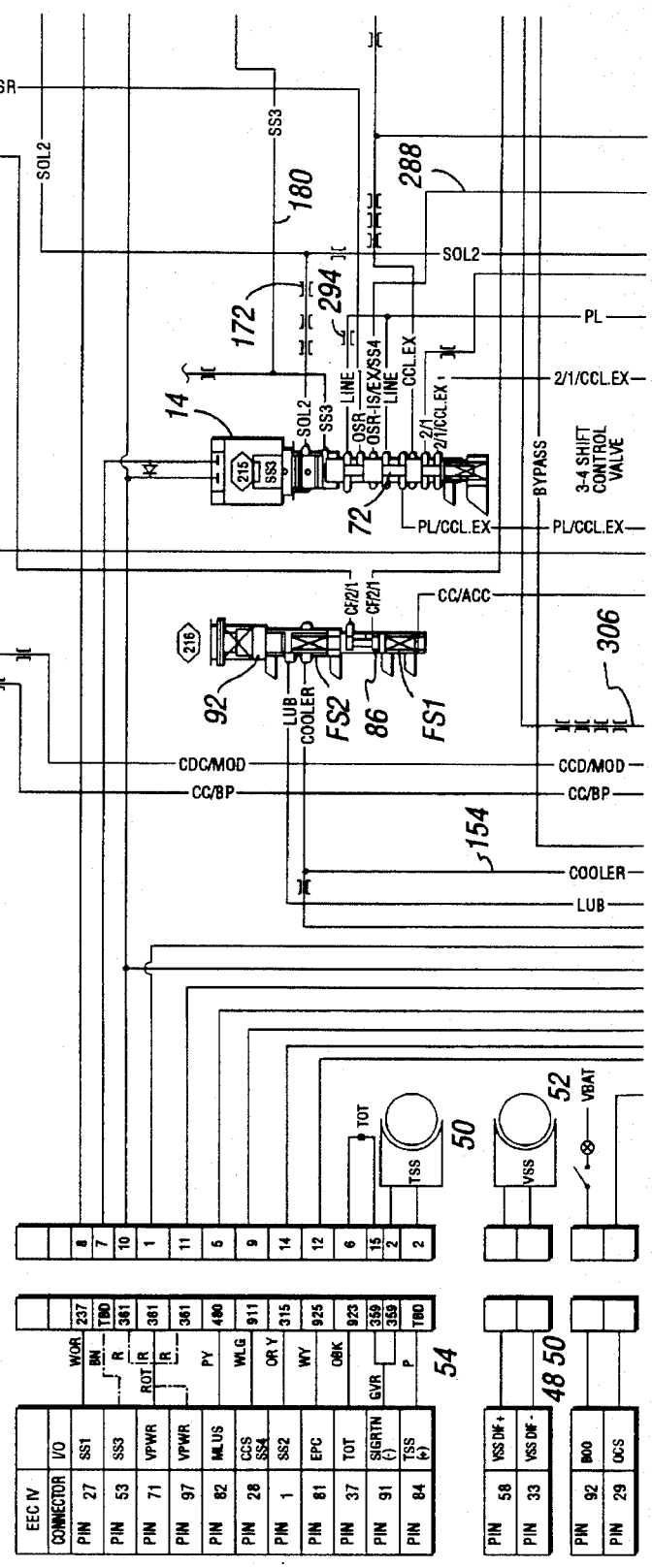

First of all, when the overdrive cancel switch 50, shown in FIG. 3b, is turned on or off, CL1 is applied or released. With ODC=ON, CL2 is applied and the 4th gear is electronically inhibited with engine braking in 3rd gear. For this operation, one single solenoid only has to be dedicated, which is SS4.

For the remaining electronic-mechanical interface, the following facts have to be considered:
A) One solenoid stage is needed for each gear (1st, 2nd, 3rd and 4th).
B) There are two intermediate stages (IS1, IS2), which are used for controlling the synchronous 3-2/4-2 downshifts.
C) One of the intermediate steps (IS1) is used for the synchronization of the 2-3 upshifts.

Hence, seven solenoid stages are required. In order to realize seven solenoid stages, three ON/OFF solenoids are needed. The ON/OFF solenoids are SS1, SS2, and SS3, as seen in FIGS. 3b and 3d.

The PWM-solenoid 20 in FIG. 3d is dedicated, independently to the shift solenoids, for converter clutch control and can be actuated in each gear in MAN2 and DRIVE position. With the solenoid configuration shown in FIG. 8, the gear selection and gear change as described above are realized.

The hydraulic control system of FIGS. 3a–3e is designed according to the above described electronic-mechanical configuration. Each single solenoid stage is described subsequently along with the control strategy.

Manual Lever Position: MAN1/MAN2

In MAN2 position (see FIG. 3e), two different gear selections are possible; i.e., second gear and second gear plus overdrive. Second gear is hydraulically locked and is independent of the solenoid stages in first and second gear. Second gear plus overdrive is electronically controlled. B1 can be applied or released with SS3, shown at 14 in FIG. 3b.

In MAN1 position, all shown gears (1st, 2nd and 2nd+OD) are electronically controlled. Due to hydraulic design requirements, the solenoid stage in 2nd gear is different than the 2nd gear stage in DRIVE position. The solenoid stage for 2nd gear+OD is the same as in MAN2 position.

The additional solenoid stages and gear selections are needed to achieve an electronically controlled 3-2 inhibition function in MAN2 and a 3-2/2-1 inhibition function in MAN1 position with engine braking in each gear.

Manual Lever Position: PARK, REVERSE., NEUTRAL

In PARK, REVERSE and NEUTRAL position, only one solenoid stage is used, which is the first gear state. This solenoid stage is used also for static engagement control into PARK and REVERSE. The layout of the engagement control system is therefore designed without the requirement for changing solenoid stages. This simplifies the hydraulic control system significantly for static reverse and forward engagements.

Sensors And Actuators

There is a distinction between driver actuated sensors and sensors which determine the transmission status. The signals are used by the control algorithms in the EEC module for decision making. Based on the signals, the control algorithms decide how the transmission actuators are applied to achieve the desired operating mode of the transmission. Further, several engine sensors are used for determining several input parameters for the transmission, such as the engine speed (RPM), engine torque (MAF) and engine coolant temperature (TOT), as seen in FIGS. 3a and 3b.

Driver Actuated Sensors

Manual Lever Position Sensor

The manual lever position (MLP) sensor is mounted on the outside of the transmission. It determines the neutral/park start switch function and senses the lever position using a resistance network (see FIG. 8). The neutral start switch function allows the engine to start only in neutral or park position. The resistance network is responsible for sensing the selection of the lever position, which is actuated by a mechanical linkage.

The transmission contains six lever positions. The seventh position is the overdrive position, which is canceled or enabled by the overdrive cancel switch. The control strategy is loaded in a register called PDL with a number 1 through 7, depending on the manual lever position and the state of the overdrive cancel switch. The following chart illustrates this:

| Manual Lever Position (6 position) | State of Overdrive Cancel Switch | Value of PDL REGISTER |
|---|---|---|
| PARK | — | 7 |
| REVERSE | — | 6 |
| NEUTRAL | — | 5 |
| DRIVE | OFF | 4 |
| DRIVE | ON | 3 |
| MANUAL2 | — | 2 |
| MANUAL1 | — | 1 |

The following control strategies use the MLP signal:
Distinguishing between automatic and manual control algorithms,
Static engagement control system,
Manual upshifts and downshifts.

Throttle Position Sensor (TP)

The throttle position sensor is a potentiometer which senses the throttle movement of the driver. This signal represents the performance desires of the driver.

TP is used for following control strategies:
shift control to determine the desired gear from functions TP versus VS,
Converter clutch control to determine the desired converter clutch engagement from functions TP versus VS,
Determination of throttle angle rates for converter clutch control (unlock converter clutch for tip-in or tip-out condition),
Determination of dynamic EPC (Electronic Pressure Control) for clutch capacities during a shift.

Overdrive Cancel Switch (ODC)

The overdrive cancel switch 50 in FIG. 3b indicates that the driver does not want to shift into top gear (4th gear) automatically. When the overdrive cancel switch is enabled, fourth gear is inhibited by the shift control strategy and CL1 is engaged to provide engine braking in third gear. As stated above, the PDL register, representing the MLP, is set to 3.

Brake ON/OFF Switch (BOO)

The brake ON/OFF switch 48 (see FIG. 3b) senses the brake actuated by the driver. This signal is used by the converter clutch control strategy to unlock the converter clutch when the brake is applied.

P/N-Mode Switch

This switch, seen in FIG. 3a, is used for selection between a "NORMAL" mode shift pattern and a "PERFORMANCE" mode shift pattern. The shift control strategy uses this signal to distinguish between performance and normal mode.

Transmission Sensors

Turbine Speed Sensor

The turbine speed sensor 51, seen in FIG. 3a, senses the input speed of the transmission. The turbine speed sensor is a variable reluctance type of sensor. The trigger wheel generating the signal at the sensor is welded on the overdrive carrier and has 8 teeth. The overdrive carrier is splined into the input shaft. The sensor has the following characteristic data:
min detectable signal: 150 RPM with +/−340 mV amplitude
maximum signal allowed: 7000 RPM with +/−90 v amplitude.

Figure 9:
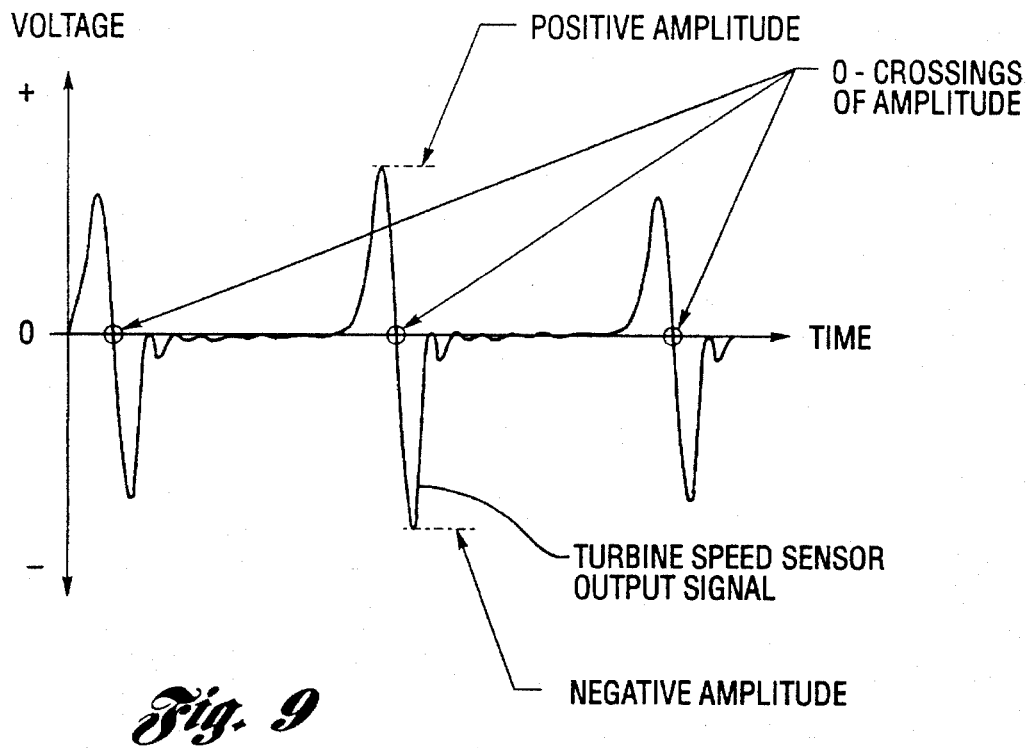
FIG. 9 is a chart showing the output signal of the turbine speed sensor used in the control strategy.

FIG. 9 shows the turbine speed output signal. The control strategy senses the zero crossings of the amplitude and calculates the frequency of this signal.

The turbine speed signal is used for the following parts of the control strategy:
Determination of the converter clutch slip,
Determination of speed ratio and torque multiplication of torque converter,
Determination of "start" of a static engagement for clutch capacity control during an engagement event.

Vehicle Speed Sensor (VSS)

The vehicle speed sensor, shown at 52 in FIG. 3b, is a variable reluctance type of sensor. It is mounted on the output shaft. Using this signal, the vehicle speed is inferred from the dynamic rolling radius (depending on tire size) and the rear axle ratio.

The control strategy uses the VSS as follows:

Shift control to determine desired gear from functions of TP versus VS,

Converter clutch control to determine the desired converter clutch engagement from the functions of TP versus VS, Determination of vehicle acceleration and deceleration rates for shift control in coast mode.

Transmission Oil Temperature Sensor (TOT)

The TOT sensor, as shown at 54 in FIG. 3b, is a thermistor which varies its resistance with temperature. The characteristic is according to a NTC-thermistor (NEGATIVE TEMPERATURE COEFFICIENT), which means low temperature has high resistance and high temperature has low resistance. The control strategy uses TOT for the following purposes:

Compensation of shift quality by adjusting clutch capacity for changes in oil viscosity, Compensation of shift pattern for cold temperatures, Enable or disable converter clutch control depending on a temperature threshold, Compensation of converter clutch engagement schedule for high transmission oil temperatures.

Engine Sensors Used For Transmission Purposes

Engine Speed Sensor (N)

The engine speed sensor senses crankshaft speed and is mainly used for engine purposes. The transmission control strategy uses engine speed for the following operating modes:

Wide open upshifts are executed in dependence on N,

Determination of absolute slip across the torque converter,

The clutch capacity for a static engagement is determined by functions N versus EPC.

Mass Air Flow Sensor (MAF)

The mass air flow sensor is mounted on the intake manifold of the engine. It monitors the amount of air consumed by the engine. Since the air mass is proportional to the engine output torque, this signal is used along with engine speed to determine the torque generated by the engine from tables of engine speed versus air mass.

The calculated output torque is loaded into a register called TQ_BAR and is manipulated via a separate control strategy by air/fuel ratio, spark, engine friction, accessories and air conditioning to get the net input torque to the transmission. This control strategy is called "Real Time Torque" calculation.

The value loaded into the TQ_BAR register is used in the transmission strategy to calculate the required clutch capacities.

Transmission Actuators

In general the transmission actuators like SS1, SS2, SS3, SS4, VFS1 and pWM-solenoids of FIGS. 3c, 3b, 3d and 3e at 10, 12, 14, 16, 18 and 20, respectively, transform electrical signals applied to a component by the control strategy into hydraulic pressure. The electrical signals for the actuators are the outputs of the control algorithms. The generated output pressure is used to either actuate shift valves or are used as signal pressures for regulator valves.

4 Shift Solenoids (SS1,SS2,SS3,SS4)

Figure 10:
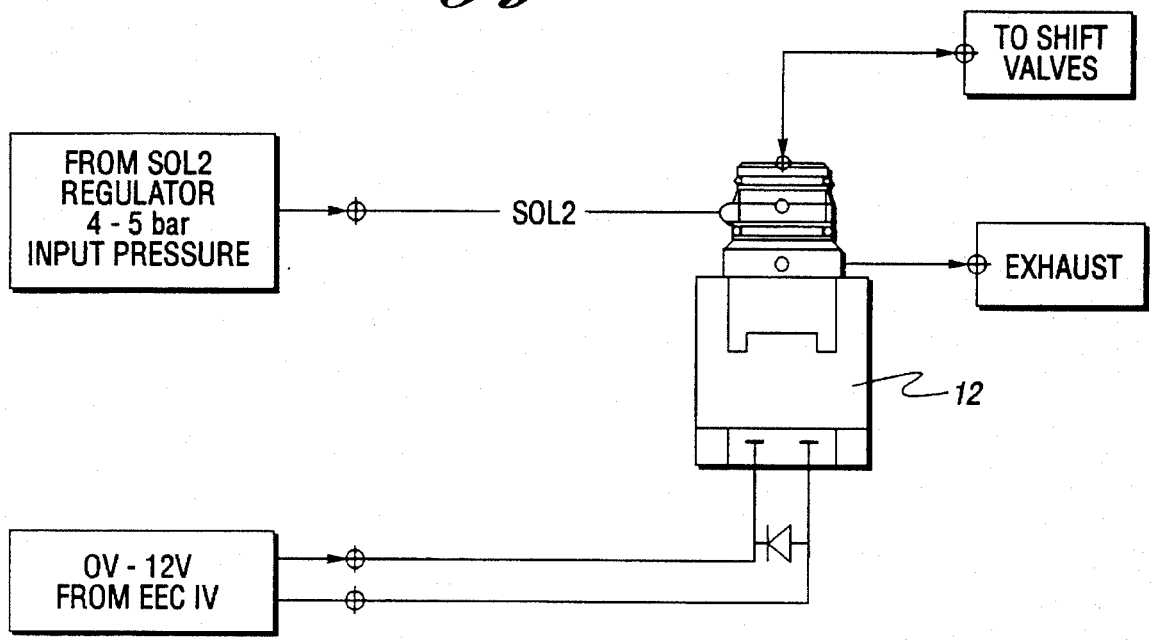
FIG. 10 shows the shift solenoids and their relationship to the other elements of the valve system.

The shift solenoids are used to transform a 0–12 V electrical signal into a 0–5 bar output pressure (see FIG. 10). The solenoids are normally closed, which means when no voltage is applied, the pressure to the shift valves is released and the input pressure (SOL2) is sealed against exhaust. The input pressure to solenoid 12 in FIGS. 3d and 10 is SOL2 pressure and is regulated between 4–5 bar. This will be explained subsequently. When the 12 v are applied, SOL2 pressure is released to the shift valves and sealed against the exhaust port.

Variable Force Solenoid (VFS)

The variable force solenoid at 18 in FIG. 3e transforms a 0–1 AMP current into a 0–6 bar output pressure. The output pressure is called EPC (Electronic Pressure Control) and is applied as a signal pressure to regulator and modulator valves. The regulator and modulator valves generate the required clutch pressure and clutch capacity. The digitally calculated EPC-pressure from the control strategy is converted by a solenoid driver circuitry into a 0–1 ampere signal. For failure mode reasons, the transfer function is laid out to have at 0 ampere maximum pressure (see FIG. 12b). The input pressure to the VFS can be either line pressure from 4–22 bar or a regulated SOL1 pressure from 4–8 bar. Due to a hydraulic feedback applied to the VFS, the variable input pressure does not influence the output pressure characteristic (see FIG. 12a).

Pulse Width Modulated Solenoid

Figure 11A:
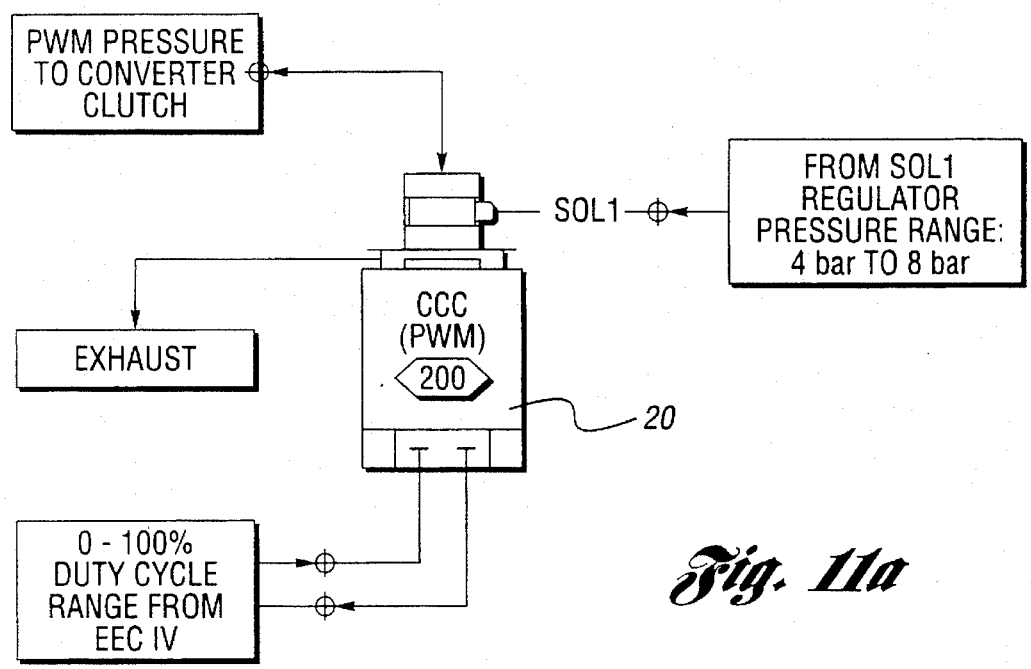
FIG. 11a shows the pulse width modulated solenoid for developing a pulse width modulated pressure in the converter.
Figure 11B:
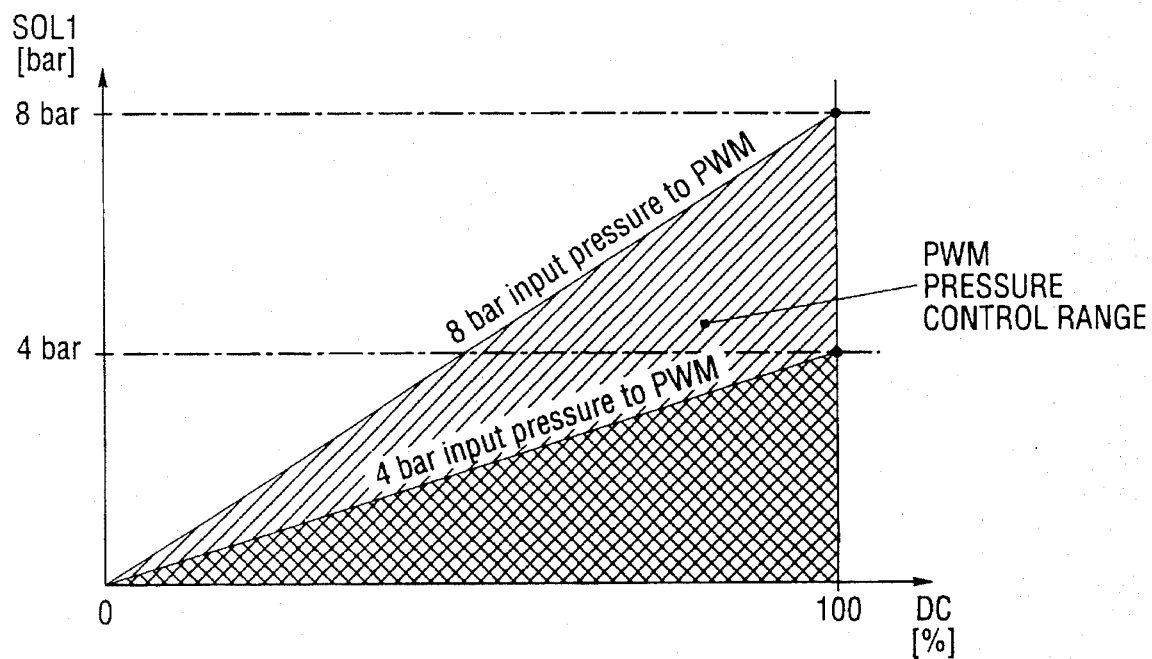
FIG. 11b shows the characteristics of the pulse width modulated solenoid of FIG. 11a where pressure is plotted against duty cycle.

The transmission uses a PWM solenoid, shown at 20 in FIG. 3d and in FIG. 11a, for converter clutch control. The PWM solenoid converts a percentage duty cycle into a pressure characteristic (see FIG. 11B). A 0–100% duty cycle is applied to the solenoid. The input pressure is a regulated pressure from 4–8 bar called SOL1 pressure. Zero % duty cycle releases the converter clutch pressure to exhaust and a 100% duty cycle allows 8 bar and 4 bar to be applied to the converter clutch. A duty cycle within between 0% and 100% produces a pressure characteristic as shown in FIG. 11B.

The duty cycle frequency is 40 Hz. The percentage duty cycle is calculated by the converter clutch control strategy to adjust a desired slip value across the torque converter. A solenoid driving circuit converts the calculated value into an actual duty cycle.

CONTROL STRATEGY OVERVIEW
(SOFTWARE)

General

The transmission control strategy contains a set of modules which are distinct and independent. Each set contains a specific function. These modules are designed according to the characteristics of the transmission hardware and are structured as follows into three basic modules:

A) SHIFT MODULE

B) EPC MODULE

C) CONVERTER CLUTCH CONTROL MODULE. The control strategy contains transmission calculations derived from the sensors to support the execution of each module.

All three modules have sub-modules according to sub-functions.

Important Transmission Calculations

Figure 13:
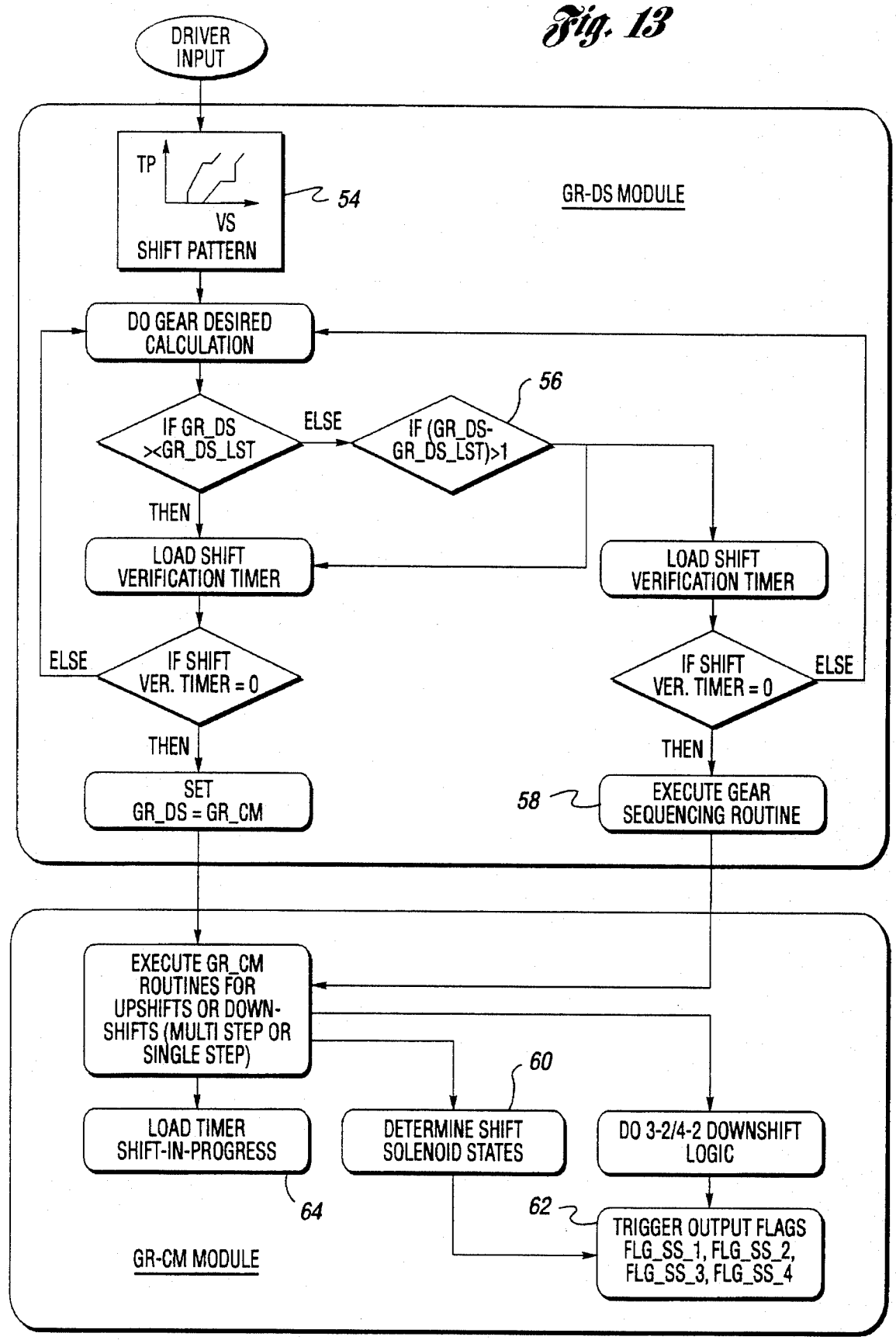
FIG. 13 is a flow diagram illustrating the functions that occur during performance of the upshift or downshift logic.

—PCSFTCMPT=percentage shift complete
This calculates the percentage of the gear ratio depending on the old gear and the commanded gear.
—PCSFTCMPT=(RT_TRANS-GRRAT[GR_OLD])/(GRRAT[GR_CM]—GRRAT[GR_OLD])
RT_TRANS=current calculated gear ratio
GRRAT=gear ratio in each gear
GR_CM=commanded gear
GR_OLD=old gear
—RT_TRANS=instantaneous calculated gear ratio
RT_TRANS=NT/NO
NT=turbine speed
NO=output shaft speed
—SLIP_ACT=actual slip across the torque converter
—SLIP_ACT=N-NT
NT=turbine speed
N=engine speed
—SPD_RATIO=speed ratio across the torque converter
—SPD_RATIO=NT/N
—ERR_TO=error between actual slip and desired slip. This value is used to determine the proportional, derivative and the integral gains of the PID controller
ERR_TO=SLIP_DES-SLIP_ACT
SLIP_DES=desired slip value across the torque converter Shift Module The shift module contains two major component modules, as seen in FIG. 13, which are the commanded gear module and the desired gear module. The desired gear module contains the shift verification algorithms, whereas the commanded gear module contains the algorithms for execution of a shift via the solenoid stages. The commanded gear module effects all the shift solenoid timing to execute synchronous/non-synchronous up- or down shifts.

Desired Gear Module

The desired gear module has three sub modules which are:

A) shift verification timer
B) desired gear calculation
C) gear sequencing calculation.

The major output of this module is the desired gear register GR_DS which represents the desired gear selected by the driver. The desired gear is calculated, as seen at 54 in FIG. 13, based on shift curves TP vs. VS with the desired gear calculation module. During this calculation procedure, a shift verification time is loaded whenever GR_DS is changed. When the driver desires multi-step upshifts or downshifts, another register holds the previously desired gear, which is GR_DS_LST. When the difference between GR_DS and GR_DS_LAST is greater than 1, as indicated at 56 in FIG. 13, a multi-step upshift is desired. Accordingly, if the difference is smaller than 1, a multi-step downshift is desired. If a multi-step upshift is desired and the shift verification timer is expired, the gear sequencing calculation at 58 in FIG. 13 determines in which sequence the gears are executed. The shift verification timer is always reset when GR_DS has changed. In this module, it will also be determined whether the driver desires an upshift or a downshift.

Gear Commanded Module

The gear commanded module seen in FIG. 13 actually executes the desired gear. When the shift verification time is expired, the content of the GR_DS register will be loaded into the gear commanded register GR_CM. The gear commanded module has five major sub-modules for automatic upshifts with PDL register loaded with either 3 or 4 (excluding the manual shifts which are handled later in this disclosure):

A) gear commanded module for automatic upshifts
B) gear commanded module for automatic downshifts
C) determine shift solenoid states module
D) 3-2/4-2 downshift control module
E) shift-in-progress time calculation module.

In the automatic upshift and downshift modules, the shift sequencing times are determined for multi-step upshifts and downshifts. Depending on which value the GR_CM contains, the shift solenoid states are calculated by the shift solenoid state module at 60. The outputs of the shift solenoid state module are the shift solenoid flags FLG_SS_1, FLG_SS_2, FLG_SS_3 and FLG_SS_4, as seen in FIG. 13 at 62. These flags determine which solenoids are energized or de-energized depending on the type of shift. At the point where the gear is commanded, a shift-in-progress time is loaded into a register called TM_SFT_IN, as indicated at 64 in FIG. 13. This shift-in-progress time is used to hold the dynamic EPC values when a shift is still in progress. This is explained subsequently. The 3-2/4-2 downshift control module executes the synchronous 3-2/4-2 downshift with the solenoid timing involved for a successful completion. This operation is unique for the transmission and will be explained later.

FIG. 13 shows the strategy for execution of both upshifts and downshifts.

EPC Module

The EPC module is responsible for calculating the clutch capacities under all driving conditions. The output register of the control algorithms is called TV_PRES. As outlined above, the calculated EPC value, which is loaded into the TV_PRES register, is converted by the driver circuitry into 0–1 ampere current. This current is applied to the VFS and transformed to an output pressure proportional to the current. The output pressure of the VFS, shown at 18 in FIG. 3e, controls modulator and regulator valve systems connected to clutches and bands. The pressure output of the regulating devices represent the clutch capacities. A detailed description of the pressure buildup system is outlined below). The EPC module is also subdivided into several modules. The sub modules are as follows:

A) Stall/Engagement module
B) Coast Boost Module
C) Normal EPC Calculation
D) EPC Dynamic Calculation
E) TQ_IALPHA Calculation.

A) Stall/Engagement Module

The stall/engagement module calculates the required EPC values for stall and static engagement conditions. Stall conditions means that the torque converter is operated under torque multiplication condition and higher clutch capacities have to be applied. Stall condition is determined by calculating the speed ratio across the torque converter. With the speed ratio value, the torque multiplication factor is determined depending on the torque converter design. Torque multiplication is eliminated by the strategy when a certain speed ratio or a threshold vehicle speed has been reached.

The engagement control logic involves the static engagement of the forward clutch (CL3) in manual lever position "DRIVE". In manual lever position "REVERSE", the high clutch (CL2) and the rear servo (B3) must be engaged.

In general, four different engagements are possible, which are drive to reverse, reverse to drive, neutral to reverse and neutral to drive. The engagement control system is entirely dependent on the state of the PDL register, which represents the MLP position and the action of the driver (refer to FIG. 14). When an engagement is executed, a BLIP timer is loaded and a special "BLIP"—EPC value is set. When the blip-timer is expired, an ENGAGEMENT timer is loaded and an EPC ramp is executed. The starting and finishing points of the ramp are functions of engine RPM. The engine rpm has been captured at the point where the PDL register has sensed an engagement. When the engagement timer is expired, the EPC value is adjusted to the required value.

Figure 14:
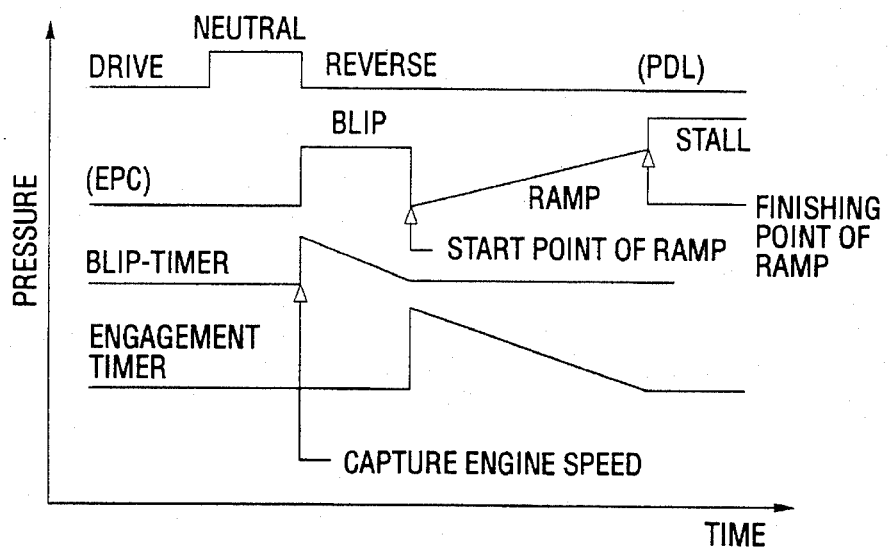
FIG. 14 shows the relationship of pressure over time during an engagement interval.

FIG. 14 illustrates the execution of an engagement from drive to reverse.

B) Coast Boost Module

The coast boost logic calculates the EPC settings in all manual positions in "power off" mode with the overdrive cancel switch turned off. This would be in PDL positions 1, 2 and 3. The coast boost logic provides enough pressure in coast mode to apply the coast clutch (CL1) during a manual lever position change from 4 to either 1, 2 or 3. The coast clutch is a rotating clutch and needs specific pressure settings in power off mode for an engagement due to centrifugal force influence on the clutch. The coast boost logic provides individual functions, EPC rs. VS (vehicle speed), for each affected manual position for the coast clutch. A reliable engagement of the coast clutch is required to get engine braking in all manual lever positions lower than 4.

C) Normal EPC Calculation

This module calculates the required EPC values to satisfy static capacity requirements during a shifting and non-shifting event. The clutch capacities for the transmission are determined as follows:

For the forward clutch (CL2) and high clutch (CL3), the clutch capacity is determined as follows:

$$MK = ([P * AK - FS] * RM * 2 * N * \mu)/RT, \text{ where:}$$

($\mu$=coefficient friction constant)
MK=clutch torque
P=applied pressure
FS=total spring load of clutch
RM=friction radius
N=number of plates, and
RT=transmission ratio.

For the overdrive band (B1), the deenergized band capacity formula is valid:

$$MB = ([P * AB - FS] * [1 - e^{-\mu * a}] * IH * RM)/RT$$

For the intermediate band (B2) the energized band capacity formula is valid:

$$MB = ([P * AB - FS] * [e^{\mu * a} - 1] * IH * RM)/RT, \text{ where}$$

MB=band capacity
AB=area of servo applied to the band
a=wrap angle, and
IH=lever ratio.

The relationship of clutch capacity (MB, MK) to the applied pressure P is linear. The coefficient of friction constant is different for a shifting event and for a non-shifting event. The normal EPC calculation module expresses clutch capacity in linear dependency on pressure P. The required amount of EPC pressure is equivalent to the pressure P and is derived from the above equations as follows:

$$EPC(P) = TQ\_BAR * SLOPE + INTERCEPT$$

The slope and intercept values represent the geometrical conditions of each element. The pressure P and the signal pressure EPC represent the amount of pressure required to produce a certain clutch capacity. TQ_BAR is the input torque applied to the clutch. It has to be equal to generated clutch torque MK and MB. The normal EPC module calculates for each gear, with a dedicated slope and intercept, the capacity required. When a shift is taking place, separate slopes are used for each shift since the coefficient of friction is different compared to a statically held clutch. The calculated value is then loaded into the TV_STAT (EPC static register) register. When no shift is taking place, the value of the TV_STAT register is transferred to the TV_PRES register, and finally applied to the VFS with an equivalent current.

D) Dynamic EPC Calculation

The dynamic EPC module calculates additional EPC pressure applied to the clutch during a shifting event. This additional EPC pressure is a calibration tool to optimize the amount of capacity required during a shift, and hence to obtain good shift quality. The dynamic EPC is loaded into a register called TV_DYN. During a shift, TV_DYN and TV_STAT are added and loaded into the final register TV_PRES.

E) TQ IALPHA Calculation

The TQ_IALPHA module calculates the amount of inertia torque present during each shift. This calculation takes all rotating masses into account. These have to be accelerated or decelerated during an upshift or downshift. The amount of inertia torque calculated is added to the input torque TQ_BAR and converted by the normal EPC calculation module into pressure settings.

Converter Clutch Module

The converter clutch module is dedicated to control the converter bypass clutch. The major output register is the bypass clutch duty cycle called BCSDC. This duty cycle is applied to a PWM-solenoid, which converts the duty cycle signal into an output pressure (see FIG. 11b). The converter clutch module is sub-divided in the following major sub-modules:

A) lockup/unlock shift schedule
B) hot lockup shift schedule
C) scheduled bypass clutch slip
D) torque feed forward system modulation over a shift F) unconditionally unlock module.

A) Lockup/Unlock Shift Schedule

This module contains a shift pattern TP vs. VS to lock or unlock the converter bypass clutch in each gear. Based on these shift curves, the converter clutch can be locked in 2nd, 3rd and 4th gear.

B) Hot Lockup Shift Schedule

The converter clutch shift schedule can be modified when the transmission oil temperature (TOT) has exceeded a certain value. An open torque converter can contribute to excessive heat generation under heavy driving condition. In order to prevent overheating of the torque converter and the transmission, the converter can be locked at earlier vehicle speeds.

C) Scheduled Bypass Clutch Slip

This module determines the "TARGET" bypass clutch slip values depending on the driving condition. It loads the target slip values into a register called SLIP_TRG_S. The target slip value is then used to PID (proportional, integral, derivative) control the actual slip, SLIP_ACT, to the target value.

D) Torque Feed Forward System

Figure 15:
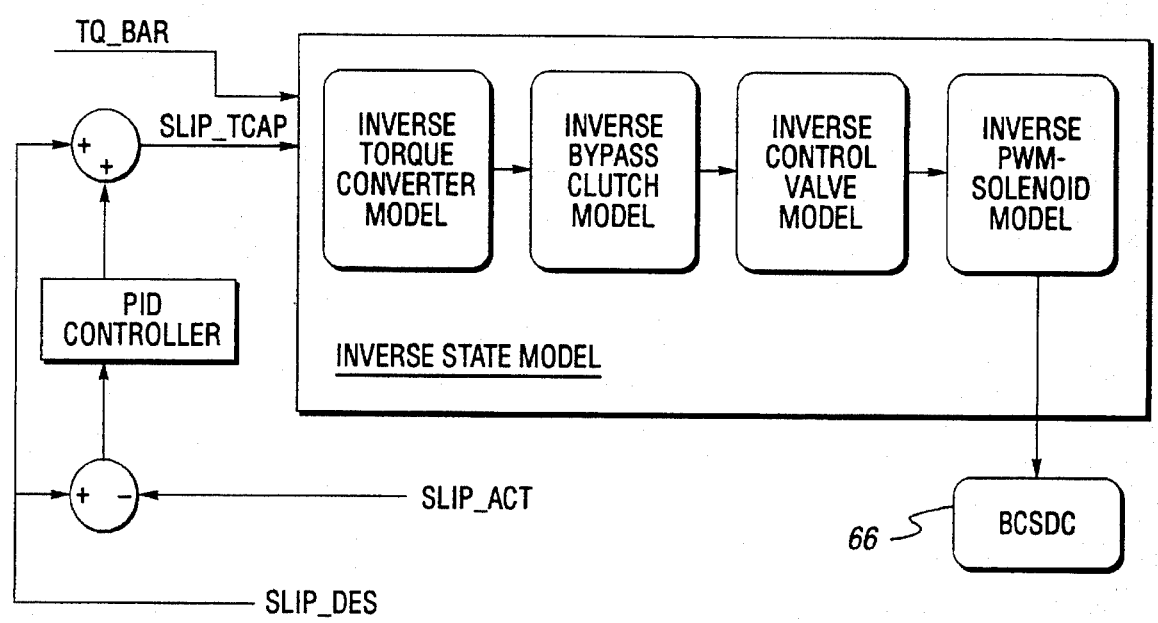
FIG. 15 is an inverse state model of the bypass clutch system for the transmission with a PID controller for an input.

The "torque feed forward" system contains an "inverse state model" of the converter clutch. As seen in FIG. 15, the input to this model is the input torque TQ_BAR and SLIP_TCAP, which is the total desired slip across the torque converter. The output from this inverse model is the bypass clutch duty cycle BCSDC, as shown at 66. The inverse model basically includes an inverse torque converter model, an inverse bypass clutch model, an inverse control valve model and an inverse PWM-solenoid model. SLIP_TCAP is the sum of the desired slip SLIP_DES and the PID-controlled slip SLIP_ERR_PID. ERR_TO is the difference between SLIP_ACT and SLIP_DES.

This slip error is used to calculate, with the PID-controller gains, the amount of PID-controlled slip. Assuming that the converter hardware correlates with the inverse model, the calculated duty cycle should generate the amount of slip asked by SLIP_TCAP. FIG. 15 shows the complete system.

This system has the advantage of controlling a converter clutch system partially open loop and partially closed loop. It can be controlled by increasing or decreasing the amount of PID-controlled slip (SLP_ERR_PID). The calculated total slip is then fed along with the input torque through the inverse model.

In any operating mode when the converter clutch has to be controlled by adjusting a target slip value, this control system is in effect. The complete control system, which is unique for the transmission, is described in detail below.

E) Modulation Over The Shift

The "modulation over the shift" controls the desired slip value across the torque converter when a shift is taking place. The converter clutch can be modulated during upshifts and downshifts. The major tool for adjusting a slip value during a shift is in item D) described torque feed forward system. The complete system for the application is described subsequently.

F) Unconditionally Unlock Module

This module is responsible for unlocking the torque converter clutch completely, which means to set the BCSDC value to 0%. This produces 0 pressure on the converter clutch apply side and unconditionally unlocks it. Unconditional unlock is commanded when extreme driving conditions take place; i.e., braking, tip-in, tip-out, closed throttle condition, etc. The unconditional unlock system for the transmission is shown and described subsequently.

Functional Description Of Control System

The hydraulic control system, as well as the control strategy for the transmission, now will be described. FIGS. 3B–3E establish a foundation for the actual description. It describes the total environment of the control system in the vehicle, the control strategy and the transmission itself including all interactions with the engine and the driver.

The control system is described in sub systems. It includes the hydraulic control sub systems as well as the complete system, including the control strategy which directs the hydraulic controls.

The hydraulic control system is packaged in a main control assembly consisting of:

valve body with 16 valve bores numbered from 200 to 216 including a connecting labyrinth;

4 ON/OFF solenoids 10, 12, 14 and 16;

1 Variable Force Solenoid 18;

1 PWM-solenoid 20;

11 shift valves 68, 70, 72, 74, 76, 80, 82, 84, 88 and 90;

1 accumulator valve 86;

1 thermostat valve 92;

2 blow off valves 94, 96;

3 modulator valves 98, 100, 102;

1 main regulator valve including a booster valve 104;

1 manual valve 78;

18 sleeves and retainer;

21 springs;

2 brackets to hold the solenoids;

separator plate which separates the valve body labyrinth from the case labyrinth by connecting holes;

upper and lower gaskets.

All these components comprise the hydraulic control system, which is described below.

Pressure Buildup System

FIGS. 3b–3e show the complete pressure buildup system including all involved valve systems, separator plate holes and solenoids.

Pressure Systems

The hydraulic control system consists of three different pressure systems:

The electronic pressure control systems (EPC/EPCB)

Electronic Pressure Control with VFS

EPCB boost pressure system

Pressures generated by the manual valve

The system pressures (PL, CC, SOL1, SOL2)

Main regulator valve system (PL)

SOL1, SOL2 regulator valve system

The clutch pressure modulator valves (CR, CF)

clutch pressure modulator reverse (CR)
clutch pressure modulator forward (CF)

Electronic Pressure Control With VFS (BORE 203)

Figure 12A:
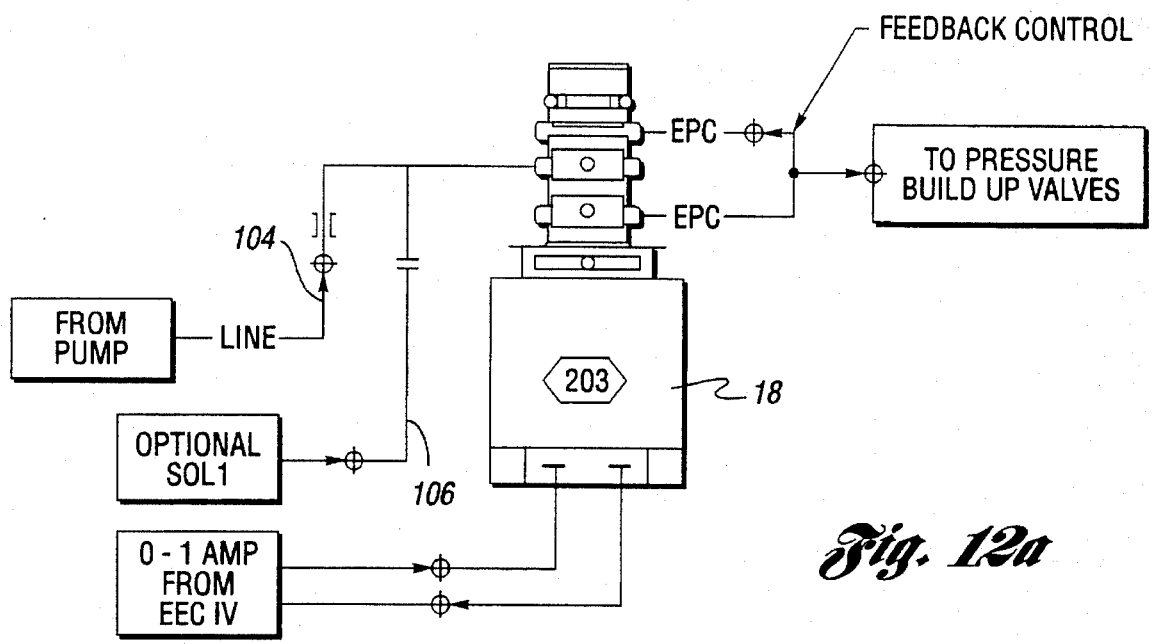
FIG. 12a shows a variable force solenoid that establishes control of the pressure ranges made available to the valve system by the pressure buildup valves.
Figure 12B:
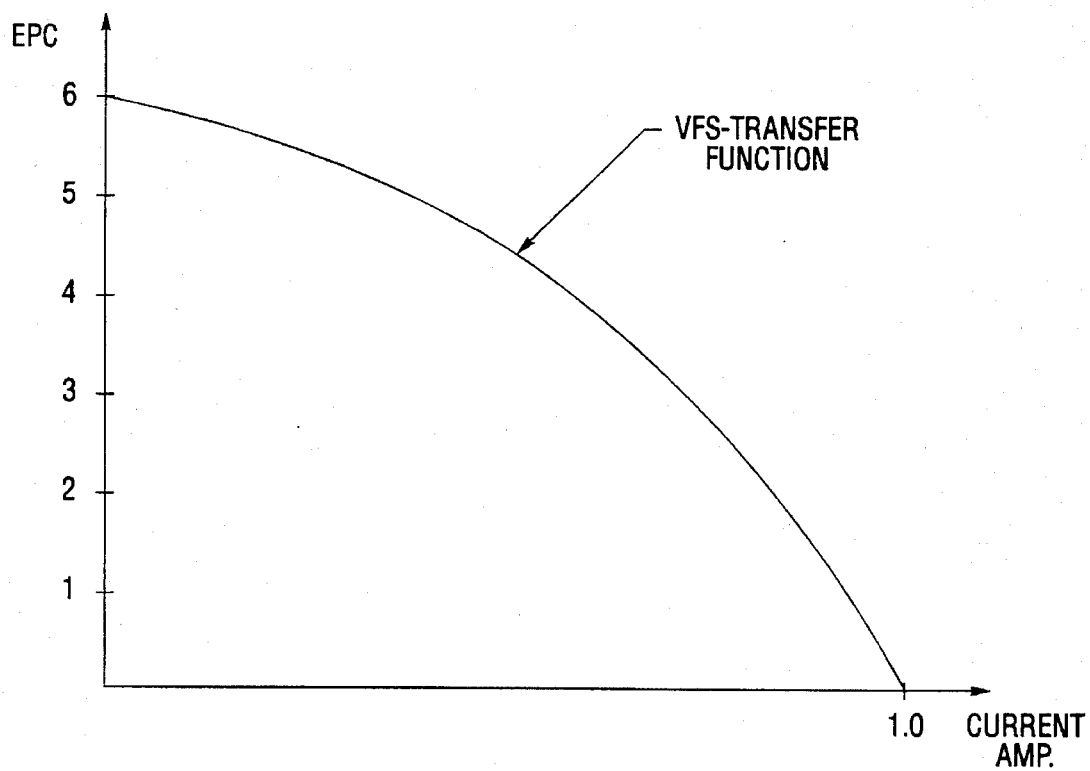
FIG. 12b is a chart showing the variable force solenoid transfer function for the valve of FIG. 12A.

As outlined above, the EPC pressure is generated by the VFS 18, shown in FIG. 12a. The apply pressure to the solenoid can be chosen from either line pressure (PL) or solenoid 1 pressure (SOL1) by opening or closing lines 104 or 106, as seen in FIG. 12a. Both lines are calibrated for the VFS. The advantage of using SOL1 pressure is that SOL1 pressure is limited between 4–8 bar, whereas the line pressure varies from 4–16 bar in drive and 4–22 bar in reverse position. The different line pressure settings in drive position and reverse position lead to a transfer function offset between these two positions. This can be eliminated by using SOL1 pressure as a feed pressure (see FIG. 12B). The VFS has a hydraulic feedback control system, which acts against a calibrated spring inside the solenoid.

As stated earlier, this solenoid is applied with a current from 0 to 1 ampere, which generates a magnetic force. The magnetic force reduces the spring load, and with this the EPC output pressure (see transfer function in FIG. 12B). This design, when no current is applied, allows maximum output pressure. The advantage is that in case of a power loss in the vehicle, maximum output pressure is always generated.

As shown in FIGS. 3B–3E, the EPC pressure is applied to three different pressure modulating systems, which are the main regulator valve system, clutch pressure modulator forward and reverse, and the EPCB modulator valve system over a set of separator holes. Orifice 108 in FIG. 3e serves as a damping orifice for all regulating devices.

The EPC output pressure is distributed as follows:

over orifices 108 and 110 to the clutch pressure modulator valve (reverse) in bore 205, as seen at 102, over orifices 108 and 112 to the EPCB valve, over orifices 108, 114, 116 and 118 to the main regulator booster valve and the clutch pressure modulator (forward) 100 in bore 207.

EPCB Pressure System

Figure 16A:
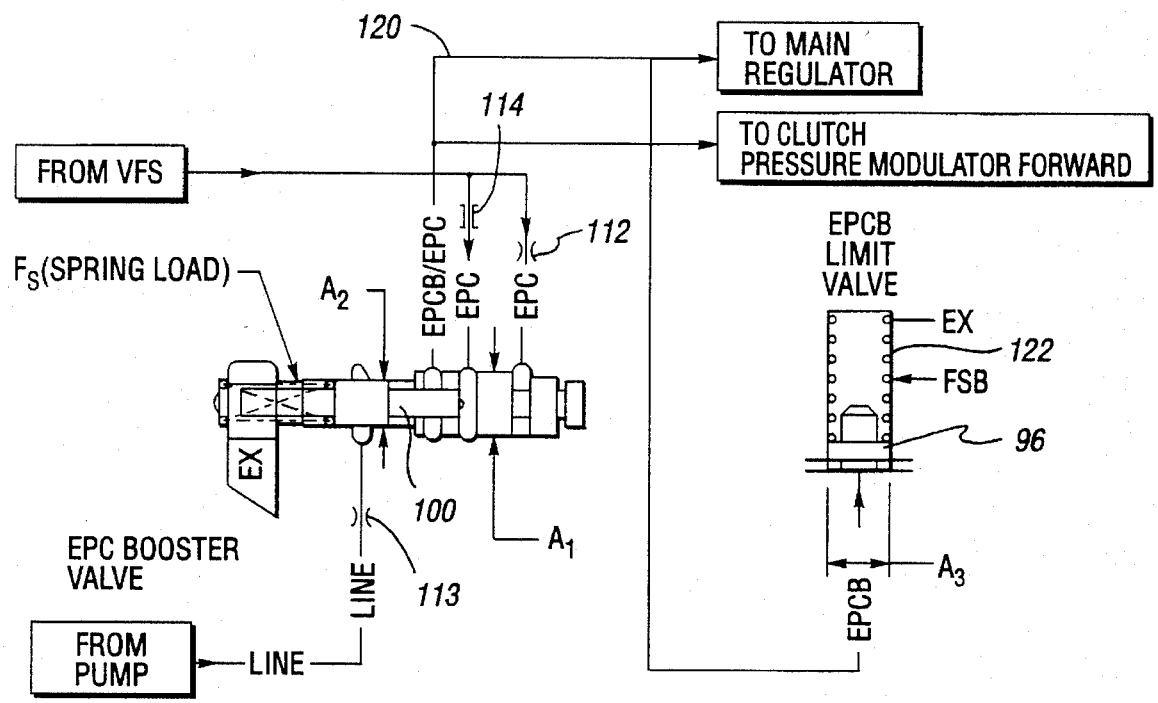
FIG. 16a shows the electronic pressure control boost pressure system for the valve circuit.
Figure 16B:
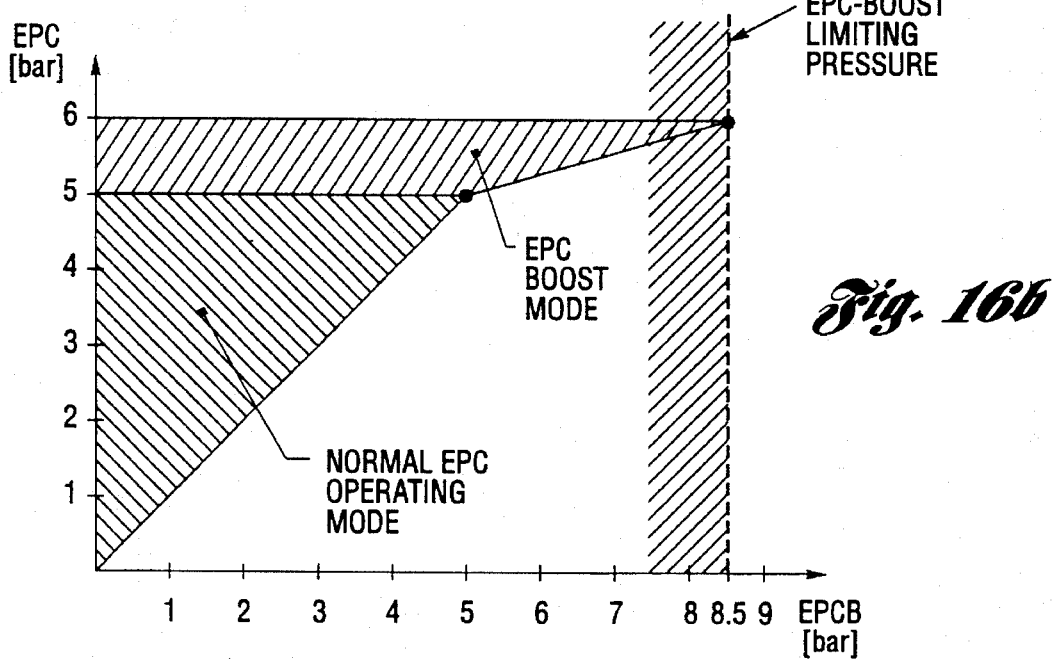
FIG. 16b shows the relationship between the output of the electronic pressure control time versus electronic boost pressure control boost pressure (EPCB)
Figure 16C:
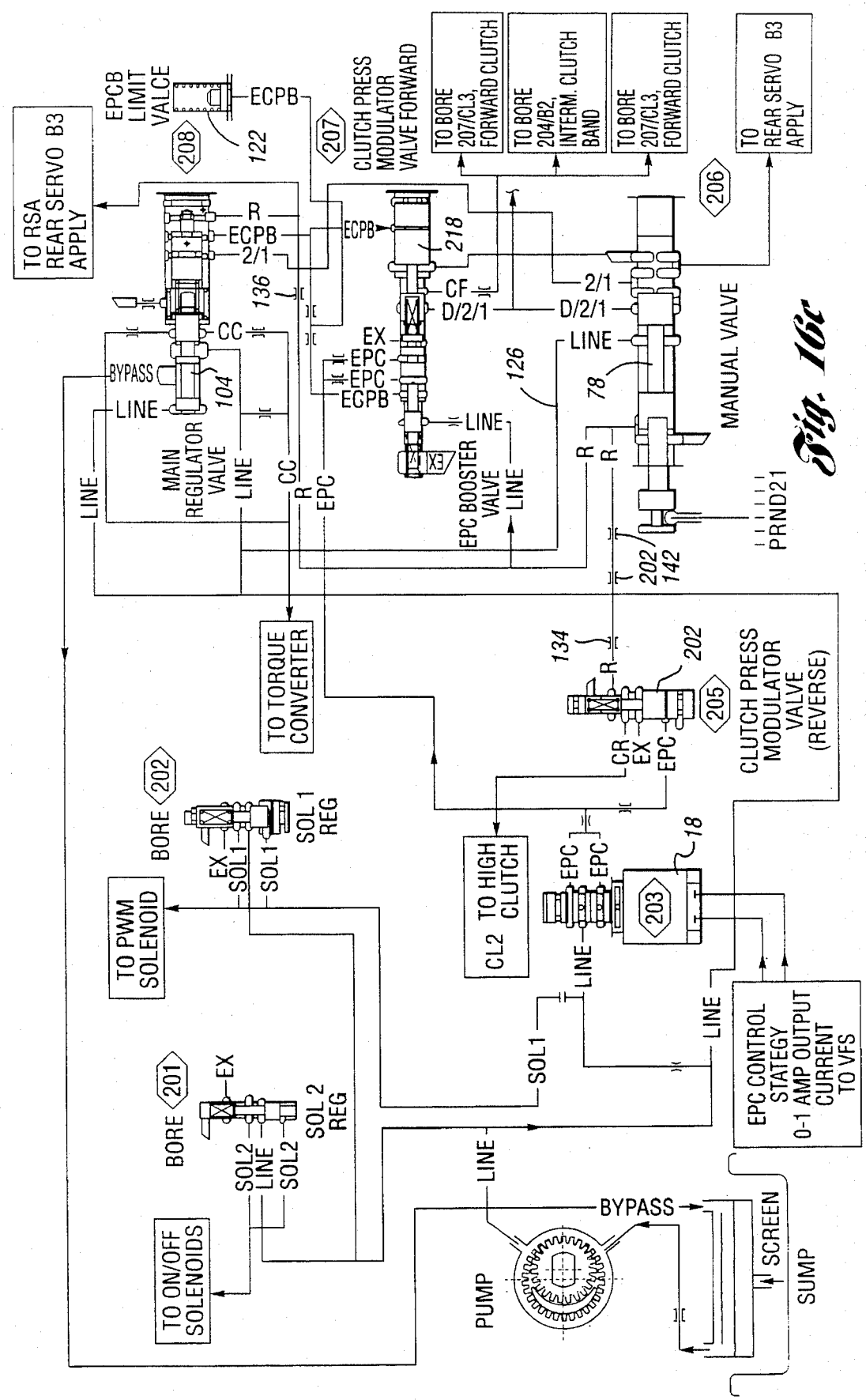
FIG. 16c shows the entire pressure buildup system.

FIG. 16a shows the pressure boost system (EPCB). It consists of a booster valve 100, a retainer to seal against other pressure systems, a spring and a blow off valve. The characteristic of this valve system is shown in FIG. 16b in form of EPC vs. EPCB curves. The characteristic shows two different operating areas.

From 0–5 bar EPC and EPCB are equal, which is indicated as "NORMAL EPC OPERATING MODE." During this pressure range the EPC pressure is distributed through orifice 114 and across the EPC boost valve to the main regulator and the clutch pressure modulator forward system through passage 120.

The EPC pressure applied at the head of the valve through orifice 112 pushes the valve to the regulating position. The pressure threshold between regulating and non-regulating operation is determined by:

REGULATING THRESHOLD=A2/FS, where
A2=area 2 of booster valve
FS=spring load of booster valve.

In the characteristic shown in FIG. 16B, this threshold is set to 5 bar. The second pressure operating area is located above the regulating threshold and is called "EPC BOOST MODE." In this area the booster valve system is in a regulating position and regulates line pressure to EPCB pressure. The line pressure feed orifice 113 functions as a damping orifice for the EPCB pressure system. The modulating range is from 5–6 bar EPC pressure. The maximum EPCB pressure at 6 bar EPC is 8.5 bar. The EPC/EPCB characteristic is linear. The formula in FIG. 16B shows the linear dependency:

$$EPCB=EPC *[A1/(A1-A2)] -FS/(A1-A2)$$

A2=area 2 of the booster valve

In order to limit the EPCB pressure, a blow off system is implemented. Blow off valve 96 opens against the load FSB of spring 122 to an exhaust port orifice #50 of the separator plate. The blow off pressure point is determined by:

BLOW OFF POINT=FSB/A3

FSB=blow off spring load
A3=area of blow off valve

The blow off point is set to 8.5 bar. This blow off pressure system avoids an over pressurization of the system if the EPCB valve is not functioning. The modulated EPCB pressure is applied to the main regulator system as a signal pressure to produce the required stall pressure function. The EPCB pressure is also applied on the clutch pressure modulator forward valve, which boosts this pressure as well (see FIG. 20b).

Since clutch pressure modulator CF pressure is applied through passage 124 (FIG. 3e) to the intermediate band (B2) in 2nd gear and the overdrive band (B1) in 4th gear, the "STALL CF PRESSURE" allows the vehicle to start up in 2nd, 3rd and 4th gear with torque multiplication of the torque converter.

The advantage of the EPCB system versus a conventional "cut-back" or "primary line system" is that it allows the maximum use of the linear area of the regulator for shift quality calibration and allows a continuous change in the stall pressure level independently from start up gear. This allows the flexibility to start the vehicle in any gear as described above for better fuel economy. It also eliminates the requirement for torque truncation when a power loss is present, as in a failure mode, since maximum EPC pressure is provided by the VFS valve 12 and consequently maximum EPCB pressure is present.

Pressure Generated By The Manual Valve

The transmission has six manual lever positions, which are PARK (P), REVERSE (R), NEUTRAL (N), DRIVE (D), MANUAL2 (2), MANUAL1 (1). In FIG. 3e, the manual valve is shown with these six positions. With the actuation of the shift linkage, the manual valve is positioned in one of these six positions. As shown in FIGS. 3b–3e, line pressure in passage 126 is the input to the manual valve system.

In NEUTRAL and PARK position, all elements of the transmission are exhausted, either from an exhaust port from one of the shift valves or via the manual valve. In these two positions, the line pressure is sealed by lands 128 and 130 from all other circuits.

In REVERSE position, line pressure is redirected into the R-channel shown at 132. Reverse pressure is provided as a feed pressure to the clutch pressure modulator valve (reverse) 102 through orifices 132 and 134. Further on, reverse pressure is applied on the rear servo apply (B3) side for execution of a reverse engagement. This will be explained later. Reverse pressure is also supplied as a signal pressure to the main regulator as an additional boost pressure in reverse via orifice 136.

In DRIVE position, D-pressure is derived from line pressure and is used as feed pressure in passage 138 to the clutch pressure modulator valve (forward) shown at 100. The circuitry shows D/2/1 pressure in passage 138, which means that line pressure is also applied in this circuit in MAN1 and MAN2 position. The D/2/1 pressure is used for other purposes, but at this point only the use for the pressure buildup system is explained.

In MAN2 position, another circuit 140 next to the D/2/1 passage 138 is applied with line pressure. This circuit has line pressure in MAN2 and MAN1 position and is labeled with 2/1. This pressure is used as a signal pressure to the main regulator valve to generate an additional boost effect in MAN2 and MAN1 position. This boost effect is used to increase the line pressure for failure mode purposes in 2 or 1 positions, which will be explained later.

In MAN1 position, a circuit 142 next to the 2/1 passage is supplied with line pressure. This pressure is labeled MAN1 and is not used for any pressure buildup purposes.

Main Regulator Valve System

Figure 17A:
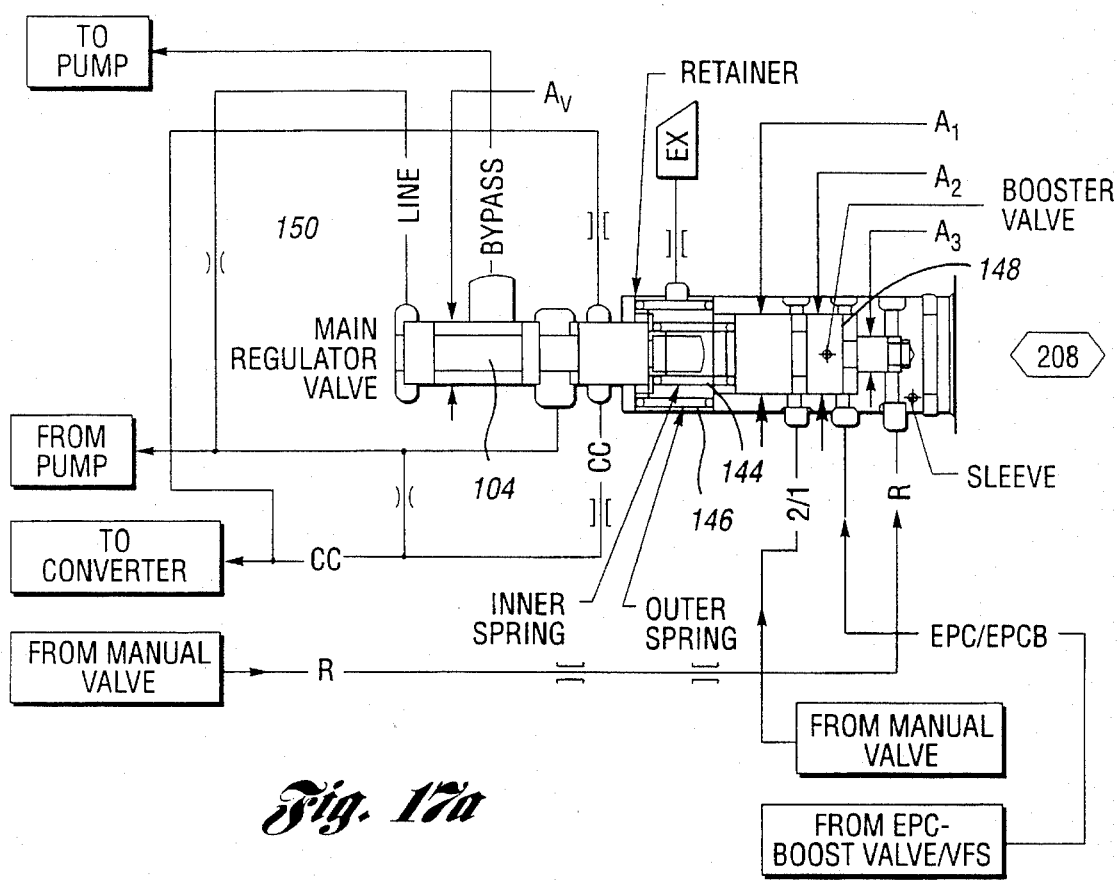
FIG. 17a shows a detail of the main pressure regulator valve.

FIG. 17a shows the main regulator valve system. The main regulator system consists of the main regulator valve itself at 104, inner and outer main regulator springs 144 and 146, a booster valve 148 with three differential areas A1, A2 and A3 and a sleeve where the booster valve is assembled. Here the line pressure, which is delivered by the pump, is in equilibrium with the inner and outer springs and with whatever signal pressures are applied to the differential areas on the booster valve. The line pressure is regulated with feedback control where orifice 150 is acting as a damping orifice.

There are three signal pressures applied on the booster valve:

2/1 pressure between A1 and A2

R pressure on A3

EPC/EPCB pressure between A2 and A3.

Figure 17B:
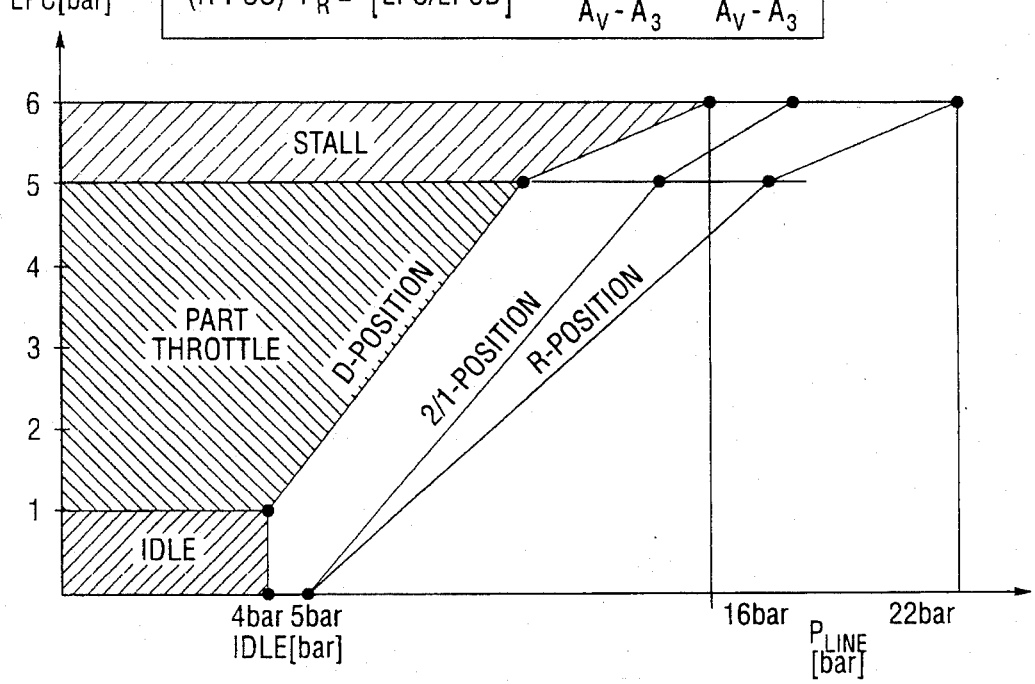
FIG. 17b shows the relationship between electronic pressure control output and the main regulator valve system of FIG. 17A.

EPC/EPCB pressure is continuously applied, and R and 2/1 pressure is applied depending on the manual valve position. The pressure buildup characteristics are shown in FIG. 17b in EPC vs. $P_{LINE}$. Here there are three different pressure buildup curves, one in D-position, one in 2/1 position and the last in R position. All three curves are linear and show three distinct pressure areas:

IDLE pressure

PART THROTTLE pressure

STALL pressure.

At IDLE in D-position, no signal pressures are applied and line pressure acts against the inner and outer springs 144 and 146. This gives an idle line pressure setting of 4 bar depending on the spring load in drive position. When 2/1 pressure or R pressure is applied, the idle line pressure setting is increased depending on the geometric sizes of areas A1, A2 and A3. The additional differential area between A1 and A2 for the 2/1 pressure is implemented for failure mode purposes. In cases when the EPC pressure is zero, the driver is still able to move the vehicle in 2/1 position with an increased idle line pressure setting. With an appropriate torque truncation strategy, the vehicle can be moved safely without damaging the transmission with zero EPC pressure applied to the booster valve. Area A3 is used to generate the R pressure buildup. This additional area is necessary to boost, along with the EPC/EPCB pressure on the differential area between A2 and A3, the R pressure to satisfy the capacity requirements for the affected elements in REVERSE position.

At PART THROTTLE and STALL, the pressure buildup is a linear function of EPC/EPCB vs. $P_{LINE}$, as shown below (see also the formula in FIG. 17B):

$$D\text{-pos. } PL = [EPC \text{ or } EPCB] * (A2-A3)/Av + Fso/Av$$

$$R\text{-pos. } PL = [EPC \text{ or } EPCB] * (A2-A3)/(Av-A3) + Fso/(Av-A3),$$

where

Av=area of valve dia.

Fso=spring load of outer spring.

The inner spring load is not considered here since the booster valve is in contact with the regulator valve and the spring loads cancel out. The threshold between STALL and PART THROTTLE is determined by the spring setting of the EPCB system in bore 207. The pressure settings in D-pos. at STALL are 16 bar; in R-position the maximum stall pressure is 22 bar. When the regulator valve is in regulating position, converter charge pressure (CC) in passage 150 is derived from line pressure to fill the torque converter and the lubrication circuits. At the same time, the oil is regulated into the bypass circuit 152, as indicated in FIGS. 3b and 3d. FIGS. 3b–3e show the return of the bypass oil through line 154 and back into the suction port of the pump.

In addition, bypass orifice 156, as seen in FIG. 3e, is implemented between CC and PL. This bypass orifice is necessary to keep a continuous oil flow into the torque converter in case of a hydraulic lock of the main regulator valve triggered by the booster valve system.

SOL1, SOL2, Regulator Valve Systems

Figure 18A:
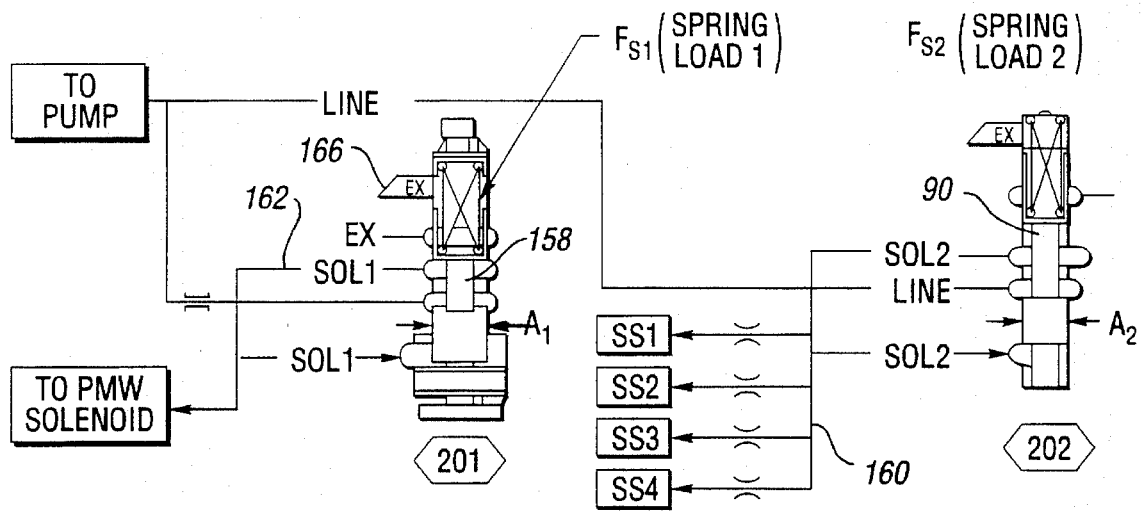
FIG. 18a shows a solenoid regulator valves that forms a part of the valve system.
Figure 18B:
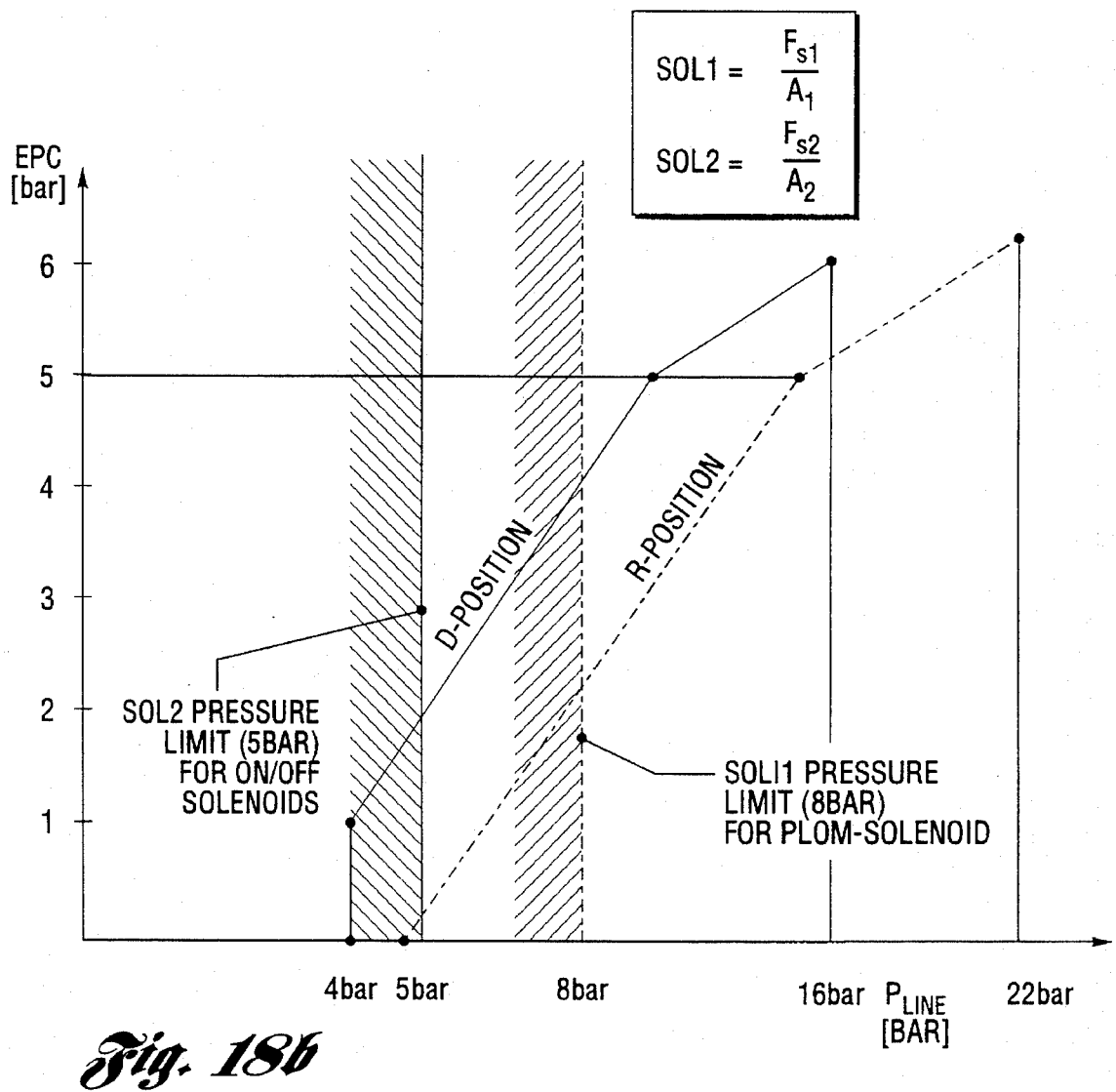
FIG. 18b shows the relationship between electronic pressure control output and line pressure for both drive position and reverse position of the range selector.

The SOL1 and SOL2 regulator systems are shown in FIG. 18a. There are two pressure limiting valves 90 and 158 with feedback control, as seen in FIGS. 3e and 18a. The input pressure is line pressure and the output at 160 and 162 is a limited line pressure regulated to the solenoid regulator thresholds. The pressure thresholds are determined as follows (see also the formula in FIG. 18B):

$$SOL1 = Fs1/A1$$

$$SOL2 = Fs2/A2, \text{ where}$$

Fs1=spring load of SOL1 reg.

Fs2=spring load of SOL2 reg.

A1=valve head area of SOL1 reg.

A2=valve head area of SOL2 reg.

The surplus oil of the regulator valves 90 and 158 is drained into an exhaust port 164 or 166. The reason of having two solenoid regulator valve systems is found in reducing the maximum input pressure to the ON/OFF solenoids. The design of the solenoids depends on the maximum allowed input pressure. The lower the input pressure, the less costly is the solenoid design.

Figure 3C:
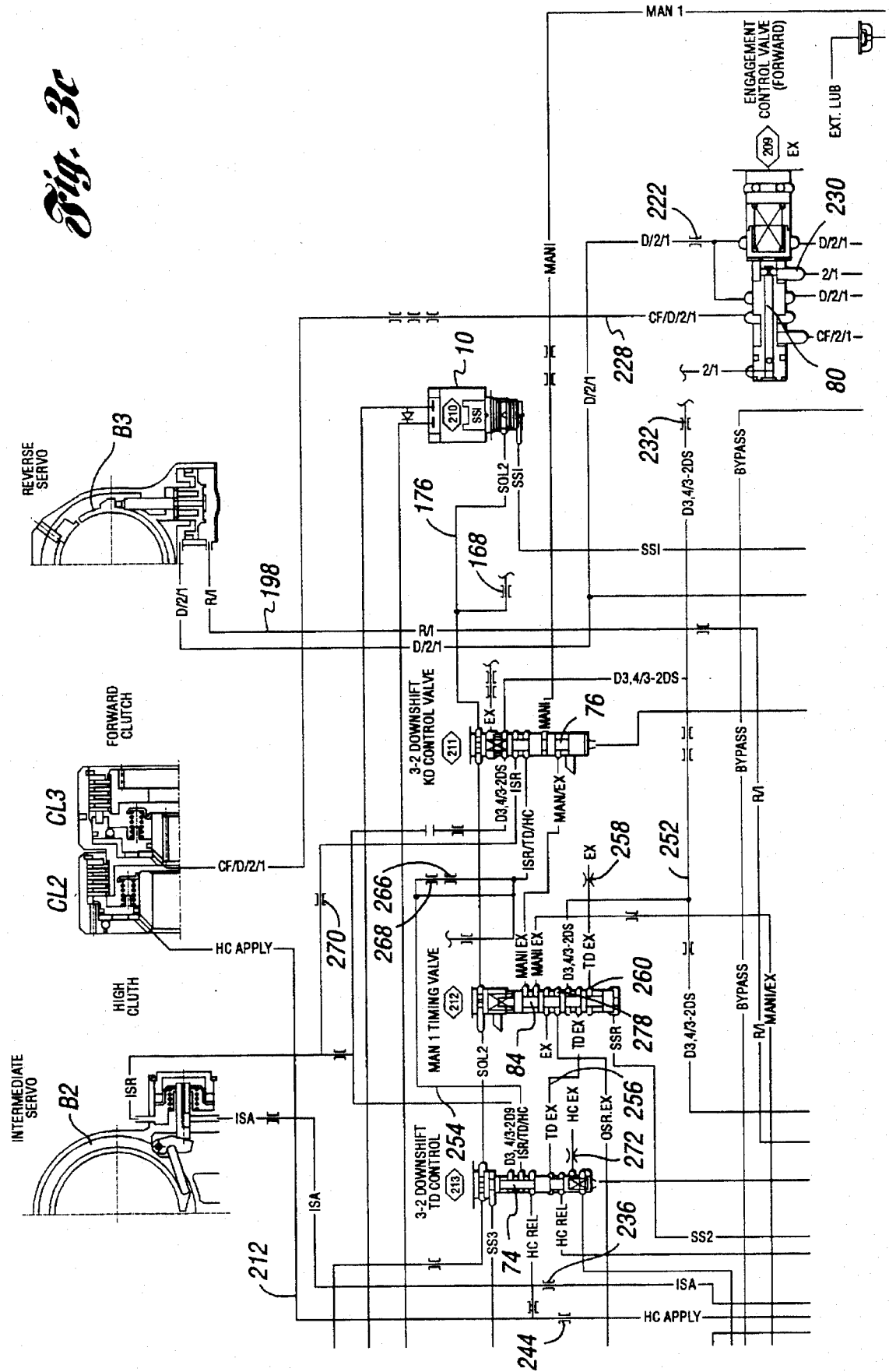

The SOL2 regulator is used exclusively for the ON/OFF solenoids and may be set at 5 bar. The SOL2 regulator is dedicated to the PWM solenoid 20 and the threshold is at 8 bar. The feed to all ON/OFF solenoids has a calibratable orifice to optimize the solenoid response synchronization:

orifice 168 for SS1 in FIG. 3c orifice 170 for SS2 in FIG. 3d orifice 172 for SS3 in FIG. 3d
orifice 174 for SS4 in FIG. 3d

The proper calibration of these orifices determines solenoid synchronization during the execution of synchronous upshifts and downshifts when more than one solenoid is energized at the same time. Derived from solenoid 2 pressure in passages 176 (FIG. 3c), 178 (FIG. 3d), 180 (FIG. 3b), and 182 (FIG. 3d) are the different shift solenoid pressures SS1, SS2, SS3 and SS4, respectively, which are generated when the solenoids are energized.

Clutch Pressure Modulator (Reverse)

Figure 19A:
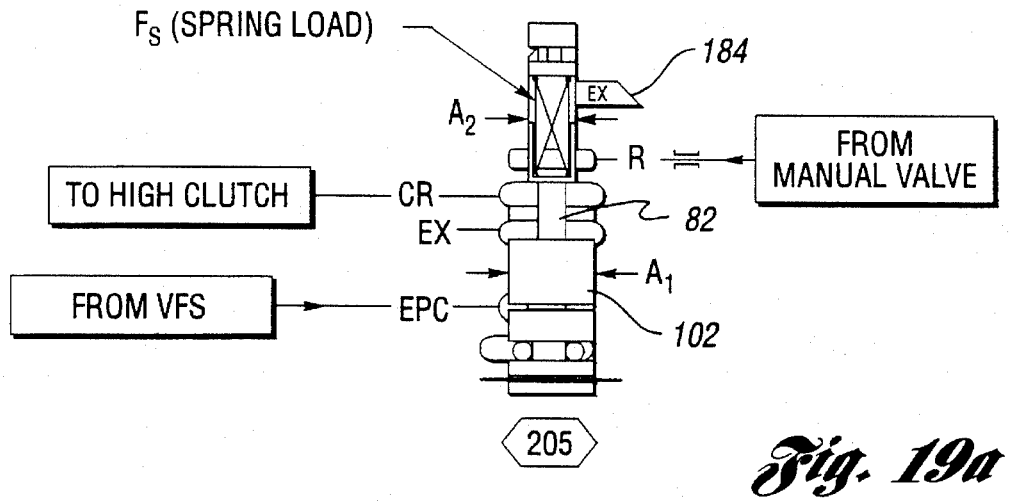
FIG. 19a shows a clutch pressure modulator for the reverse clutch.
Figure 19B:
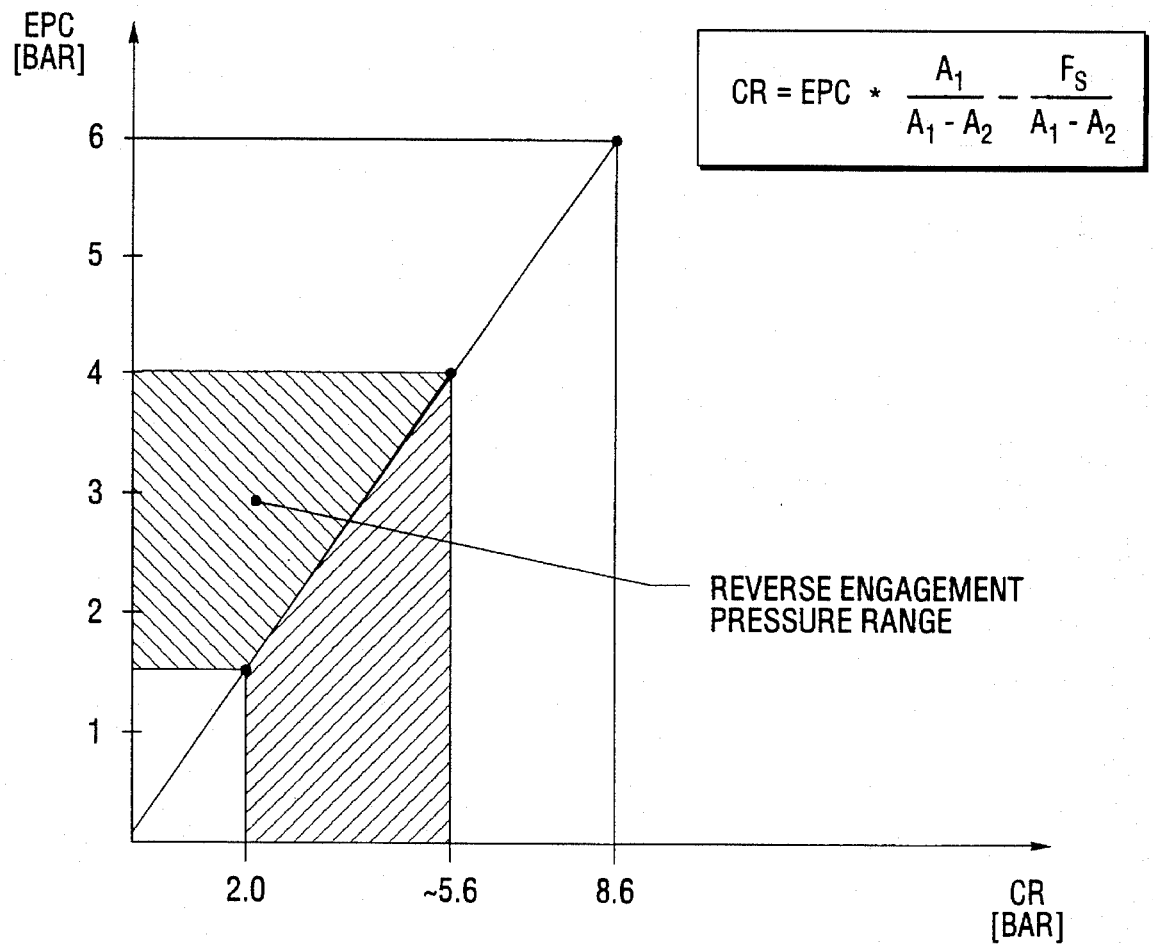
FIG. 19b shows the electronic pressure control output relationship with respect to reverse clutch pressure.

The clutch pressure modulator (reverse) is shown in FIG. 19a. In regulating position, the EPC pressure applied on area A1 is in equilibrium with clutch pressure reverse (CR) applied on the differential area between A1 and A2 plus the spring load. The input pressure is R pressure derived from the manual valve. This characteristic is shown in FIG. 19b. There is a linear relationship between EPC pressure and clutch pressure (reverse) (CR), i.e., $$CR = EPC * A1/(A1-A2) - FS/(A1-A2)$$

where:
FS=spring load of modulator spring
A1=area of the front modulator land
A2=area of the rear modulator land The surplus oil is delivered over an exhaust port 184 to the sump. The output pressure CR is applied on the high clutch (CL2) during a static engagement. This modulator is exclusively used for reverse engagements. With an appropriate control strategy applied to the CR modulator, high quality static engagements can be accomplished. This system will be explained in detail subsequently. It eliminates the usage of expensive high volume accumulator systems.

FIG. 19b shows an engagement control range from 2.0 to 5.6 bar CR pressure distributed over 1.5 to 4 bar EPC pressure range.

Clutch Pressure Modulator (Forward)

Figure 20A:
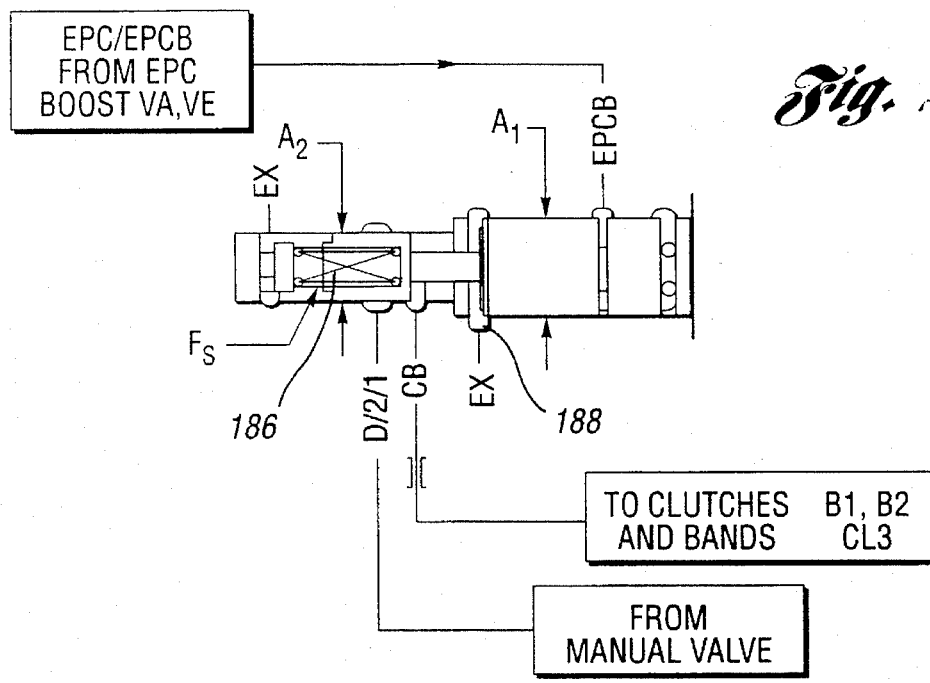
FIGS. 20a and 20b are similar to FIGS. 19A and 19B except that these Figures deal with clutch pressure modulation for the forward clutch rather than the reverse clutch.

FIG. 20a shows the clutch pressure modulator in forward. When the modulator is in regulating position, the EPC/EPCB pressure applied on the area A1 is in equilibrium with the clutch pressure forward (CF) applied on the differential area between A1 and A2 plus the spring load of spring 18b. The surplus oil is carried through an exhaust port 188 to the sump. The input pressure is here D/2/1 pressure generated by the manual valve, which is equivalent to line pressure. The characteristic is shown in graph in FIG. 20b. It has a linear relationship between EPC/EPCB—and CF pressure. The relationship is as follows:

$$CF = [EPC \text{ or } EPCB] * A1/(A2-A1) - FS/(A2-A1),$$

where:
FS=spring load of modulator valve
A1=area of front land of modulator
A2=area of rear land of modulator.

The CF modulator pressure is applied on the intermediate servo (B2), the overdrive servo (B2) and the forward clutch (CL2). For the forward clutch, the CF modulator is used only for static engagements. With an appropriate control strategy, the CF modulator replaces expensive high volume accumulator systems. Further, this CF modulator system is used for all up- and downshifts, which allows an electronically controlled accumulation of each shifting event.

Figure 20B:
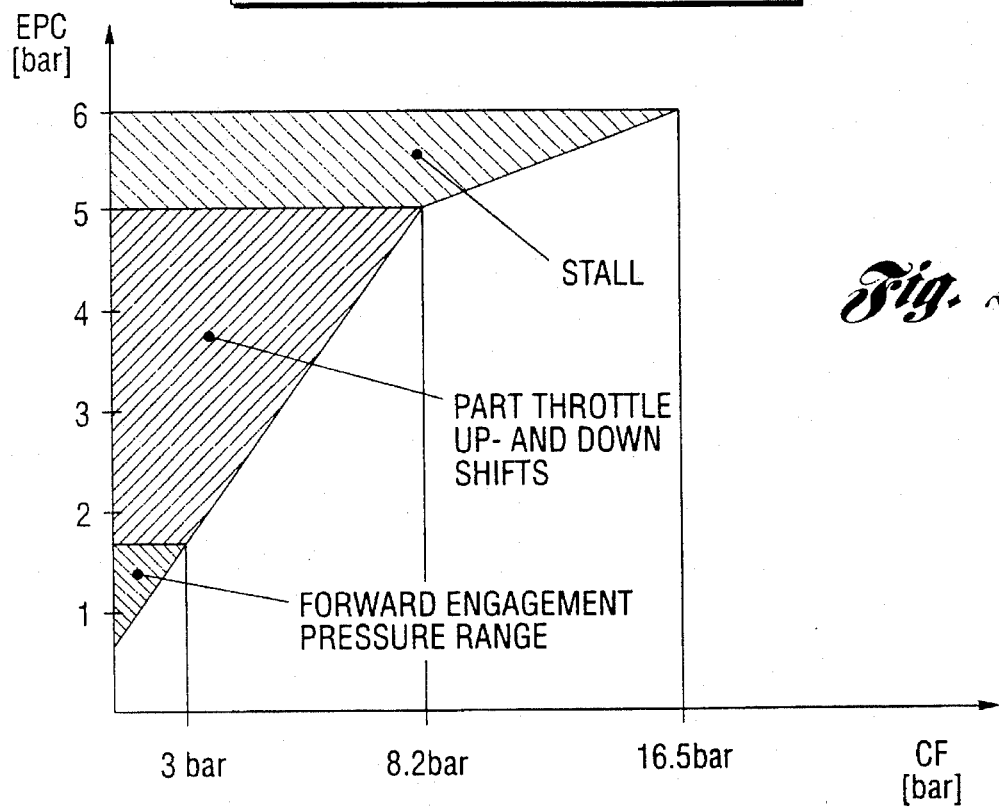

FIG. 20b shows three pressure ranges of the CF modulator system. Up to 1.8 bar EPC pressure is the FORWARD ENGAGEMENT PRESSURE RANGE. The range from 1.8 to 5 bar EPC is used for PART THROTTLE UPSHIFTS AND DOWNSHIFTS. With the apply of EPCB pressure to the modulator, a STALL pressure of 16.5 bar can be accomplished in the EPCB pressure regulating area within the 5 and 6 bar EPC pressure range. This gives the capability of vehicle start up in all gears with full engine torque.

EPC Control Strategy

The EPC control strategy is explained above and will not be repeated here. However, specific control algorithms with regard to pressure buildup during reverse and forward engagements or during upshifts and downshifts will be explained in the following sections.

REVERSE ENGAGEMENT SYSTEM

Hydraulic Control System

Figure 21:
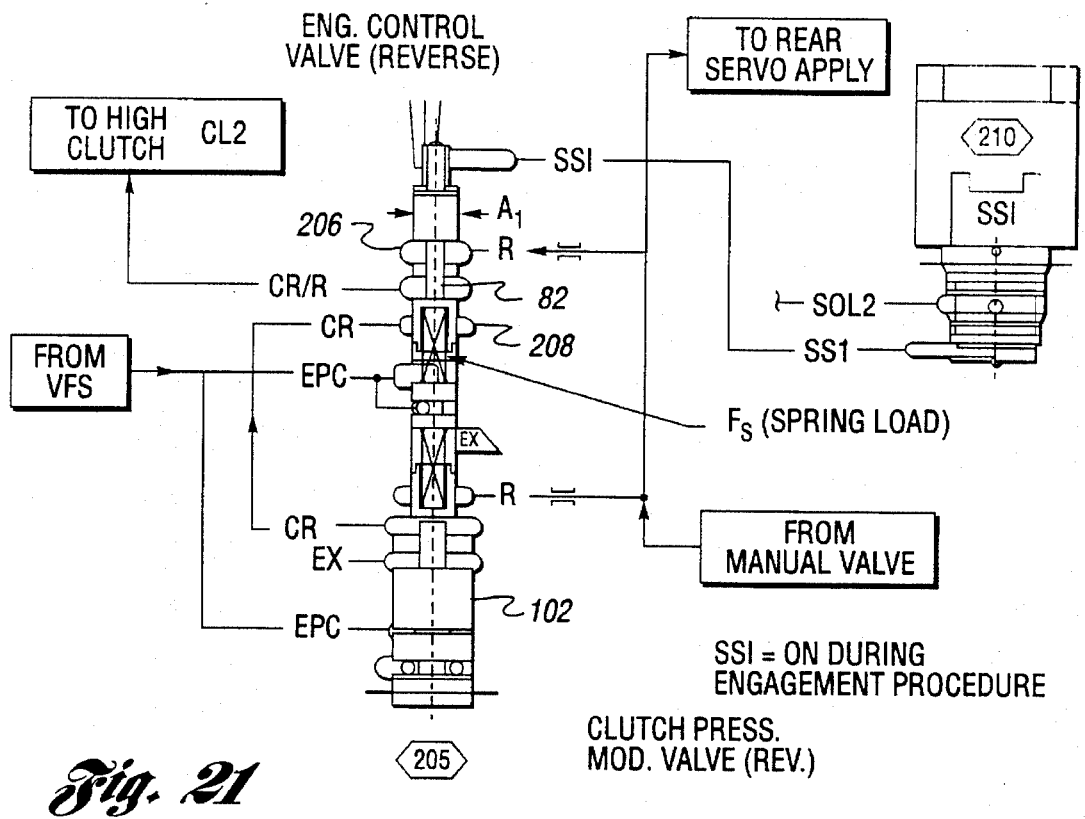
Figure 22:
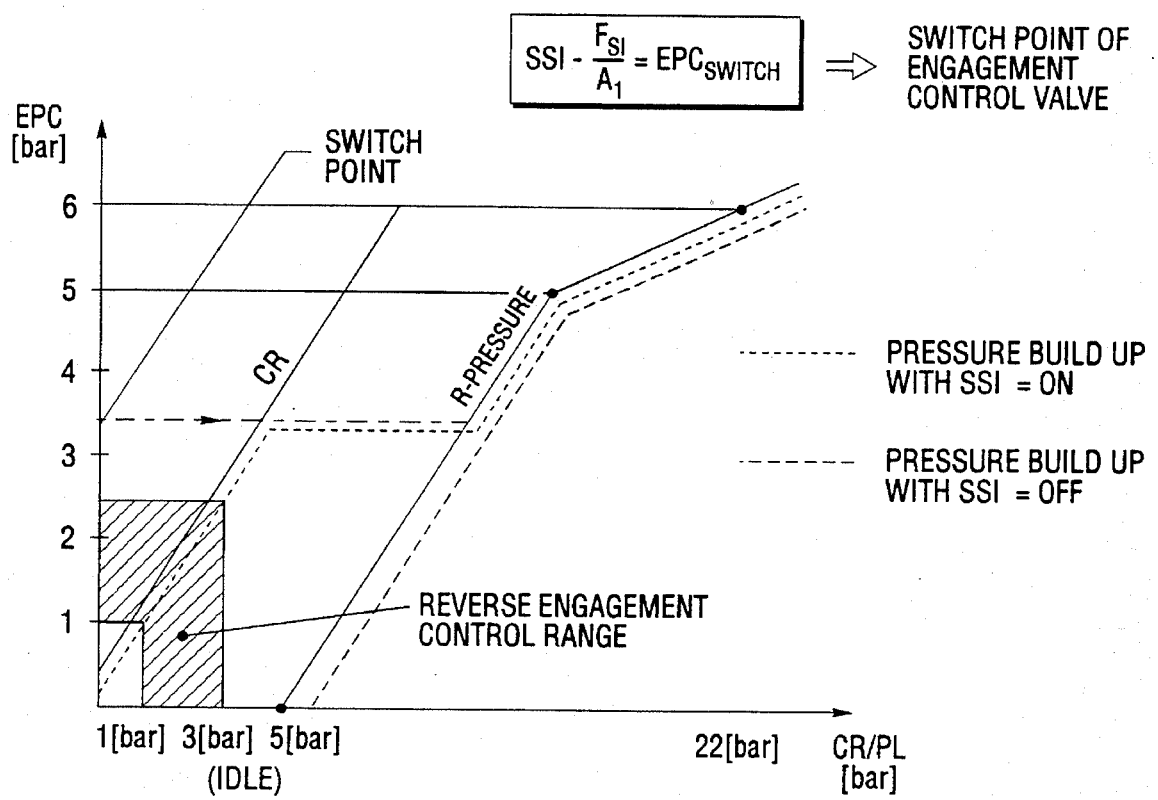
FIG. 22 shows the electronic pressure control output and reverse engagement clutch pressure relationship.
Figure 23:
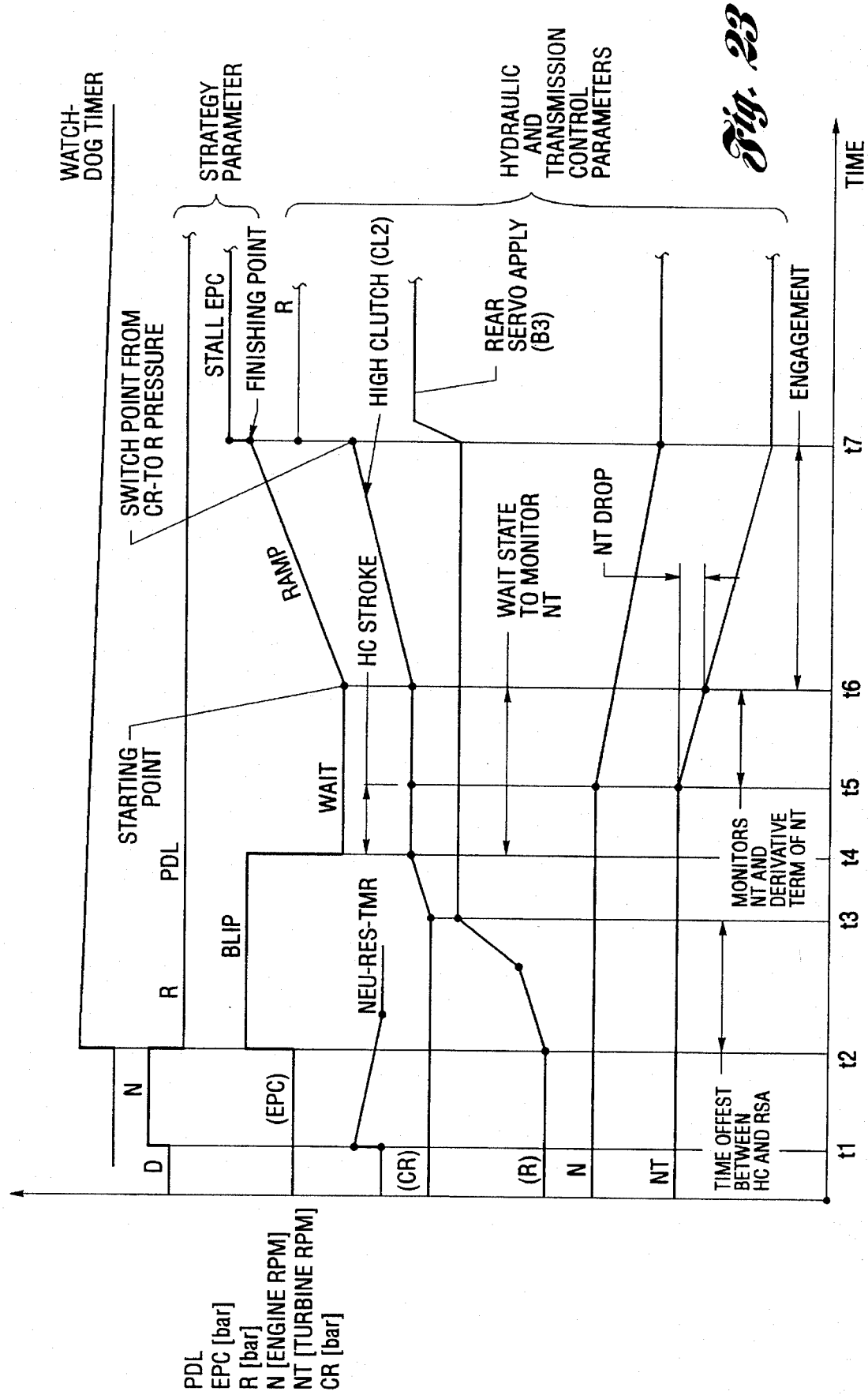
FIG. 23 is a reverse engagement timing diagram in which the pressures for the rear servo, the high clutch, and other variables are plotted against time during the reverse engagement interval.

The reverse engagement hydraulic control system is shown in FIGS. 21, 22 and 23. The overall control system is shown in FIGS. 3B–3E and is described first.

As stated previously, the high clutch (CL2) and the rear servo apply (B3) are applied for reverse. Two elements have to be controlled in order to accomplish engagement. The rear band (B3) has to hold the reaction torque of −3.11* input torque, whereas the high clutch (CL2) transmits only 1* input torque. The total torque multiplication is −2.11* input torque. Considering the fact that two elements have to be engaged and that the rear band capacity is three times higher, the design uses the high clutch (CL2) as the controlling element during an engagement event.

The solenoid stage during a reverse engagement is SS1=ON, SS2=OFF and SS3=OFF, which is first gear. FIG. 8 shows the solenoid stages during engagement. The first gear stage is used for the reverse engagement in order to prevent the necessity of controlling another solenoid during the execution of the engagement. When SS1 is energized, the reverse engagement control valve 82 is shifted into the upshift position. The VFS 18 of FIG. 3e is applied to the back of the reverse engagement control valve 82 and on the clutch pressure modulator valve (reverse) 102 in bore 205. When a reverse engagement is executed, the manual lever in bore 206 is moved to position R. LINE pressure from the pump/main-regulator-system is distributed into the reverse pressure passages to the main regulator in reverse. The reverse pressure is distributed through orifices 190 and 192 to the input port of the reverse modulator 102 in bore 205. Reverse pressure is routed over the engagement control valve 82 through orifice 194 in FIG. 3d and through the 2-way ball check valve 196 to the rear servo apply side passage 198 in FIGS. 3c and 21a. The purpose of the ball check valve systems is explained subsequently.

The clutch pressure modulator (reverse) 120 in bore 205 of FIG. 3e is connected to the high clutch (CL2). This modulator modulates the reverse pressure, which is the input pressure to the modulator 102 to develop CR pressure. This CR pressure is routed over the engagement control valve through the one-way ball check valve 200, seen in FIG. 3e, to the high clutch (CL2). As stated earlier, in order to make the system controllable, the rear servo apply has to be applied first and the high clutch is the controlled element. This is accomplished with two design features of this system. The first design feature is connection of reverse pressure to the clutch pressure modulator 102. In order to modulate CR pressure, reverse pressure has to be available. This is only the case when the rear servo (B3) has stroked and reverse pressure has built up. This ensures an "in series" engagement of the rear servo (B3) and high clutch (CL2). The second design feature is the implementation of the ball check valve system 200.

This ball check valve system 200 connects the orifice 202 in the upstream direction to the high clutch. During the reverse engagement event, the ball check valve 200 closes orifice 204 and only allows the oil flow to pass through the orifice 202. This is only valid in the upstream direction. In the downstream direction or, respectively, in the release direction, both orifices 202 and 204 are open. This ensures a fast clutch release under all transmission oil temperatures. The orifice meters the oil flow provided to the high clutch and maintains a delayed engagement relative to the rear servo apply (B3). Metering the oil flow to the high clutch enhances also the engagement quality along with the modulated CR pressure. FIG. 21 shows the reverse engagement control system in bore 205.

The engagement control valve 82 is shown in FIG. 21 in downshift position, which means SS1 is not energized. When an engagement is taking place, SS1 is energized.

The two input ports 206 and 208 of the engagement control valve 82 receive reverse pressure and modulated CR pressure, respectively. From the VFS 18, EPC pressure is applied on the back of the valve 82. This control valve was implemented for two reasons:

(i) to distinguish between CR- and R-pressure in dependency of EPC pressure. This is accomplished by EPC applied on the back of the valve. It allows to use the CR pressure for a static engagement lower than a switch point (see FIG. 22); and (ii) for failure mode purposes. With SS1 pressure applied to the head of the valve, it is ensured that in case of a power loss the high clutch (CL2) is always applied with reverse pressure. If SS1 stays energized and the VFS 18 loses power, the EPC pressure is at a maximum and moves the engagement control valve into installed position, supplying reverse pressure to the high clutch (CL2). Any time when the control strategy senses a failure condition affecting the high clutch (CL2), SS1 can be turned off as a protective measure.

FIG. 21 shows engagement control system. The characteristic of the engagement valve is represented by following formula (see FIG. 22):

$$EPC\ (Switch) = SS1 - FS1/A1,$$

where
EPC (Switch)=switch point between CR and R pressure applied to CL2;
SS1=shift solenoid pressure (4–5 bar);
FS1=spring load of engagement control valve; and
A1=area of engagement control valve lands.

The current switch point of the transmission is set to 3.5 bar EPC pressure. FIG. 22 shows the pressure characteristic of the CR modulator and the reverse pressure developed by the main regulator. The EPC pressure range is split into two sections. The lower section beyond the switch point is used for the engagement function. The upper section is used to satisfy stall conditions in reverse. The engagement control range is shown between 1 and 2.5 bar EPC. Two pressure buildup curves are shown, one with SS1 turned on and the second with SS1 turned off. This further demonstrates how the use of shift solenoid 1 for failure mode protection by distinguishing between CR and R pressure.

A major advantage of this engagement control system is the differentiation between engagement and stall and the failure mode in the continuous transition from the engagement to stall pressure without adding additional control solenoids. It allows a fast switch to stall pressures if required for a particular vehicle operating condition.

Reverse Engagement Control Strategy

The reverse engagement control strategy executes an engagement depending on state of the PDL register, which represents the manual lever position. The timing diagram in FIG. 23 shows the interaction of the control strategy along with two transmission parameters and the pressure characteristic of the high clutch (CL2) and the rear servo apply (B3) in the time domain. As an example, during drive to reverse engagement, the following parameters are considered:
PDL register (control strategy)
EPC register (control strategy)
high clutch pressure (CL2)
rear servo apply pressure (B3)
N engine speed
NT turbine speed.

Figure 24:
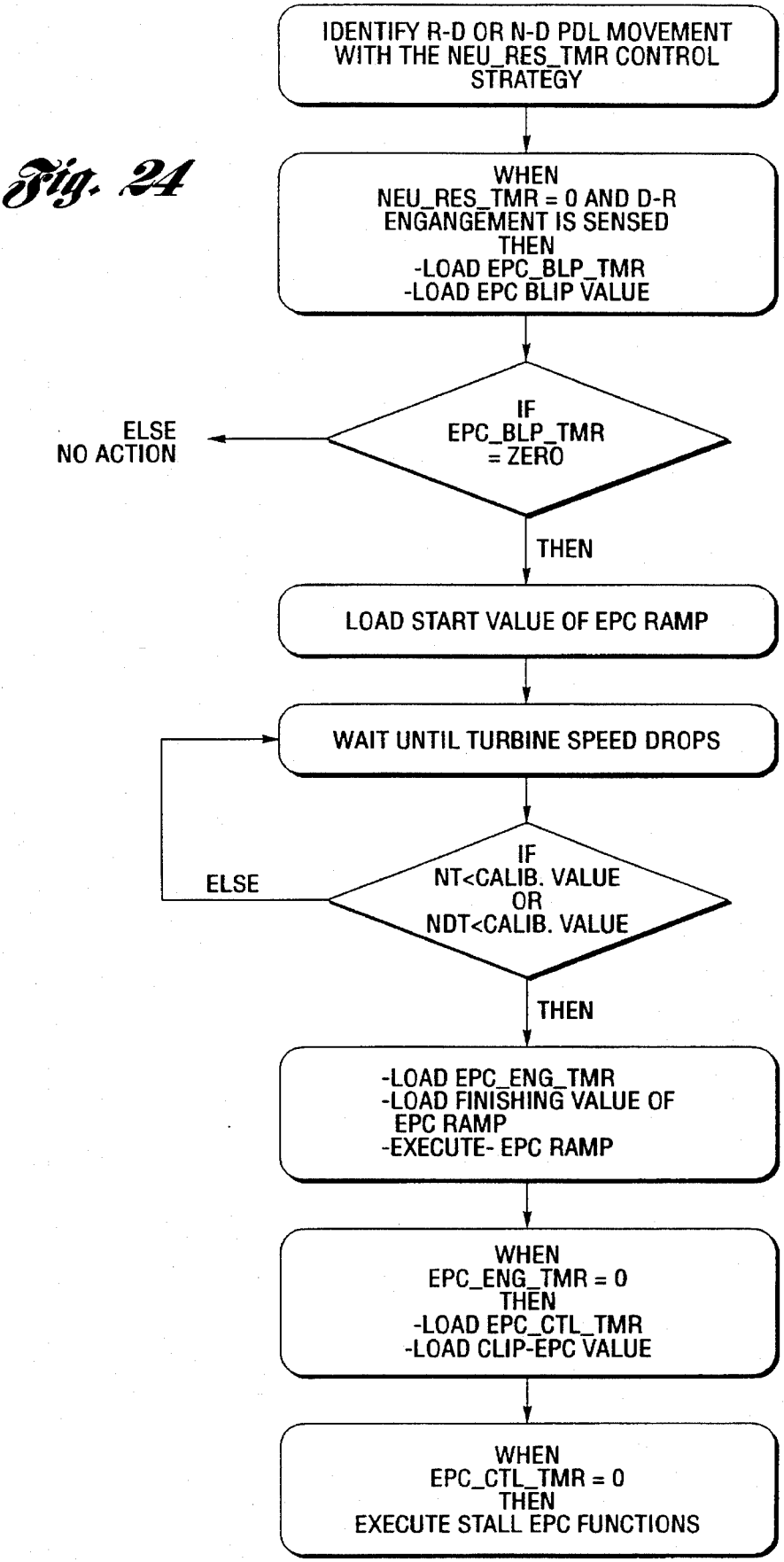
FIG. 24 is a flow diagram illustrating the reverse-to-drive engagement functions that are carried out in sequence in a closed loop fashion.

The reverse engagement event is divided up into 7 phases from t1 through t7 (see FIG. 23). These are described as follows:

t1:
Control Strategy:
The driver moves the manual lever from drive to neutral. At this time a neutral resident timer NEU_RES_TMR is loaded with a calibratable time. The neutral resident timer is needed to differentiate between a drive to reverse or a neutral to reverse engagement. The strategy is illustrated in FIG. 24.

t2:
Control Strategy:
At time t2 the driver moves the manual lever from neutral to reverse. The neutral resident timer has not yet expired and the PDL register has changed to R position. If the NEU_RES_TMR has not expired and the PDL register has changed from D to R, a drive to reverse engagement has been sensed. At the same time a watchdog timer is loaded, which monitors the engagement event. When the turbine speed is not smaller than a calibratable value and the watchdog timer has run out, then the EPC pressure will be set to stall condition. Later, a blip timer EPC_BLP_TMR is loaded with a calibratable value and "BLIP" EPC value is loaded. The purpose of this increased blip EPC value is to reduce the hydraulic filling time of the rear servo and the high clutch. The BLIP EPC values and the EPC_BLP_TMR can be modified with transmission oil temperature. The engine RPM N is captured and frozen into a register. This engine RPM value is later used to determine the amount of pressure to be applied on the high clutch (CL2) since the engine RPM determines the amount of capacity required for a good engagement.

Control Hardware
At this point the manual valve 78 in bore 206 opens the reverse pressure passages and the rear servo starts to fill and to stroke (see FIG. 3e).

t3:
Control Hardware
Reverse pressure has built up completely and the clutch pressure modulator (reverse) 102 starts to modulate CR pressure into the high clutch (CL2). The rear servo has fully stroked and is engaged. The time between t2 and t3 is the time offset between the high clutch stroke and the rear servo engagement. The rear servo always engages first.

t4:

Control Strategy

The EPC_BLP_TMR has expired and the EPC value is set from the BLIP value to START value for an execution of an EPC ramp. The EPC ramp consists of the engagement timer EPC_ENG_TMR, the starting point and the finishing point of the ramp. Starting and finishing point of the ramp are a function of engine RPM "N", which has been captured at time t2 from the control strategy. However the ramp is not being executed yet. The strategy stays at the starting point until the turbine speed NT OR the derivative turbine speed NDT (NT/dt) is smaller than a calibratable value. The strategy "WAITS" until these conditions are satisfied and holds the starting value of the EPC ramp.

Control Hardware

The high clutch (CL2) is filled and starts to stroke.

t5:

Control Hardware

The high clutch engages and engine rpm "N" and turbine rpm "NT" begin to decrease.

t6:

Control Strategy

The turbine speed NT or the derivative turbine speed NDT have dropped lower than a calibratable value. The engagement timer EPC_ENG_TMR is loaded with a calibratable time and the EPC ramp is executed.

Control Hardware

The CR modulator follows the EPC ramp according to its pressure characteristic outlined previously. The capacity of the high clutch is increased and turbine speed and engine speed decreases.

t7:

Control Strategy

The engagement timer has expired and the EPC ramp has been executed. The engagement is completed since the turbine speed has reached zero speed. The strategy executes now "STALL EPC" control algorithms.

Control Hardware

The turbine speed is zero. The engagement is complete and the high clutch pressure is switched from CR pressure to R pressure for executing stall operations, which is executed through the engagement control valve switched to installed position by the EPC pressure applied at the back of the valve.

FIG. 24 is a flow diagram illustrating briefly the control strategy described here with reference to FIG. 23.

Reverse Inhibition Function

Reverse inhibition function means that the reverse gear is inhibited when the vehicle is moving forward and the manual lever is in reverse position. Engaging the high clutch and the rear servo while in reverse position when the vehicle is still moving forward can trigger transmission damage. The engine can stall or the rear wheels can lock during forward movement. The reverse engagement control system is capable of executing this function without any hardware changes. By controlling the EPC output pressure of the VFS 18 and by energizing shift solenoid 10 (SS1 in FIG. 3c), this function is realized. When SS1 is energized, the reverse engagement control valve 82 is in the downshift position and connects through passages 210 and 212 (see FIGS. 3c and 3e) the CR pressure from the modulator 102 to the high clutch (CL2) (see FIGS. 3B–3E). When zero EPC pressure is commanded, the spring load of clutch pressure reverse modulator 102 in bore 205 holds the modulator in installed position and connects through passage 210 the high clutch with the exhaust port 216 of the modulator. With this state, SS1=ON and zero EPC pressure, the high clutch is disengaged. The rear servo apply (B3), however, stays applied.

The control strategy commands this state when the driver moves the manual lever to reverse position and the vehicle speed VS is higher than a calibratable value. This inhibits the reverse function until a "safe" vehicle speed has been reached.

Summary Of Reverse Engagement

The reverse engagement control system uses a software accumulator to control the engaging clutch. The software accumulator consists of the EPC-ramp in conjunction with the clutch pressure reverse modulator 102 see in FIG. 3e. The clutch pressure modulator (reverse) provides pressure settings lower than idle line pressure. Idle line pressure in reverse is too high to be used for execution of good engagements.

The software accumulator ramps through the capacity band of the engaging clutch and increases with this the engagement quality robustness. This eliminates an expensive volume accumulator which would be very difficult to be implemented in the hardware due to package constraints. Further, no accumulator spring calibration is necessary for this design. With the support of electronic controls, it is possible to calibrate a series of engine sizes with a given hardware package. It reduces the hardware complexity significantly.

A further consideration is the clutch filling time. The filling time of a clutch varies with engine RPM, which represents the pump capacity, valve body tolerances and oil viscosity. It is very difficult, if not impossible, to account for the varying input parameters in an open loop manner. With the introduction of turbine speed monitoring during the "WAIT" state, this problem has been solved. The filling time is monitored in a closed loop manner, which contributes even more for robust engagement quality.

Incorporated into the reverse engagement hardware is the reverse inhibition function.

FORWARD ENGAGEMENT SYSTEM

Hydraulic Control System

Figure 26A:
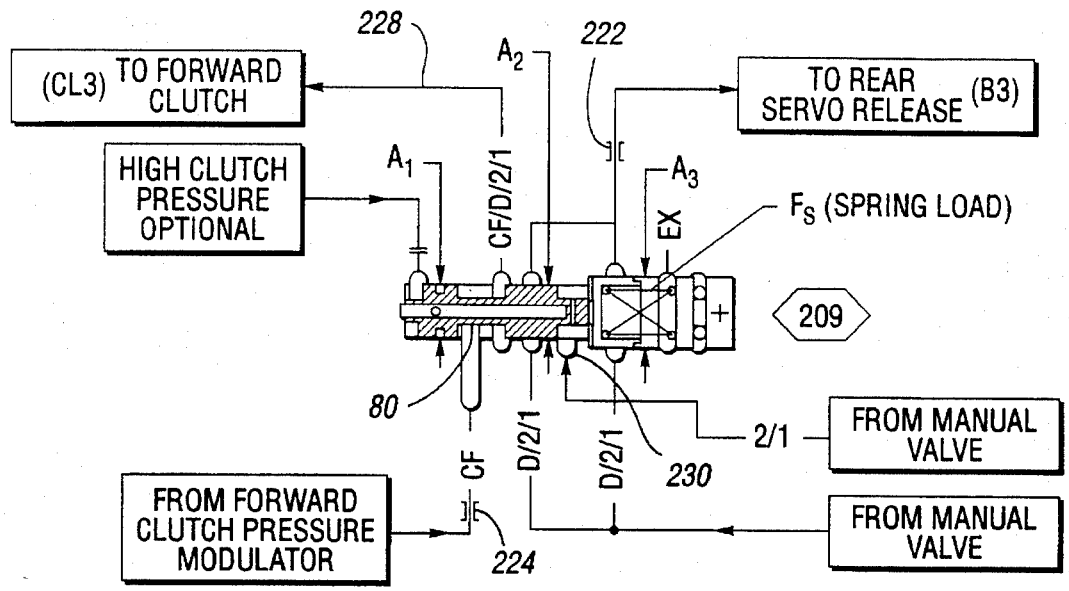
FIG. 26a shows the forward drive engagement control valve.

FIG. 26a shows the hydraulic control system to execute a forward engagement. The valves involved are the manual valve 78 in bore 206 (see FIG. 3e), the clutch pressure modulator 218 in forward in bore 207 and the main regulator 104 in bore 208. The characteristics of this valve system are described above. In addition an engagement control valve in bore 209, seen in FIG. 3c and in FIG. 26a, is added for forward engagement control.

Here only one clutch, which is the forward clutch (CL3), is involved in an engagement. The reverse servo is stroked during a reverse to drive engagement, into downshift position, during a forward engagement but it has no influence in the engagement control or quality. The shift solenoid stage used during the engagement event is the stage in first gear, which is SS1=ON,SS2=OFF,SS3=OFF.

Figure 26B:
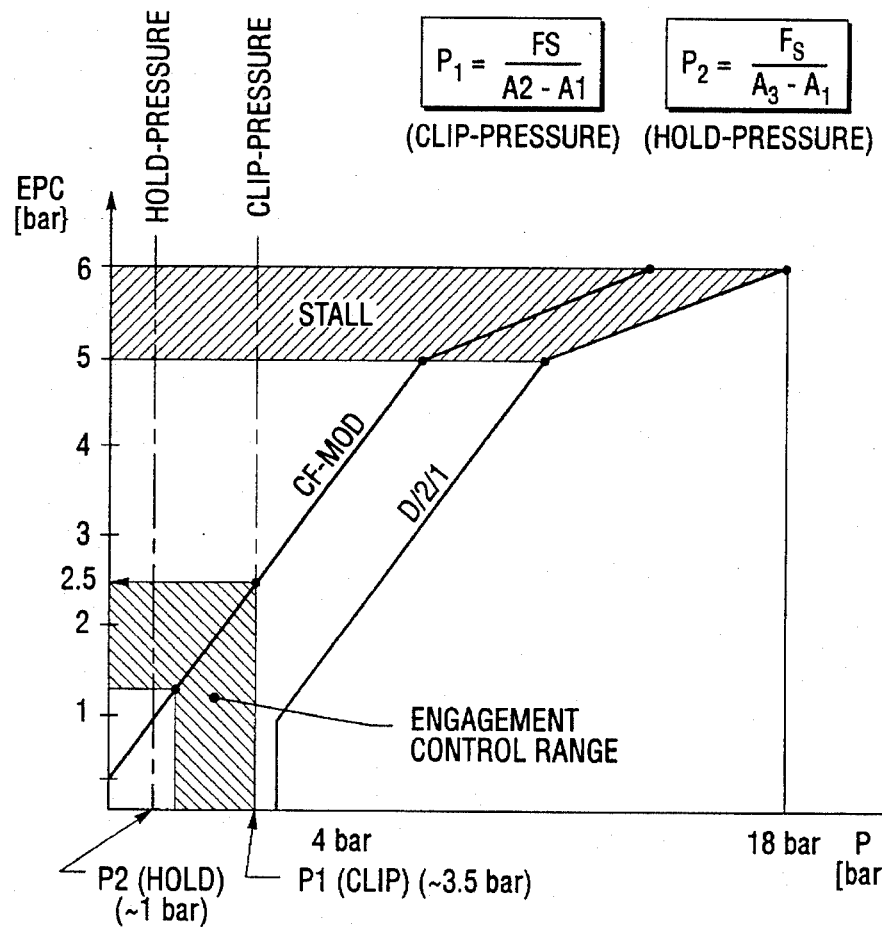
FIG. 26b shows the relationship of electronic pressure control output to the forward engagement clutch pressure.

When an engagement is executed, the manual valve 78 in bore 206 is moved into D position. LINE pressure from the pump/main-regulator system is allowed to enter into the D/2/1 passage 138 (FIG. 3c). The D/2/1 pressure is the input pressure to the clutch pressure modulator (forward) 218. D/2/1 pressure in passage 220 is applied over two overflow passages on the engagement control valve in bore 209 across orifice 222 to the release side of the rear servo (B3). At this point, the servo will be stroked. The EPC output pressure of the VFS 18 in FIG. 3e is connected through orifices 114, 116 and 118 to the head of the clutch pressure modulator in bore 207 of FIG. 3e and to the booster system of the main regulator 104 in bore 208. The EPC pressure is the controlling pressure calculated using the EPC control strategy. The clutch pressure modulator generates CF pressure derived from D/2/1 pressure in passage 130, which is the line pressure from the main regulator system. As shown in FIG. 26b, the characteristics of the CF modulator (CF-MOD) and the main regulator (D/2/1) versus EPC pressure is shown. The engagement control range is shown from 1.2 bar to 2.5 bar EPC pressure.

The CF pressure, as well as the D/2/1 pressure, are input to engagement control valve 80 in bore 209 of FIG. 3c. FIG. 26a shows the forward engagement control valve. The CF pressure is connected over orifice 224 in FIGS. 3e and 26a and an orifice 226 in FIG. 3e across the engagement control valve 80 to the forward clutch (CL3). The orifice 226 supplies a metered flow to the forward clutch (CL3) for better pressure control. The engagement control valve 80 in bore 209 is used to differentiate between the CF pressure and the D/2/1 pressure of passage 138 applied on the forward clutch (CL3). The CF pressure characteristic is also used for all upshifts and downshifts. If CF pressure would be applied on the forward clutch during an upshift or downshift, the pressure level for an upshift and downshift would be too low to hold the forward clutch capacity. Capacity loss of the forward clutch then would result. Therefore, the engagement control valve has been designed to provide the higher level D/2/1 pressure in passage 228 to the forward clutch when the forward engagement is completed. This is accomplished by the introduction of a pressure clip system. FIG. 26a shows the engagement control valve with three differential areas A1, A2 and A3. When the engagement control valve is in the installed position, CF pressure is connected to the forward clutch and also is applied to the differential area A2–A1. The second differential A3–A2 is exhausted over the MANUAL 2/1 port 230. The differential area A2–A1 divided by the spring load FS provides the clip pressure threshold. Hence the clip pressure is (see FIG. 26):

$$\text{CLIP PRESSURE } (P1) = FS/(A2-A1)$$

When the CF pressure is raised to the point of this pressure threshold, the engagement control valve is shifted to downshift position. At this point D/2/1 pressure is applied between the differential area A2–A1, CF pressure is disconnected from the forward clutch and D/2/1 pressure is applied. Simultaneously D/2/1 pressure is also applied between differential areas A3–A2 and the 2/1 exhaust port is disconnected. Hence, the pressure threshold to hold the forward clutch in "clipped" position is calculated from (see formula in FIG. 26b):

$$\text{HOLD PRESSURE } (P2) = FS/(A3-A1)$$

The clip pressure level is set at 3.5 bar, which is approx. equivalent to 2.5 bar EPC pressure. The hold pressure is set at 1 bar pressure level. The additional differential area between A2 and A3 is used to reinforce the hold position. Here the D/2/1 pressure has to drop lower than 1 bar to allow a shift of the engagement control valve 80 to the installed position. This is implemented to protect the forward clutch capacity when the forward engagement is completed.

Figure 26C:
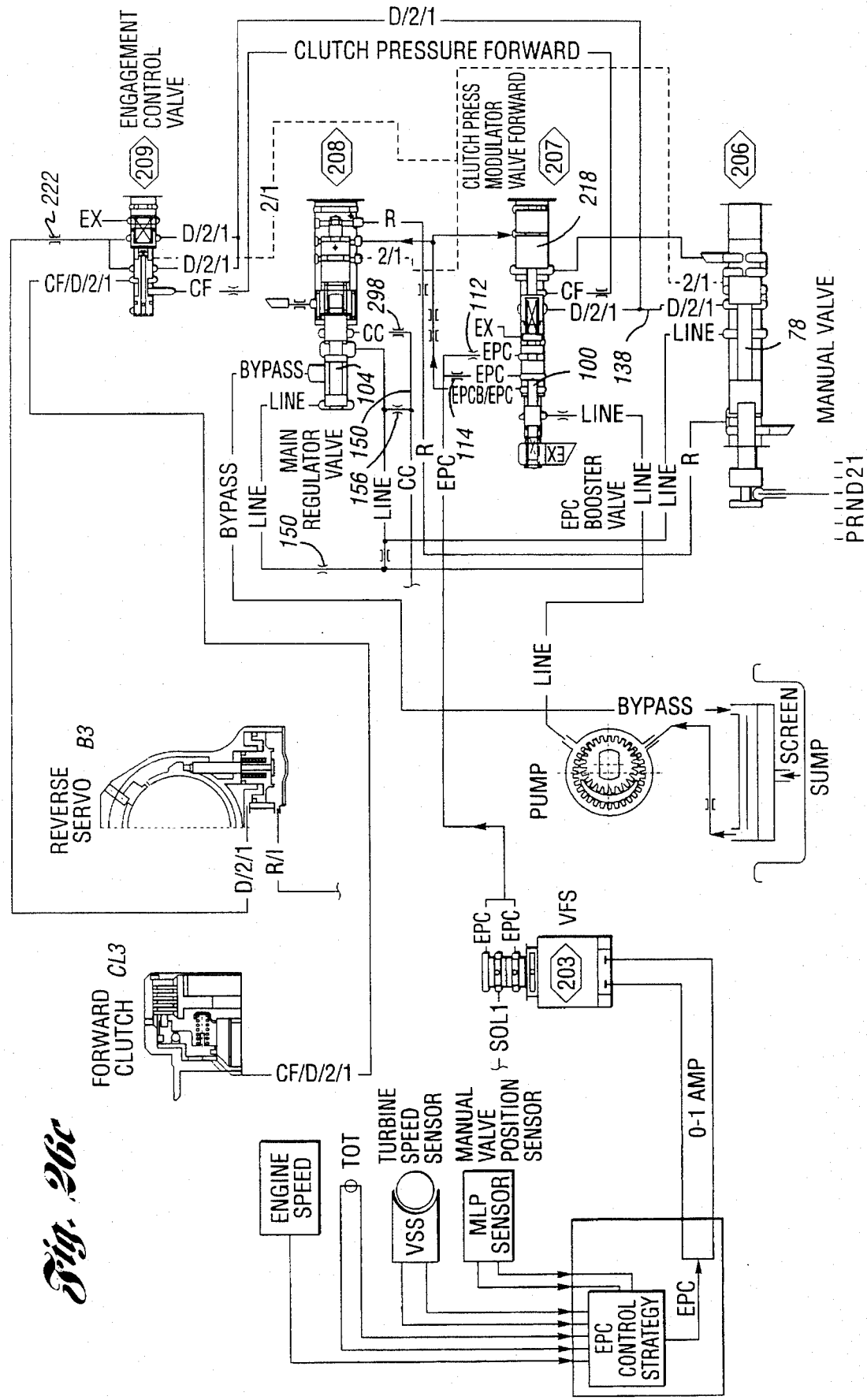
FIG. 26c shows the entire forward engagement system.

In MANUAL 1 and MANUAL 2 positions 2/1 pressure is applied between the differential areas A3 and A2 and is connected through a central passage to area A1. The forward clutch (CL3) is always clipped to 2/1 pressure when the manual lever is in 2/1 position. This is also illustrated in FIG. 26c with the broken 2/1 line connected with the manual valve to the engagement control valve. The broken line means that the 2/1 circuit is exhausted in D position. In 2/1 position it is energized with line pressure and clipping the engagement control valve instantaneously. This is required to protect the forward clutch with the higher line pressure setting during manual "pull-in" operations from D position to 2/1 position. Since the forward clutch cannot be controlled with CF pressure during a static engagement into MANUAL 1 or MANUAL 2 position during a power loss failure mode. CF pressure thus is at a maximum since the output pressure is at maximum and the forward clutch is clipped to the higher D/2/1 pressure settings.

Another failure mode feature is the connection of high clutch pressure on the area A1. This is an optional design by opening orifice 232 in FIG. 3c. It requires the elimination of the passage 80 on the engagement control valve 80. When a power loss occurs in the transmission, all solenoids are turned off and third gear is commanded. The high clutch is energized in third gear and pushes the valve into downshift position and clips the forward clutch pressure to D/2/1 pressure. This is not only a protection for power loss, but also for a power loss at the shift solenoids. This would also protect the forward clutch when a power loss is present and the VFS 18 has an output pressure lower than the clip pressure threshold.

Forward Engagement Control Strategy

The forward engagement control strategy executes an engagement depending on the state of the PDL register, which represents the manual lever position. The timing diagram in FIG. 27 shows the interaction of the control strategy along with two transmission parameters and the pressure characteristic of the forward clutch (CL3) in the time domain. As an example, if a reverse to drive engagement is chosen, the following parameters are considered:

PDL register (control strategy)

EPC register (control strategy)

forward clutch pressure (CL3)

N engine speed

NT turbine speed

The procedure is very similar to the reverse engagement. The forward engagement event is divided up into 7 phases from t1 through t7, as in the case of FIG. 23 for reverse engagement timing:

t1:

Control Strategy

The driver moves the manual lever from reverse to neutral. At this time a neutral resident timer NEU_RES_TMR is loaded with a calibratable time. The neutral resident timer is needed to differentiate between a reverse to drive or a neutral to drive engagement.

t2:

Control Strategy

At time t2 (see FIGS. 23 and 24), the driver moves the manual lever from neutral to drive. The neutral resident timer has not expired yet and the PDL register has changed to D position, if the timer has not expired yet and the PDL register has changed to D position. If the NEU_RES_TMR has not expired and the PDL register has changed from R to D, a reverse to drive engagement has been sensed. A blip timer EPC_BLP_TMR then is loaded with a calibratable value and "BLIP" EPC value is loaded. The purpose of this increased "BLIP" EPC value is to reduce the hydraulic filling time of the forward clutch.

The BLIP EPC values and the EPC_BLP_TMR can be modified with transmission oil temperature. The engine RPM N is captured and stored in a memory register. This engine RPM value is later used to determine the amount of pressure to be applied on the forward clutch (CL3) since the engine RPM determines the amount of capacity required for a good engagement.

Control Hardware

At this point the manual valve 78 in bore 206 (FIG. 3e) opens the D/2/1 pressure passage 138.

The forward clutch (CL3) starts to fill and the forward clutch modulator is fed with D/2/1 pressure.

t3:

Here the control strategy is divided up into two options. The first option is the "NORMAL" control strategy (see FIG. 25) and the second option is the "CLOSED LOOP" control strategy (see FIG. 24).

Control Strategy—"CLOSED LOOP" Option (See FIG. 25):

The EPC_BLP_TMR has expired and the EPC value is set from the BLIP value to START value for execution of an EPC ramp (see FIG. 24). The EPC ramp consists of engagement timer EPC_ENG_TMR, the starting point and the finishing point of the ramp. Starting and finishing points of the ramp are a function of engine RPM "N", which has been captured at time t2 from the control strategy. However the ramp is not yet executed. The strategy stays at the starting point until the turbine speed NT or the derivative turbine speed NDT (NT/dt) is smaller than a calibratable value. The strategy "WAITS" until these conditions are satisfied and holds the starting value of the EPC ramp.

Figure 25:
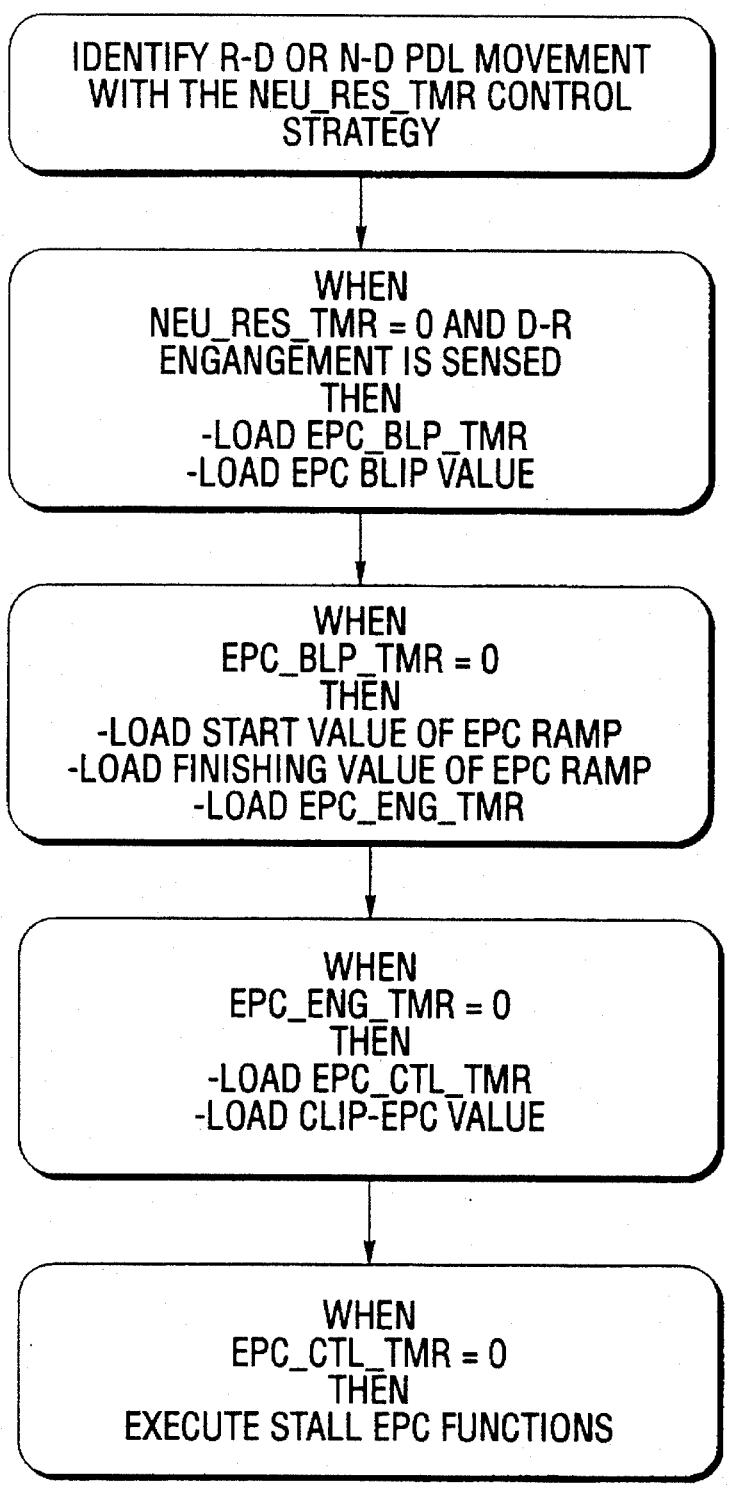
FIG. 25 shows a reverse-to-drive engagement flow chart indicating the functions that are carried out in sequence for a normal reverse-to-drive engagement.

Control Strategy—"NORMAL" Option (See FIG. 25)

The EPC ramp is executed instantaneously. The starting point and the finishing point of the EPC ramp are loaded along with the EPC_ENG_TMR.

No closed loop triggering of the EPC ramp takes place as determined by a turbine speed threshold or a derivative turbine speed.

Control Hardware—BOTH Options

The forward clutch (CL3) is filled and starts to stroke.

t4:

Control Hardware—BOTH Options

The forward clutch engages and engine rpm N and turbine rpm NT decrease.

t5:

Control Strategy—"CLOSED LOOP" Option

The turbine speed NT or the derivative turbine speed NDT have dropped lower than a calibratable value. The engagement timer EPC_ENG_TMR is loaded with a calibratable time and the EPC ramp is executed.

Control Hardware—"BOTH" Options

The CF modulator 218 follows the EPC ramp according to its pressure characteristic as outlined earlier. The capacity of the forward clutch is increased, and turbine speed and engine speed decrease.

t6:

Control Strategy—"BOTH" Options

The engagement timer EPC_ENG_TMR has expired and the EPC ramp has been executed. The engagement is completed and the turbine speed has reached zero speed. Another control timer called ENG_CTL_TMR is loaded. During this time a "CLIP"—EPC value is loaded. This EPC value is needed to clip the forward clutch from CF pressure to D/2/1 pressure as explained earlier.

Control Hardware—"BOTH" Options

The turbine speed is zero. The engagement is complete and the forward clutch pressure is raised by the CF modulator 218 to the "CLIP" threshold of the engagement control valve in bore 209.

t7:

Control Strategy—"BOTH" Options

The ENG_CTL_TMR is expired and the EPC value is changed from the "CLIP" threshold to "STALL" EPC values.

Control Hardware—"BOTH" Options

The forward clutch has been clipped from CF pressure to D/2/1 pressure. The engagement control valve in bore 209 is in downshift position. The actual EPC value is set to STALL values.

Reverse-To-Drive Engagement

FIGS. 24 and 25, respectively, describe the closed loop option and the open loop option. These illustrate the engagement control strategy for both versions.

Summary

The forward engagement control system, as well as the reverse engagement system contains, a modulator valve system with a software accumulator introduced into the strategy. Since only one element has to be applied closed loop, triggering of the start of the engagement is not mandatory. The filling times of the forward clutch do not vary too dramatically with transmission oil temperature. However, when the overdrive cancel switch is ON, the coast clutch (CL1) has to be engaged as well.

The forward modulator system provides pressure settings lower than idle line pressure for engagement control. It is also used for upshifts and downshifts. Idle line pressure from the main regulator system is used to lubricate the transmission at idle and is far too high to accomplish good engagement quality. With the addition of one engagement control valve it is possible to use this modulator valve system for upshifts and downshifts.

Having described a preferred embodiment of the invention, what we claim and desire to secure by U.S. Letters Patent is:

1. A control system for an automatic transmission comprising multiple ratio gearing elements with gear ratios defining plural torque flow paths between a throttle controlled engine and a driven shaft, said control system comprising;

pressure actuated clutch and brake means for controlling the relative motion of said gearing elements, an engine driven line pressure pump, at least one transmission ratio shift valve means for selectively distributing pressure developed by said pump to said clutch and brake means to effect ratio changes;

a pressure operated reverse clutch in said torque flow path between said engine and said gearing elements, said pump developing a line pressure, said control system providing a fluid pressure distribution path to said reverse clutch for activating said reverse clutch;

a main regulator valve means communicating with said pump for maintaining said line pressure;

a solenoid operated pressure control valve means for modulating said line pressure to produce a control pressure;

means for establishing control signals determined by operating variables of said transmission and said engine including engine throttle position and engine speed;

an electronic microprocessor having a memory portion with storage registers containing ratio shift and line pressure control strategy and means for distributing said control signals to said solenoid operated pressure control valve means;

said main regulator valve means including a line pressure booster valve means for augmenting line pressure maintained by said main regulator valve means;

a control pressure valve means communicating with said line pressure booster valve means and with said solenoid operated pressure control valve means for establishing control pressure values that determine a first functional relationship between said line pressure and said control pressure and for establishing boosted control pressure values that determine a second functional relationship between said line pressure and said control pressure thereby providing sufficient clutch and brake capacity during vehicle start-up;

a reverse clutch pressure modulator valve means in said control system communicating with said main regulator valve means, said solenoid operated pressure control valve means and said reverse clutch for modulating pressure buildup in said reverse clutch upon activation of said reverse clutch whereby reverse clutch engagement is cushioned.

2. The control system as set forth in claim 1 wherein said solenoid operated pressure control valve means is a variable force solenoid valve means.

3. The control system as set forth in claim 1 wherein said control pressure booster valve means includes a boost pressure limit valve means for establishing a limiting value for said control pressure, said limit valve means providing an exhaust pressure fluid flow path for said control pressure booster valve means.

4. The control system as set forth in claim 1 including a hydrokinetic torque converter having a turbine and an impeller, said reverse clutch pressure modulator valve means communicating with said reverse clutch whereby boosted line pressure is distributed to said clutch and brake means to provide sufficient torque capacity for start-up in reverse gear ratio.

5. The control system as set forth in claim 4 including means for monitoring the speed of said turbine and developing a turbine speed signal, means for receiving said turbine speed signal and for timing the duration of said turbine speed signal when it is within a predetermined maintained turbine speed range, and means for limiting distribution of said pressure to said reverse clutch pressure modulator valve means when said monitored turbine speed is not within said turbine speed range for a predetermined period.

6. The control system as set forth in claim 4 wherein said clutch and brake means includes a reverse reaction brake and a reverse clutch, said reverse clutch pressure modulator valve means communicating with said reverse clutch in said reverse clutch pressure distribution path whereby said reverse reaction brake is applied before said reverse clutch achieves full capacity as said transmission establishes reverse drive.

7. The control system as set forth in claim 4 including means for monitoring the speed of said turbine and developing a derivative turbine speed signal, means for receiving said derivative turbine speed signal and for timing the duration thereof when it is within a predetermined maintained derivative turbine speed range, and means for limiting distribution of pressure to said reverse clutch pressure modulator valve means when said monitored turbine speed derivative is not within said derivative turbine speed range for a predetermined period.

8. The control system as set forth in claim 4 wherein said control system includes an engagement control valve means communicating with said reverse clutch for establishing a multiplexing function to effect a modulated reverse clutch pressure that cushions reverse clutch engagement and to effect start-up in reverse drive with boosted line pressure acting on said reverse clutch.

9. A control system for an automatic transmission comprising multiple ratio gearing elements, a hydrokinetic torque converter having an engine-driven impeller and a turbine, said turbine being connected to torque input portions of said transmission, said converter including pressure operated bypass clutch means for connecting said impeller to said turbine, a driven shaft connected to torque output portions of said transmission, said control system comprising;

pressure actuated clutch and brake means for controlling the relative motion of said gearing elements, an engine driven line pressure pump, at least one transmission ratio shift valve means for selectively distributing pressure developed by said pump to said clutch and brake means to effect ratio changes;

at least one solenoid valve means for distributing actuating pressure to said shift valve means to effect ratio changes;

a second solenoid valve means for distributing actuating pressure to said converter bypass clutch means; and a solenoid pressure regulator valve means for modulating pressure developed by said pump and supplying modulated pressure to said second solenoid valve means whereby the regulating characteristics of each of said solenoid pressure regulator valve means can be calibrated independently of the calibration requirements of the other solenoid pressure regulator valve means;

said one solenoid valve means being an on-off solenoid valve means and said second solenoid valve means being a pulse width modulated solenoid valve means, said control system including an electronic microprocessor having a memory portion with storage registers containing ratio shift strategy, bypass clutch control strategy and line pressure control strategy and means for distributing actuating signals to each of said solenoid valve means in response to transmission and engine operating variables;

means for monitoring the speed of said turbine and developing a turbine speed signal;

said microprocessor including means for receiving said turbine speed signal and for timing the duration of said turbine speed signal when it is within a predetermined maintained turbine speed range, and means for limiting said distribution of said actuating signals for said solenoid pressure regulator valve means when turbine speed is not within said predetermined range for a predetermined period.

10. The control system as set forth in claim 9 wherein said means for monitoring the speed of said turbine includes means for developing the derivative of the turbine speed signal and said receiving and timing means receives said turbine speed derivative signal and times the duration thereof when it is within a predetermined maintained derivative turbine speed range, and means for limiting said distribution of said actuating signals for said one solenoid pressure regulator valve means when said turbine speed derivative signal is not within said predetermined range for a predetermined period.

11. A control system for an automatic transmission for an automotive vehicle comprising multiple ratio gearing elements with gear ratios defining plural torque flow paths with multiple torque ratios between an engine and a driven shaft, said control system including;

pressure actuated clutch and brake means for controlling the relative motion of said gearing elements, an engine driven line pressure pump, at least one transmission ratio shift valve means for selectively distributing line pressure developed by said pump to said clutch and brake means to effect ratio changes;

a pressure operated forward drive clutch in said torque flow path between said engine and said gearing elements, said pump developing a line pressure, said control system defining a fluid pressure distribution path for said forward clutch for activating said forward clutch;

a main regulator valve means communicating with said pump for maintaining said line pressure;

a solenoid operated pressure control valve means for modulating said line pressure to produce a control pressure;

means for establishing control signals determined by operating variables of said transmission and said engine including engine throttle position and engine speed;

an electronic microprocessor having a memory portion with storage registers containing ratio shift and line pressure control strategy and means for distributing said control signals to said solenoid operated pressure control valve means;

said regulator valve means including a line pressure booster valve means for augmenting line pressure maintained by said main regulator valve means;

a control pressure valve means communicating with said line pressure booster valve means and with said solenoid operated control valve means for establishing control pressure values that determine a first functional relationship between said line pressure and said control pressure and for establishing increased pressure values that determine a second functional relationship between said line pressure and said control pressure thereby providing sufficient clutch and brake capacity during vehicle start-up;

said clutch and brake means including a forward drive clutch that is engaged during forward drive; and a forward drive clutch pressure modulator valve means communicating with said forward drive clutch for modulating said pressure distributed to said forward clutch upon engagement of said forward clutch whereby forward clutch engagement is cushioned.

12. The control system set forth in claim 11 including a forward drive clutch engagement control valve means communicating with said forward drive clutch pressure modulator valve means for overruling modulated forward clutch pressure to a boosted line pressure and for maintaining that line pressure as pressure distribution to said clutch and brake is in effect during changes in said torque ratios upon changes in operating variables during operation of said vehicle.

* * * * *